United States Patent
Dressel et al.

(10) Patent No.: US 9,643,651 B2
(45) Date of Patent: May 9, 2017

(54) CASTING, HOLLOW INTERCONNECTING MEMBER FOR CONNECTING VEHICULAR FRAME MEMBERS, AND VEHICULAR FRAME ASSEMBLY INCLUDING HOLLOW INTERCONNECTING MEMBER

(71) Applicant: Honda Motor Co., Ltd., Minato-ku, Tokyo (JP)

(72) Inventors: Brian E. Dressel, Worthington, OH (US); Rajendra L. Kakarla, Plain City, OH (US); Jason T. Hardesty, Dublin, OH (US); Andrew George Bakun, Dublin, OH (US); Kevin A. Hothem, Dublin, OH (US); Brian C. Bray, Powell, OH (US); Hirotomo Yamada, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 14/839,220

(22) Filed: Aug. 28, 2015

(65) Prior Publication Data

US 2017/0057546 A1    Mar. 2, 2017

(51) Int. Cl.
*B62D 21/15* (2006.01)
*B62D 21/11* (2006.01)

(52) U.S. Cl.
CPC ............ *B62D 21/152* (2013.01); *B62D 21/11* (2013.01); *B62D 21/15* (2013.01)

(58) Field of Classification Search
CPC ....... B62D 21/15; B62D 21/152; B62D 21/11
See application file for complete search history.

(56) References Cited

U.S. PATENT DOCUMENTS

| | | |
|---|---|---|
| 3,655,237 A | 4/1972 | Pitman |
| 3,819,224 A | 6/1974 | Casey et al. |
| 3,822,907 A | 7/1974 | Appel et al. |
| 3,827,525 A | 8/1974 | Felzer |

(Continued)

FOREIGN PATENT DOCUMENTS

| | | | |
|---|---|---|---|
| EP | 0903265 A2 | 3/1999 | |
| JP | EP 1426270 A1 * | 6/2004 | ........... B62D 21/152 |
| WO | 2012/159898 A1 | 11/2012 | |

OTHER PUBLICATIONS

Bourassa, B. et al.; Solidification and Heat Treatment of 6061 and 6082 Alloys for Use in Shape Casting; Paper 11-041; AFS Proceedings 2011; 14 pages; American Foundry Society, Schaumburg, IL.

(Continued)

*Primary Examiner* — Ruth Ilan
(74) *Attorney, Agent, or Firm* — Arent Fox LLP

(57) ABSTRACT

A hollow interconnecting member for connecting vehicular frame members is provided. The hollow interconnecting member is formed of a metal material and defines a centerline. The hollow interconnecting member comprises a first end and a second end. The centerline extends through the first end and the second end. A plurality of walls cooperate to define a continuous passageway that extends between the first end and the second end and defines a first opening and a second opening at the first end and the second end, respectively. The hollow interconnecting member is formed as an as-cast one-piece construction.

19 Claims, 45 Drawing Sheets

(56) References Cited

U.S. PATENT DOCUMENTS

| | | |
|---|---|---|
| 3,831,997 A | 8/1974 | Myers |
| 3,899,047 A | 8/1975 | Maeda et al. |
| 4,074,744 A | 2/1978 | Cina et al. |
| 4,252,355 A | 2/1981 | Goupy et al. |
| 4,573,734 A | 3/1986 | Gass |
| 4,674,551 A | 6/1987 | Kawai et al. |
| 4,684,151 A | 8/1987 | Drewek |
| 4,702,515 A | 10/1987 | Kato et al. |
| 5,324,133 A | 6/1994 | Kreis et al. |
| 5,772,267 A | 6/1998 | Heim et al. |
| 5,846,348 A | 12/1998 | Sakoda et al. |
| 6,003,898 A | 12/1999 | Teply et al. |
| 6,059,331 A | 5/2000 | Mori |
| 6,068,330 A * | 5/2000 | Kasuga ............... B62D 29/008 188/377 |
| 6,146,477 A | 11/2000 | Clark et al. |
| 6,248,189 B1 | 6/2001 | Shaffer et al. |
| 6,342,111 B1 | 1/2002 | Meki et al. |
| 6,398,292 B2 | 6/2002 | Tsuruta et al. |
| 6,474,400 B1 | 11/2002 | Kaneto et al. |
| 6,578,904 B1 | 6/2003 | Yvetot et al. |
| 6,645,321 B2 | 11/2003 | Sigworth |
| 6,649,126 B2 | 11/2003 | Komazaki et al. |
| 6,695,392 B2 | 2/2004 | Stoffels et al. |
| 6,695,393 B1 | 2/2004 | Aouadi et al. |
| 6,702,346 B2 | 3/2004 | Wikstrom |
| 6,705,653 B2 | 3/2004 | Gotanda et al. |
| 6,705,670 B2 | 3/2004 | Forssell et al. |
| 6,712,426 B2 | 3/2004 | Ritchie et al. |
| 6,783,730 B2 | 8/2004 | Lin et al. |
| 6,793,274 B2 | 9/2004 | Riley et al. |
| 6,799,794 B2 | 10/2004 | Mochidome et al. |
| 6,808,229 B2 | 10/2004 | Yamaguchi |
| 6,811,212 B2 | 11/2004 | Kasuga |
| 6,814,381 B1 | 11/2004 | Frank |
| 6,820,924 B2 | 11/2004 | Caliskan et al. |
| 6,846,369 B1 | 1/2005 | Clark et al. |
| 6,929,706 B2 | 8/2005 | Spanjers et al. |
| 6,938,948 B1 | 9/2005 | Cornell et al. |
| 6,957,846 B2 | 10/2005 | Saeki |
| 6,994,350 B2 | 2/2006 | Krajewski et al. |
| 7,025,409 B2 | 4/2006 | Riley et al. |
| 7,052,075 B2 | 5/2006 | Kamada et al. |
| 7,063,376 B2 | 6/2006 | Ori et al. |
| 7,080,875 B2 | 7/2006 | Kim |
| 7,114,763 B2 | 10/2006 | Riley et al. |
| 7,121,318 B2 | 10/2006 | Grassi et al. |
| 7,165,600 B2 | 1/2007 | Grassi et al. |
| 7,182,545 B2 | 2/2007 | Riviere et al. |
| 7,185,945 B2 | 3/2007 | Dandekar et al. |
| 7,188,890 B1 | 3/2007 | Baccouche et al. |
| 7,216,691 B2 | 5/2007 | Grassi et al. |
| 7,258,392 B2 | 8/2007 | Frederick et al. |
| 7,290,811 B1 | 11/2007 | Arns |
| 7,322,106 B2 | 1/2008 | Marando et al. |
| 7,323,069 B2 | 1/2008 | DasGupta et al. |
| 7,357,443 B2 | 4/2008 | Wolff et al. |
| 7,360,811 B2 | 4/2008 | Roll et al. |
| 7,448,673 B2 | 11/2008 | Yasuhara |
| 7,469,956 B2 | 12/2008 | Yasuhara et al. |
| 7,503,986 B2 | 3/2009 | Kamat et al. |
| 7,673,930 B2 | 3/2010 | Stratman |
| 7,677,617 B2 | 3/2010 | Stewart et al. |
| 7,681,700 B2 | 3/2010 | Ginja et al. |
| 7,681,943 B2 | 3/2010 | Murata et al. |
| 7,793,997 B2 | 9/2010 | Karlander |
| 7,815,245 B2 * | 10/2010 | Hiraishi .................. B60R 19/12 293/155 |
| 7,874,601 B2 | 1/2011 | Tanskanen |
| 7,900,964 B2 | 3/2011 | Chretien et al. |
| 7,926,868 B2 | 4/2011 | Braunbeck et al. |
| 7,987,895 B2 | 8/2011 | Garza-Ondarza et al. |
| 8,083,871 B2 | 12/2011 | Lin et al. |
| 8,167,363 B2 | 5/2012 | Gandhi |
| 8,201,872 B2 | 6/2012 | Baccouche et al. |
| 8,201,875 B2 | 6/2012 | Baccouche et al. |
| 8,215,705 B2 | 7/2012 | Gonin |
| 8,256,828 B2 | 9/2012 | Carle et al. |
| 8,276,955 B2 | 10/2012 | Baccouche et al. |
| 8,292,589 B2 | 10/2012 | Koga |
| 8,308,207 B2 | 11/2012 | Fang et al. |
| 8,376,427 B2 | 2/2013 | Perarnau Ramos et al. |
| 8,419,116 B2 | 4/2013 | Boettcher et al. |
| 8,469,416 B2 | 6/2013 | Haneda et al. |
| 8,540,318 B2 | 9/2013 | Folkert et al. |
| 2001/0038231 A1 | 11/2001 | Takemoto et al. |
| 2002/0060463 A1 | 5/2002 | Gotanda et al. |
| 2004/0119321 A1 | 6/2004 | Kasuga |
| 2005/0257859 A1 | 11/2005 | Chung |
| 2006/0237976 A1 | 10/2006 | Glasgow et al. |
| 2007/0102071 A1 | 5/2007 | Druschitz |
| 2008/0041499 A1 | 2/2008 | Grassi et al. |
| 2009/0250185 A1 | 10/2009 | Saha |
| 2010/0096887 A1 * | 4/2010 | Mori ...................... B62D 21/152 296/203.02 |
| 2011/0109122 A1 | 5/2011 | Clausen et al. |
| 2011/0123390 A1 | 5/2011 | Kim et al. |
| 2011/0123391 A1 | 5/2011 | Kim et al. |
| 2011/0126947 A1 | 6/2011 | Garat |
| 2012/0049571 A1 | 3/2012 | Katou et al. |
| 2012/0097354 A1 | 4/2012 | Kopchick et al. |
| 2012/0161475 A1 | 6/2012 | Mori |
| 2012/0180749 A1 | 7/2012 | Kopchick et al. |
| 2012/0258010 A1 | 10/2012 | Garat et al. |
| 2012/0261034 A1 | 10/2012 | Lin et al. |
| 2013/0000482 A1 | 1/2013 | Kopchick et al. |
| 2013/0034437 A1 | 2/2013 | Porte et al. |
| 2014/0008936 A1 | 1/2014 | Kim et al. |
| 2014/0354008 A1 * | 12/2014 | Sakakibara .......... B62D 25/082 296/187.1 |
| 2015/0298740 A1 * | 10/2015 | Winberg ............... B62D 25/082 296/187.09 |
| 2016/0068193 A1 * | 3/2016 | Koike ................ B62D 25/2045 296/187.09 |
| 2016/0121931 A1 * | 5/2016 | Tamaoki ............... B62D 21/152 296/187.09 |
| 2016/0159399 A1 * | 6/2016 | Yasuhara ............. B62D 25/082 180/292 |
| 2016/0311461 A1 * | 10/2016 | Hardesty ............. B62D 21/152 |

OTHER PUBLICATIONS

Moller H.; et al.; The T6 Treatment of Semi-Solid Metal Processed Alloy A356; The Open Materials Science Journal, 2008; accepted Mar. 24, 2008; pp. 6-10; vol. 2; Bentham Science Publishers Ltd.

Grassi, J., et al.; The Ablation Casting Process; Materials Science Forum (2009); Apr. 17, 2009; pp. 591-954; vol. 618-619; Trans Tech Publications, Switzerland.

* cited by examiner

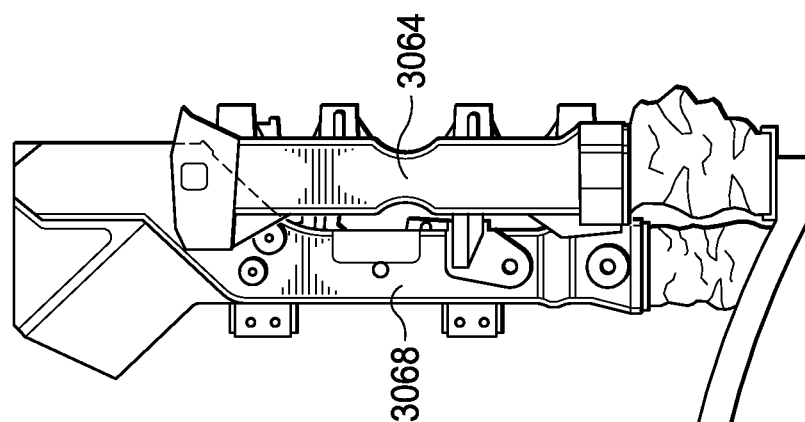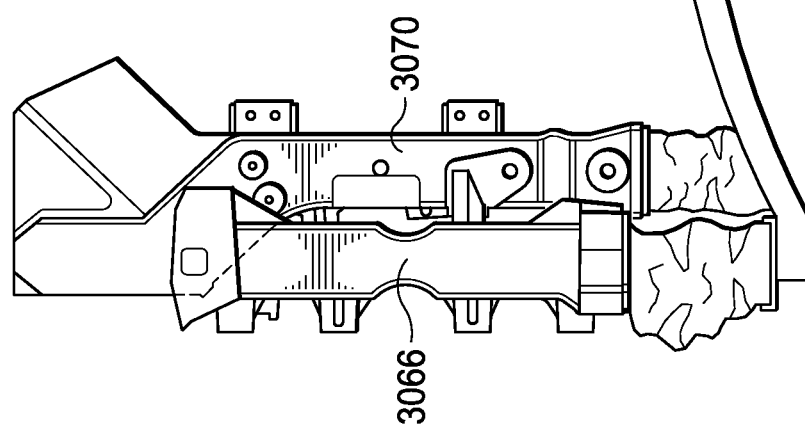
FIG. 34

CASTING, HOLLOW INTERCONNECTING MEMBER FOR CONNECTING VEHICULAR FRAME MEMBERS, AND VEHICULAR FRAME ASSEMBLY INCLUDING HOLLOW INTERCONNECTING MEMBER

BACKGROUND

Some conventional vehicle frames include individual frame members that are individually coupled together through welding or other conventional securement methods. Multiple frame members can be joined together with an interconnecting member. These interconnecting members can be formed through thermoforming, casting, or any of a variety of other suitable formation methods. When cast, these interconnecting members can have a solid construction and/or can require assembly which can be adversely affect the weight and/or cost of a vehicle.

SUMMARY

In accordance with one embodiment, a hollow interconnecting member for connecting vehicular frame members is provided. The hollow interconnecting member is formed of a metal material and defines a centerline. The hollow interconnecting member comprises a first end, a second end, and a plurality of walls. The centerline extends through the first end and the second end. The plurality of walls cooperate to define a continuous passageway that extends between the first end and the second end and defines a first opening and a second opening at the first end and the second end, respectively. The hollow interconnecting member has an overall length. Each wall of the plurality of walls overlies a substantial portion of an area disposed between adjacent walls and the first end and the second end. The hollow interconnecting member is formed as an as-cast one-piece construction.

In accordance with another embodiment, a vehicular frame assembly defines a substantially horizontal longitudinal axis and comprises at least one hollow interconnecting member, at least one forward frame member, and at least one rearward frame member. The at least one hollow interconnecting member is for connecting vehicular frame members. The hollow interconnecting member is formed of a metal material and defines a centerline. The hollow interconnecting member comprises a first end, a second end, and a plurality of walls. The centerline extends between the front end and the rear end. The plurality of walls cooperate to define a continuous passageway that extends between the front end to the rear end and defines a front opening and a rear opening at the front end and the rear end, respectively. The at least one hollow interconnecting member has an overall length. Each wall of the plurality of walls overlies a substantial portion of an area disposed between adjacent walls and the first end and the second end of said at least one hollow interconnecting member. The at least one hollow interconnecting member is formed as an as-cast one-piece construction. The at least one forward frame member is coupled to the front end of the at least one hollow interconnecting member. The at least one forward frame member is formed of a first material. The at least one rearward frame member is coupled to the rear end of the at least one hollow interconnecting member. The at least one rearward frame member is formed of a second material. The at least one forward frame member is more susceptible to deformation than the at least one forward frame interconnecting member in response to a substantially identical force applied each of the at least one forward frame interconnecting member and the at least one forward frame member along the longitudinal axis.

In accordance with yet another embodiment, a hollow interconnecting member for connecting vehicular frame members is provided. The hollow interconnecting member is formed of a metal material and defines a centerline. The hollow interconnecting member comprises a first end, a second end, a plurality of walls, and a suspension mount. The centerline extends through the first end and the second end. The plurality of walls cooperate to define a continuous passageway that extends between the first end and the second end and defines a first opening and a second opening at the first end and the second end, respectively. The suspension mount is configured to facilitate coupling of a suspension assembly to the hollow interconnecting member. The suspension mount comprises an internal reinforcement portion that extends from one of the walls through the continuous passageway and to an opposing wall. Each wall of the plurality of walls overlies a substantial portion of an area disposed between adjacent walls and the first end and the second end.

In accordance with yet another embodiment, a hollow interconnecting member for connecting vehicular frame members is provided. The hollow interconnecting member is formed of a metal material and defines a centerline. The hollow interconnecting member comprises a first end, a second end, a plurality of walls, a sleeve and a stop member. The centerline extends through the first end and the second end. The plurality of walls cooperate to define a continuous passageway that extends between the first end and the second end and defines a first opening and a second opening at the first end and the second end, respectively. The sleeve surrounds the first opening. The stop member extends from the sleeve into the continuous passageway and is spaced from the first end. Each wall of the plurality of walls overlies a substantial portion of an area disposed between adjacent walls and the first end and the second end.

In accordance with still another embodiment, a hollow interconnecting member for connecting vehicular frame members is provided. The hollow interconnecting member is formed of a metal material and defines a centerline. The hollow interconnecting member comprises a first end, a second end, a plurality of walls, and a deformation feature. The centerline extends through the first end and the second end. The plurality of walls cooperate to define a continuous passageway that extends between the first end and the second end and defines a first opening and a second opening at the first end and the second end, respectively. Each wall of the plurality of walls overlies a substantial portion of an area disposed between adjacent walls and the first end and the second end. Each of the walls has a thickness and the thickness of the deformation feature may be substantially the same as the thickness of at least one of the walls adjacent to the deformation feature.

In accordance with still yet another embodiment, a vehicular frame assembly defines a substantially horizontal longitudinal axis and comprises an upper hollow interconnecting member, a lower hollow interconnecting member, an upper forward frame member, and a lower forward frame member. The upper hollow interconnecting member is for connecting vehicular frame members. The upper hollow interconnecting member is formed of a metal material and comprises a front end, a rear end, a plurality of walls, and an upper deformation feature. The plurality of walls cooperate to define a continuous passageway that extends between the front end to the rear end and defines a front opening and a rear opening at the front end and the rear end, respectively. Each wall of the plurality of walls overlies a substantial portion of an area disposed between adjacent walls and the end and the second end of said hollow interconnecting member. The lower hollow interconnecting member is for connecting vehicular frame members. The lower hollow interconnecting member is formed of a metal material and comprises a front end, a rear end, a plurality of walls, and a lower deformation feature. The plurality of walls cooperate to define a continuous passageway that extends between the front end to the rear end and defines a front opening and a rear opening at the front end and the rear end, respectively. Each wall of the plurality of walls overlies a substantial portion of an area disposed between adjacent walls and the first end and the second end of said hollow interconnecting member. The upper forward frame member is coupled to the front end of the upper hollow interconnecting member. The lower forward frame member is coupled to the front end of the lower hollow interconnecting member. The upper forward frame member and the lower forward frame member cooperate to define a first collision zone. The upper hollow interconnecting member and the lower hollow interconnecting member cooperate to define a second collision zone. During a front impact collision, impact energy is first absorbed within the first zone and then absorbed in the second zone.

In accordance with still yet another embodiment, a vehicular frame assembly defines a substantially horizontal longitudinal axis and comprises an upper hollow interconnecting member and a lower hollow interconnecting member. The upper hollow interconnecting member is for connecting vehicular frame members. The upper hollow interconnecting member is formed of a metal material and comprises a front end, a rear end, a plurality of walls, and an upper deformation feature. The plurality of walls cooperate to define a continuous passageway that extends between the front end to the rear end and defines a front opening and a rear opening at the front end and the rear end, respectively. Each wall of the plurality of walls overlies a substantial portion of an area disposed between adjacent walls and the end and the second end of said hollow interconnecting member. The lower hollow interconnecting member is for connecting vehicular frame members. The lower hollow interconnecting member is formed of a metal material and comprises a front end, a rear end, a plurality of walls, and a lower deformation feature. The plurality of walls cooperate to define a continuous passageway that extends between the front end to the rear end and defines a front opening and a rear opening at the front end and the rear end, respectively. Each wall of the plurality of walls overlies a substantial portion of an area disposed between adjacent walls and the first end and the second end of said hollow interconnecting member. The lower hollow interconnecting member is more susceptible to cracking at the lower deformation feature than the upper hollow interconnecting member at the upper deformation feature in response to a substantially identical force applied to each of the lower hollow interconnecting member and the upper hollow interconnecting member in a direction that is substantially parallel to the longitudinal axis.

In accordance with yet another embodiment, a vehicular frame assembly defines a substantially horizontal longitudinal axis and comprises at least one hollow interconnecting member and at least one forward frame member. The at least one hollow interconnecting member is for connecting vehicular frame members and is formed of a metal material. The at least one hollow interconnecting member comprises a front end, a rear end, a plurality of walls, and a deformation feature. The plurality of walls cooperates to form a body and define a continuous passageway that extends between the front end and the rear end. The body defines a first opening and a second opening at the front end and the rear end, respectively. The at least one forward frame member is coupled to the front end of the at least one hollow interconnecting member and cooperates with the at least one hollow interconnecting member to define a centerline. The at least one hollow interconnecting member is formed as an as-cast one-piece construction. The at least one forward frame member defines a first collision zone and the at least one interconnecting member defines a second collision zone. The least one forward frame member is more susceptible to deformation than the at least one hollow interconnecting member in response to a force applied to the at least one forward frame member along the centerline such that the at least one forward frame member experiences deformation along the centerline prior to the at least one hollow interconnecting member.

In accordance with still yet another embodiment, a hollow interconnecting member for connecting vehicular frame members is formed of a metal material. The hollow interconnecting member comprises a body, a deformation feature positioned on the body, at least one suspension mount, and an internal reinforcement portion. The at least one suspension mount is positioned on the exterior surface of the outboard wall. The body includes a first end, a second end, an inboard wall, and an outboard wall that each extend between the first and second ends. Each of the inboard and outboard walls includes an interior surface and an exterior surface. The interior surfaces of the inboard and outboard walls at least partially define a continuous passageway that extends between the first end and the second end. The body defines a first opening and a second opening at the first end and the second end, respectively. The internal reinforcement portion extends within the continuous passageway from the interior surface of the outboard wall opposite the at least one suspension mount to the interior surface of the inboard wall. The body, the deformation feature, the at least one suspension mount, and the internal reinforcement portion are an as-cast one-piece construction.

In accordance with still yet another embodiment, a hollow interconnecting member for connecting vehicular frame members is formed of a metal material. The hollow interconnecting member comprises a body, a deformation feature, a first steering assembly, and a first internal reinforcement portion. The first steering assembly mount is positioned on the exterior surface of the upper wall. The body includes a first end, a second end, an upper wall, and a lower wall that each extends between the first end and the second end. Each of the upper and lower walls includes an interior surface and an exterior surface. The interior surfaces of the upper and lower walls at least partially define a continuous passageway that extends between the first end and the second end. The body defines a first opening and a second opening at the first end and the second end, respectively. The first internal reinforcement portion extends within the continuous passageway from the interior surface of the upper wall opposite the first steering assembly mount to the interior surface of the lower wall. The body, the deformation feature, and the first internal reinforcement portion are an as-cast one-piece construction.

In accordance with still yet another embodiment, a front body structure for a vehicle comprises an upper frame portion and a lower frame portion. The lower frame portion is positioned forward of a vehicle cabin and defines a first load path. The lower frame portion is rigidly secured to the upper frame portion and comprises at least one lower forward frame member and a lower cast interconnecting member that is positioned between the at least one lower forward frame member and the vehicle cabin. The lower cast interconnecting member comprises a body and a deformation zone. The body includes a plurality of walls that define a continuous passageway therein that extends between a first end and a second end of the lower cast interconnecting member. The deformation zone on the body is deformable in response to a force applied to the at least one forward frame member.

In accordance with still yet another embodiment, a front body structure for a vehicle comprises an upper frame portion and a lower frame portion. The lower frame portion is positioned forward of a vehicle cabin and defines a load path. The lower frame portion is rigidly secured to the upper frame portion and comprises at least one forward frame member and a cast interconnecting member. The at least one forward frame member defines a first collision zone. The cast interconnecting member is positioned between the at least one forward frame member and the vehicle cabin and defines a second collision zone. The cast interconnecting member comprises a body, a deformation feature, a first suspension mount, and a first steering component mount. The body includes a first end, a second end, an outboard wall, an inboard wall positioned opposite the outboard wall, a lower wall, and an upper wall opposite the lower wall. Each wall includes an interior surface and an exterior surface. The interior surfaces of the walls at least partially define a continuous passageway that extends between the first end and the second end. The body defines a first opening and a second opening at the first end and the second end, respectively. The deformation feature is positioned on the body and is deformable in response to a force applied to the at least one forward frame member. The first suspension mount is positioned on the exterior surface of the outboard wall. The first steering component mount is positioned on the exterior surface of the upper wall. The suspension assembly component is secured to the first suspension mount. The steering assembly component is secured to the first steering component mount.

BRIEF DESCRIPTION OF THE DRAWINGS

It is believed that certain embodiments will be better understood from the following description taken in conjunction with the accompanying drawings in which:

FIG. 34 is a top view depicting a front portion of the frame assembly of FIG. 31 after a collision;

DETAILED DESCRIPTION

Figure 1:
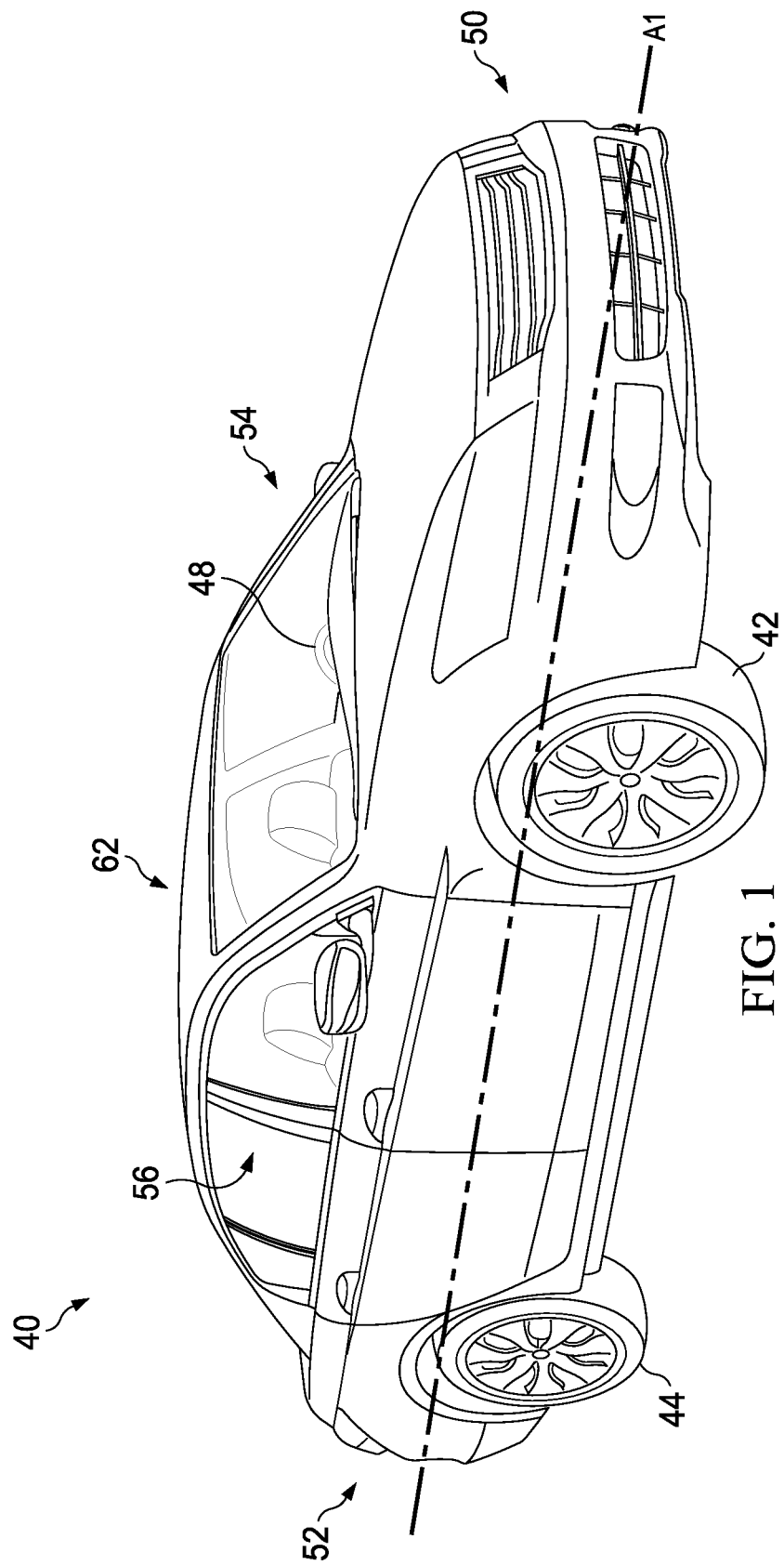
FIG. 1 is a front perspective view depicting a vehicle.
Figure 2:
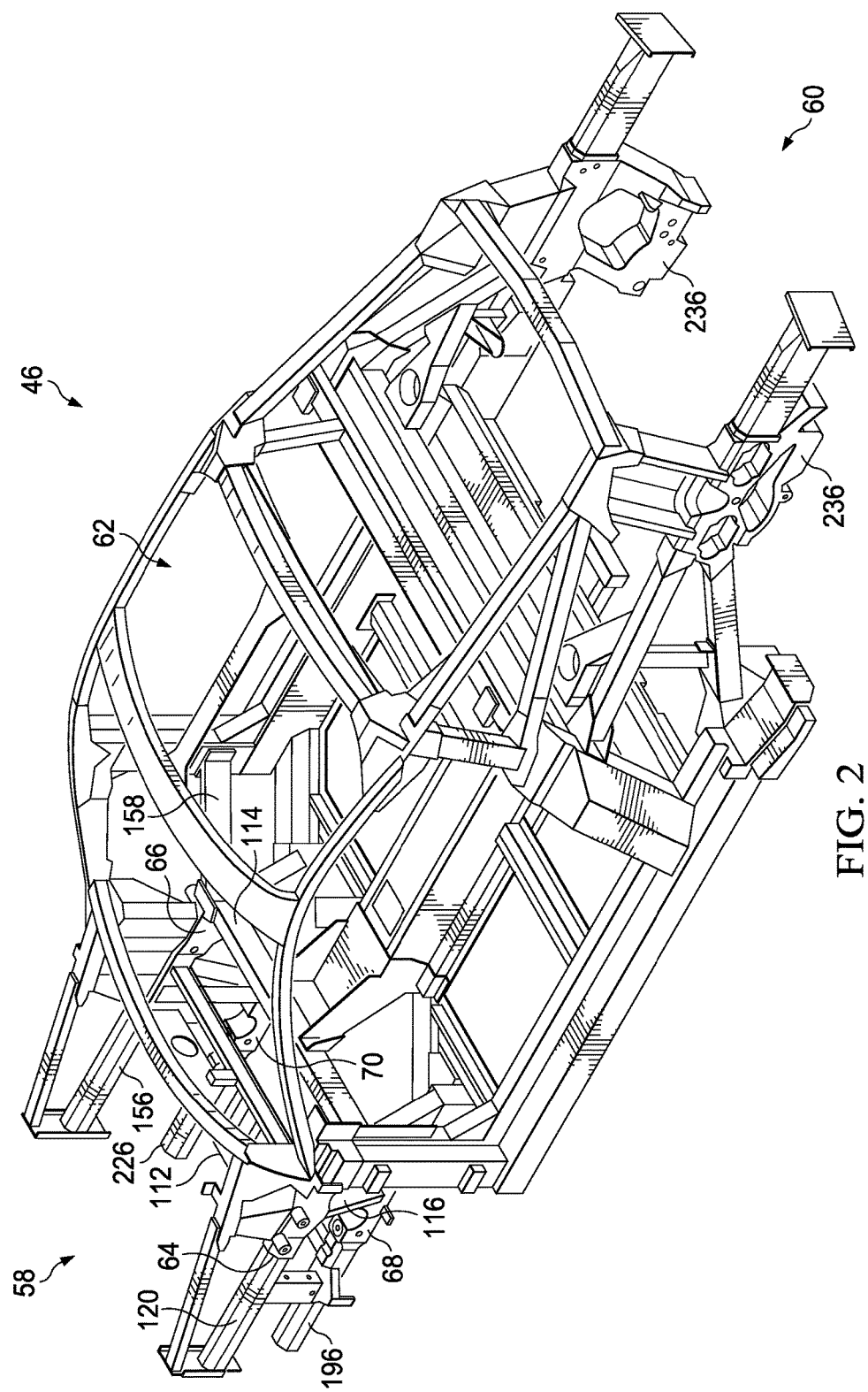
FIG. 2 is a rear perspective view depicting a frame assembly of the vehicle of FIG. 1, according to one embodiment.

In connection with the views and examples of FIGS. 1-49, wherein like numbers indicate the same or corresponding elements throughout the views, FIG. 1 illustrates a vehicle 40. The vehicle 40 is shown in FIG. 1 to comprise an automobile. However, a vehicle in accordance with alternative embodiments can comprise a sport-utility vehicle ("SUV"), a truck, a van, a cross-over type vehicle ("CUV"), or any of a variety of other suitable vehicles, such as a recreational vehicle or a utility vehicle, for example. As illustrated in FIG. 1, the vehicle 40 can comprise front wheels (e.g., 42) and rear wheels (e.g., 44) that are rotatably supported with respect to a frame assembly 46 (FIG. 2). The vehicle 40 can include a steering wheel 48 that can facilitate pivoting of the front wheels 42 and/or the rear wheels 44 to steer the vehicle 40. The front and rear wheels 42, 44 can be associated with respective front and rear steering assemblies that facilitate turning of the front and rear wheels 42, 44 in response to operation of the steering wheel 48. An engine (not shown) can be coupled with a transmission (not shown) and can provide motive power to the transmission to facilitate driving of at least one of the front wheels 42 and/or at least one of the rear wheels 44.

The vehicle 40 can extend along a longitudinal axis A1 between a front end 50 and a rear end 52 and can extend laterally between a left side 54 and a right side 56. It will be appreciated that an axis described herein as being oriented longitudinally, such as longitudinal axis A1, should be understood to mean that the axis is parallel to a direction of operation of the vehicle 40 in a straight line. An axis described herein as being oriented laterally, can be understood to mean that the axis is perpendicular to the longitudinal axis A1. It will also be appreciated that an axis described herein as being oriented horizontally, should be understood to mean that the axis is parallel to a base plane (not shown) having the rotation axes of the front wheels 42 and the rear wheels 44 contained therein when the vehicle 40 is at rest, and/or that the base plane is parallel to the longitudinal axis A1. An axis described herein as being oriented vertically can be understood to mean that the axis is perpendicular to the base plane.

As illustrated in FIG. 2, the frame assembly 46 includes a front body structure 58 disposed at the front end 50 of the vehicle 40 and a rear body structure 60 disposed at the rear end 52 of the vehicle 40. The frame assembly 46 can also define a passenger compartment 62 that is disposed between the front body structure 58 and the rear body structure 60. In a non-limiting example, the front body structure 58 defines an engine compartment and the rear body structure 60 defines a trunk compartment. Although the frame assembly 46 is shown to be a space frame type arrangement where multiple frame members are joined together with interconnecting members (i.e., nodes), it is not limited to such.

Referring now to FIGS. 2-5, the front body structure 58 can include left and right upper interconnecting members 64, 66 that form at least a portion of the left and right sides of an upper frame 65 and/or left and right lower interconnecting members 68, 70 that form at least a portion of the left and right sides of a lower (sub) frame 67. As will be described more in detail, each of the left and right upper interconnecting members 64, 66 and left and right lower interconnecting members 68, 70 can be provided as an as-cast, one-piece construction.

Figure 6:
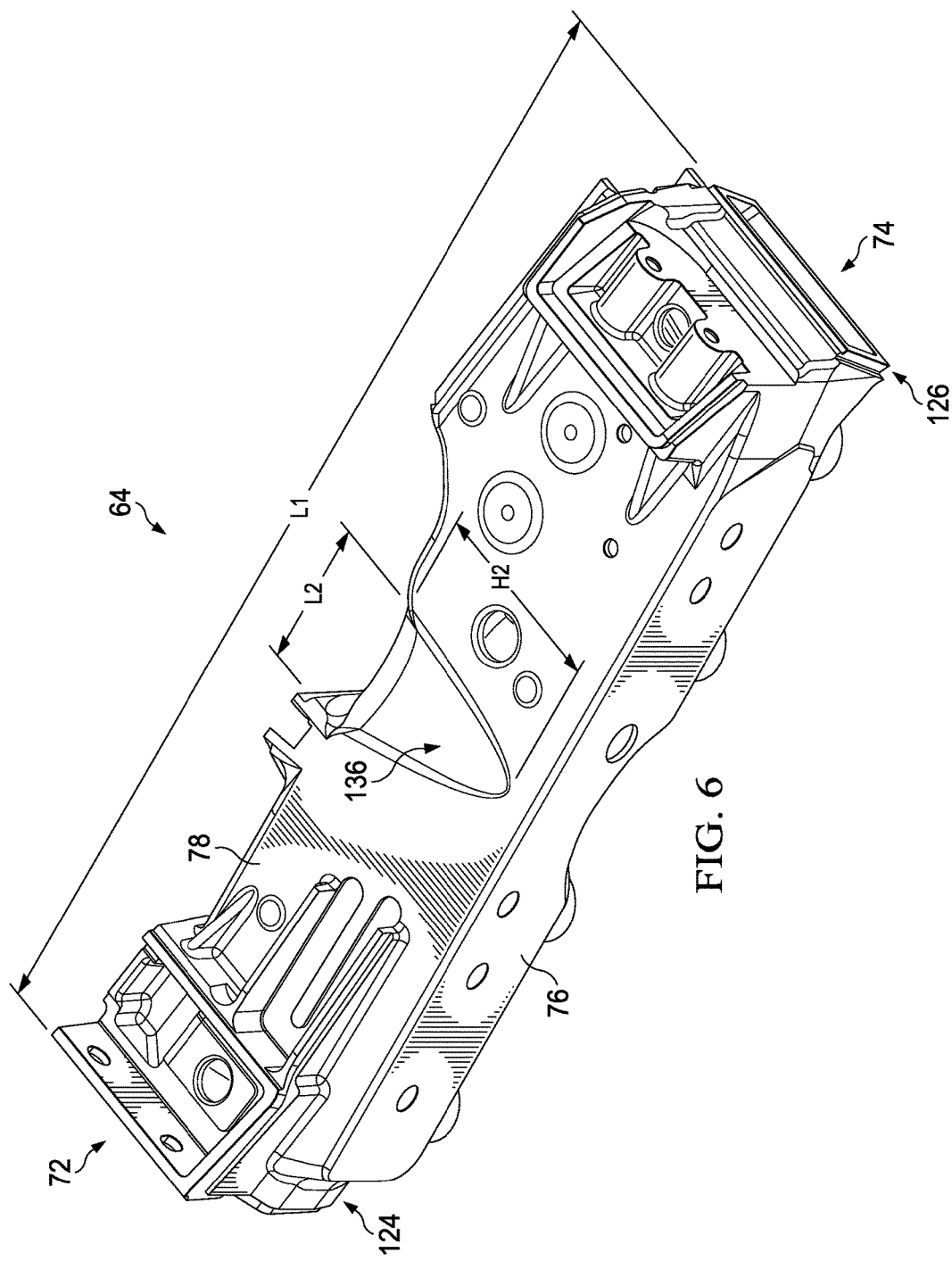
FIG. 6 is an inboard perspective view of a left upper interconnecting member of the frame assembly of FIG. 2.
Figure 7:
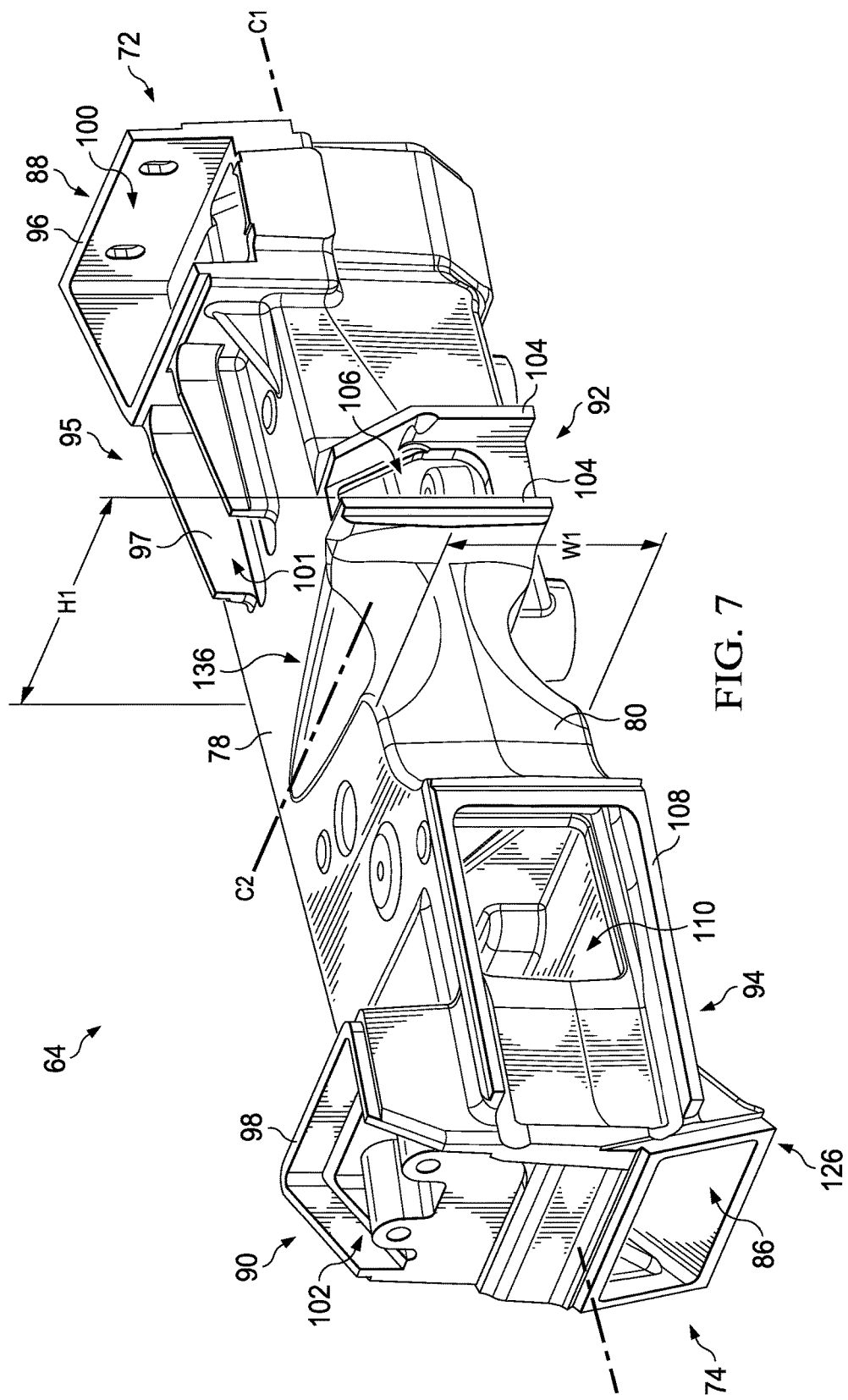
FIG. 7 is a lower rear perspective view of the left upper interconnecting member of FIG. 6.
Figure 8:
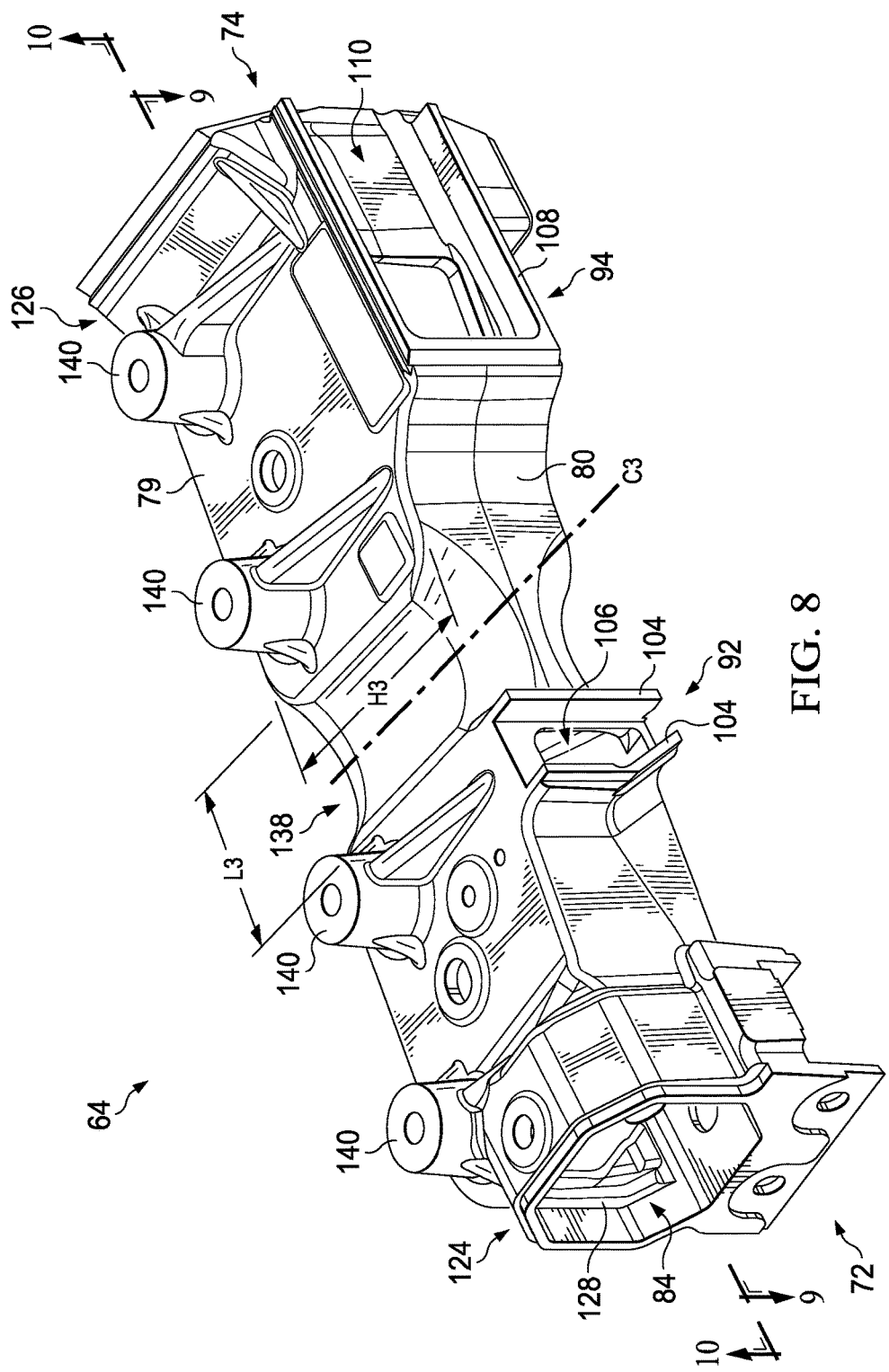
FIG. 8 is a lower front perspective view of the left upper interconnecting member of FIG. 6.

Referring now to FIGS. 6-8, the left upper interconnecting member 64 is shown and will now be described in detail. The left upper interconnecting member 64 can extend between a front end 72 and a rear end 74 and can include an upper wall 76 (FIG. 6), an inboard side wall 78 and an outboard side wall 79 (FIGS. 7 and 8) that extend from the upper wall 76, and a lower wall 80 (FIGS. 7 and 8) that extends between the side walls 78 and 79. The upper wall 76 and the lower wall 80 are spaced from one another and the side walls 78 and 79 are spaced from one another. The left upper interconnecting member 64 can have a length L1 (FIG. 6), a width W1 (FIG. 7) (the distance between the side walls 78 and 79), and a height H1 (FIG. 7) (the distance between the upper wall 76 and the lower wall 80) and can have a centerline C1 (FIG. 7). The upper wall 76, the side walls 78 and 79, and the lower wall 80 cooperate to define a chamber with a continuous passageway 82 (FIG. 9) that extends between the front and rear ends 72, 74 and defines a front opening 84 (FIG. 8) and a rear opening 86 (FIG. 7) at the front and rear ends 72, 74, respectively.

The continuous passageway 82 can extend continuously though the left upper interconnecting member 64 such that the left upper interconnecting member 64 is hollow. It will be appreciated that the left upper interconnecting member 64 being described as hollow should be understood to mean that the continuous passageway 82 and the front and rear openings 84, 86 are not blocked, such as by a solid wall, for example, and thus remain in permanent fluid communication with each other. The continuous passageway 82 can be linear, non-linear, curved, tortuous, or any of a variety of suitable shapes. It should also be understood that each of the upper wall 76, the side walls 78 and 79, and the lower wall 80 extends between the adjacent walls and the front and rear ends 72, 74 such that each of the upper wall 76, the side walls 78 and 79, and the lower wall 80 overlies a substantial portion (e.g., greater than 50%) of an area disposed between the adjacent walls 78 and 79 and the front and rear ends 72, 74. In particular, the upper wall 76, the side walls 78 and 79, and the lower wall 80 can be substantially devoid of gaps/ holes that would expose a substantial portion (e.g., equal to or greater than 50%) of the hollow interior of the left upper interconnecting member 64 between the front and rear ends 72, 74.

Referring now to FIG. 7, the left upper interconnecting member 64 can include a plurality of coupling portions 88, 90, 92, 94, 95 that are configured to support frame members that are attached to the left upper interconnecting member 64. Three of the coupling portions 88, 90, 95 are located on the inboard side wall 78 adjacent the front and rear ends 72, 74 of the left upper interconnecting member 64. The other two coupling portions 92, 94 are located on the lower wall 80 at respective front and rear ends 72, 74, respectively, of the left upper interconnecting member 64. The coupling portions 88, 90, and 95 of the inboard side wall 78 can each include a respective wall member 96, 97, 98 that is substantially U-shaped and defines a respective recess 100, 101, 102. The coupling portion 92 at the front end 72 of the lower wall 80 can include a pair of wall members 104 that cooperate to define a slot 106. The coupling portion 94 at the rear end 74 of the lower wall 80 can include a wall member 108 that is substantially U-shaped and defines a recess 110.

Referring now to FIGS. 3-5 and 7, the frame assembly 46 is shown to include a front lateral member 112, a rear lateral member 114, a front vertical support member 116, a rear vertical support member 118, and a member 119 that are coupled to the coupling portions 88, 90, 92, 94, 95 respectively, of the left upper interconnecting member 64. More particularly, the front lateral member 112 can extend into the recess 100 defined by the wall member 96 of the coupling portion 88 such that the wall member 96 supports the front lateral member 112. The rear lateral member 114 can extend into the recess 102 defined by the wall member 98 of the coupling portion 90 such that the wall member 98 supports the rear lateral member 114. The front vertical support member 116 can extend into the slot 106 defined by the wall members 104 of the coupling portion 92 such that the wall members 104 support the front vertical support member 116. The rear vertical support member 118 can extend into the recess 110 defined by the wall member 108 of the coupling portion 94 such that the wall member 108 supports the rear vertical support member 118. The member 119 can extend into the recess 101 defined by the wall members 97 and 96 of the coupling portion 95 such that the wall members 97 and 96 support the member 119. The other end of the member 119 is secured to the rear lateral member 114. In one embodiment, the front lateral member 112, the rear lateral member 114, the front vertical support member 116, the rear vertical support member 118, and the member 119 can be welded to the respective wall members 96, 97, 98, 104, 108. In other embodiments, the front lateral member 112, the rear lateral member 114, the front vertical support member 116, the rear vertical support member 118, and the member 119 can be coupled to the respective wall members 96, 97, 98, 104, 108 using any of a variety of suitable alternative attachment methods.

Figure 3:
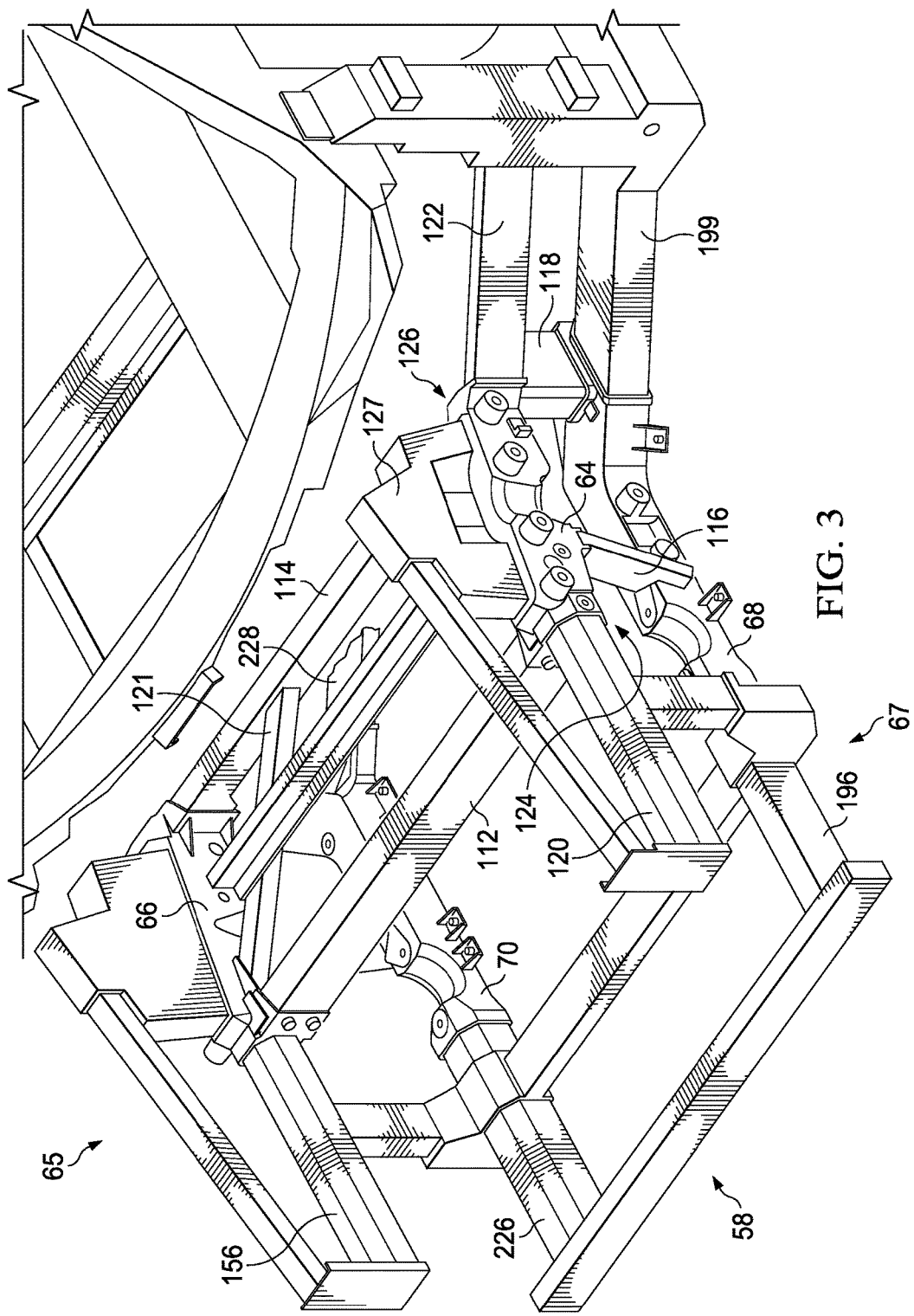
FIG. 3 is an enlarged upper front perspective view of the frame assembly of FIG. 2.
Figure 4:
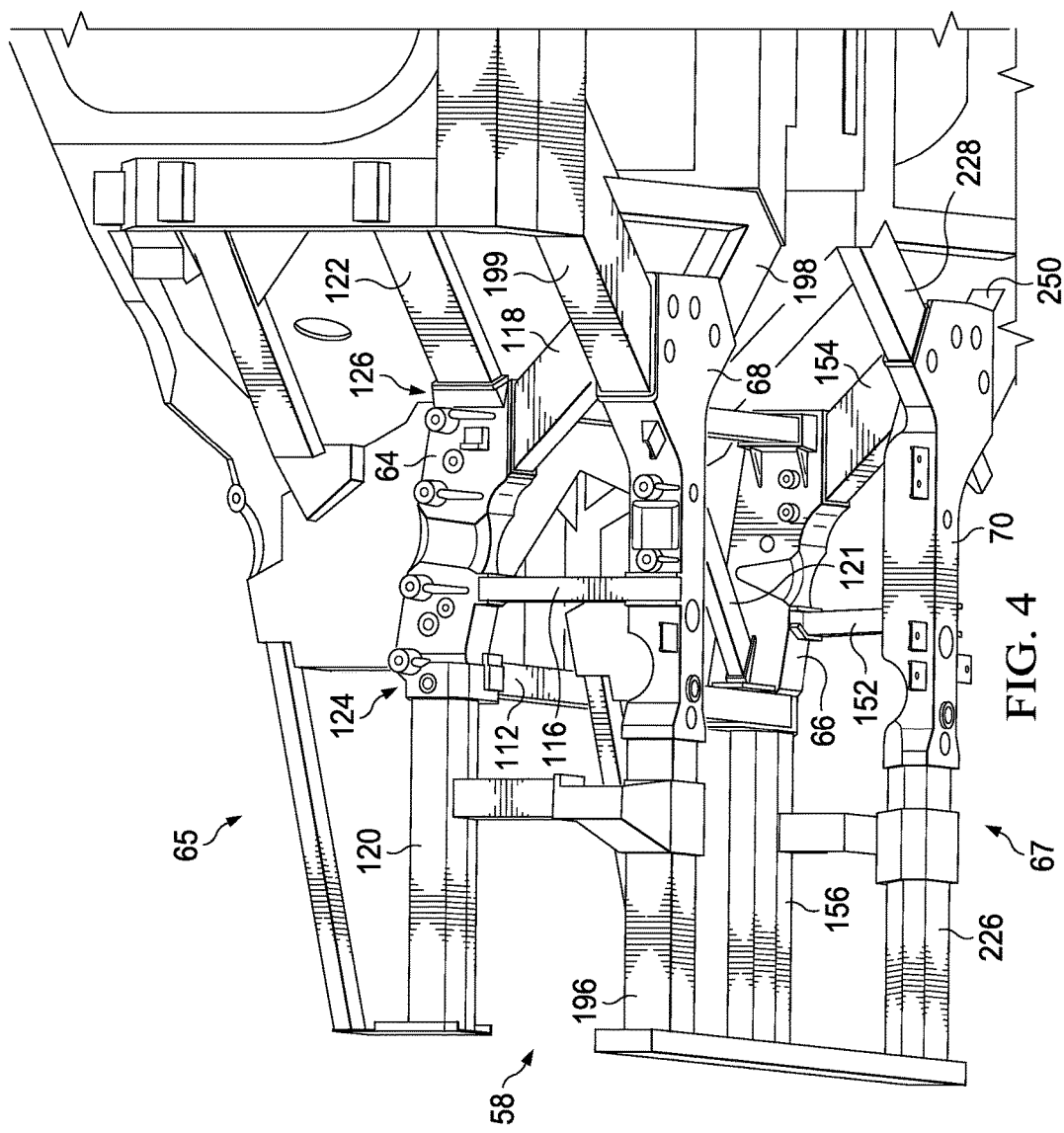
FIG. 4 is an enlarged lower front perspective view of the frame assembly of FIG. 2.
Figure 5:
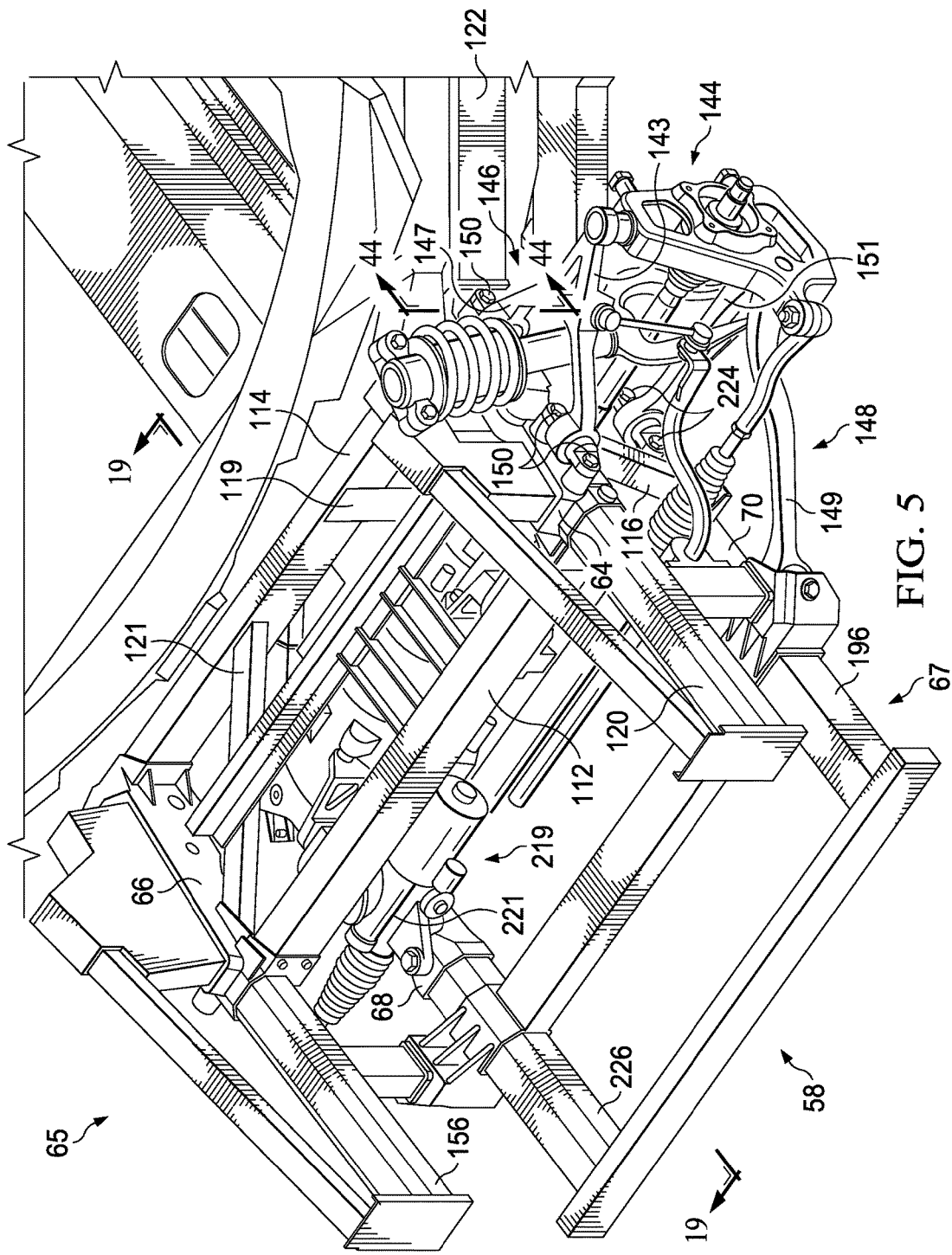
FIG. 5 is an enlarged upper front perspective view of the frame assembly of FIG. 2 with various other components of the vehicle depicted.

Still referring to FIGS. 3-5, the frame assembly 46 is shown to include a left upper forward member 120 and a left upper rearward member 122. The front and rear ends 72, 74 of the left upper interconnecting member 64 can include respective front and rear sleeve portions 124, 126 that are configured to receive the respective left upper forward and left upper rearward members 120, 122. During assembly, the left upper forward and rearward members 120, 122 can be inserted into the front and rear sleeves 124, 126 (e.g., into the front and rear openings 84, 86) such that the front and rear sleeves 124, 126 overlap the left upper forward and rearward members 120, 122. Each of the left upper forward and rearward members 120, 122 can then be attached to the front and rear sleeves 124, 126 with a lap weld. Positioning the left upper forward and rearward members 120, 122 within the front and rear sleeves 124, 126 can provide improved weld accuracy relative to a conventional butt weld by allowing for compensation for any distortion prior to welding and allowing such compensation to be accounted for in an associated jig (not shown). In addition, since the front and rear sleeves 124, 126 overlap the entire circumference of the left upper forward and rearward members 120, 122, the left upper forward and rearward members 120, 122 are able to be attached with a continuous lap weld which can provide more effective attachment than conventional cast components having partial sleeves for receiving frame members and thus only permitting partial lap welds. The frame assembly 46 is also shown to include a frame support 127 that is coupled to the upper wall 76 of the left upper interconnecting member 64, such as with welding for example.

Figure 9:
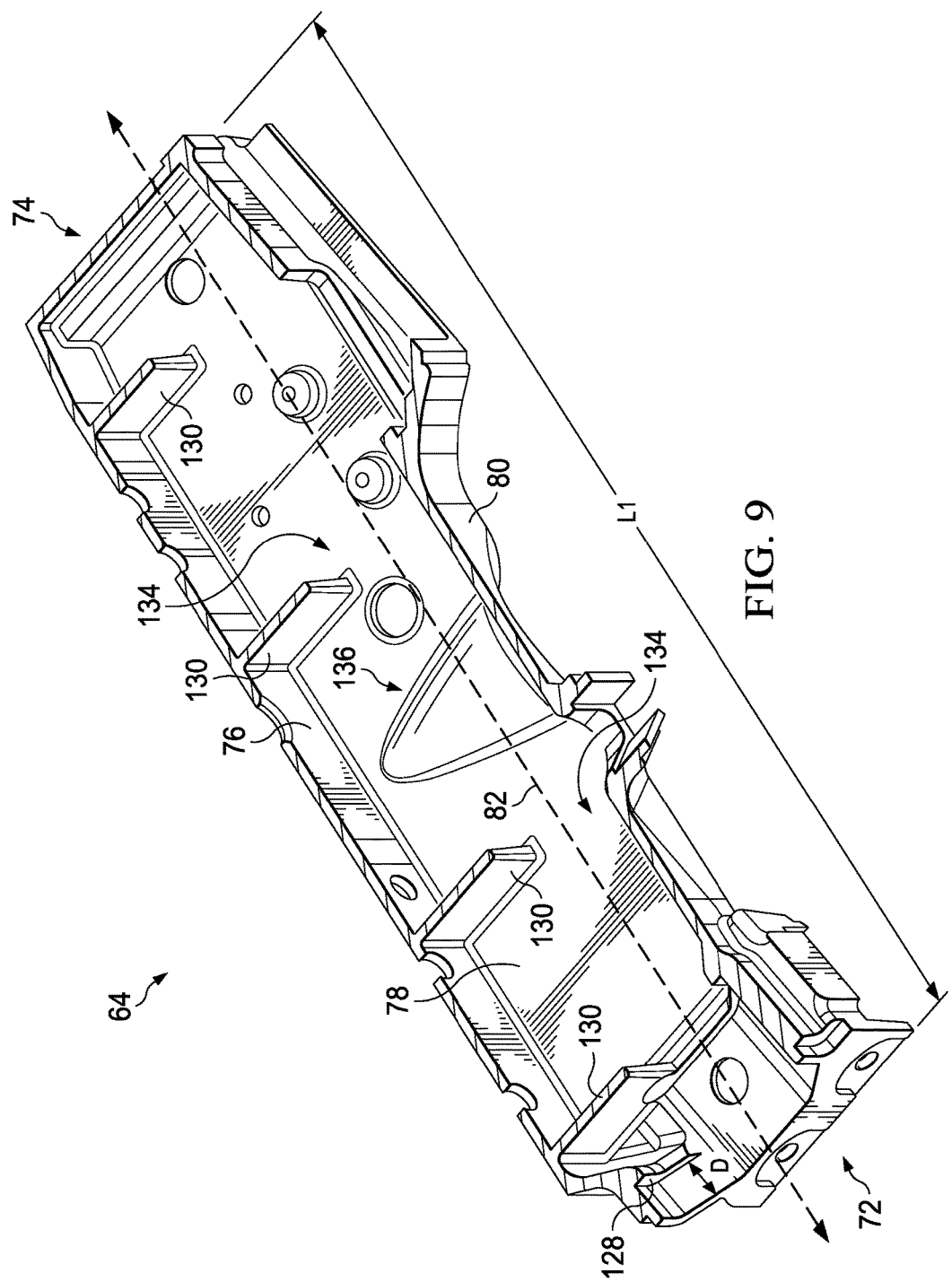
FIG. 9 is a cross-sectional view taken along the line 9-9 in FIG. 8.
Figure 10:
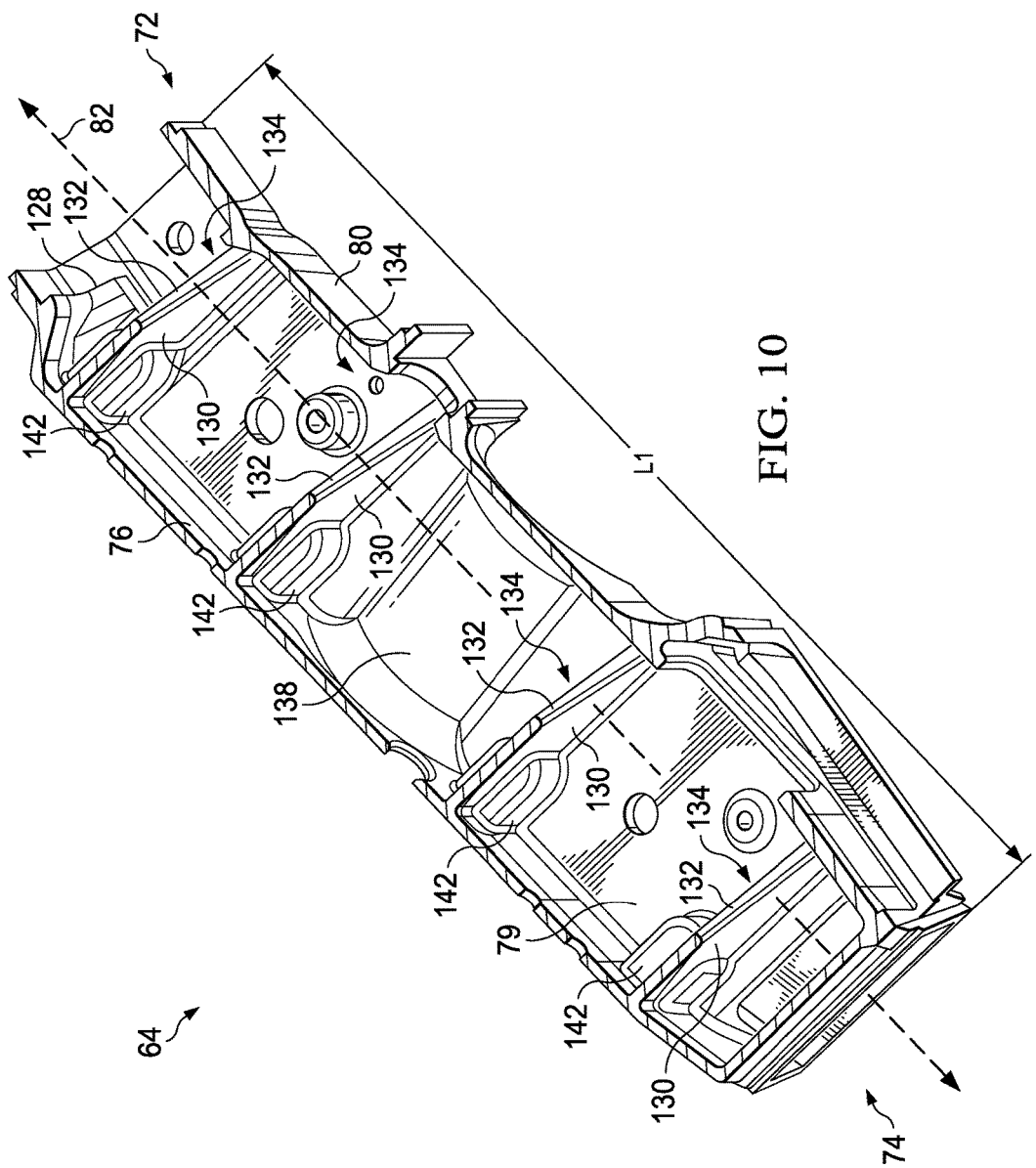
FIG. 10 is a cross-sectional view taken along the line 10-10 in FIG. 8.

Referring now to FIGS. 8-10, the front sleeve 124 of the left upper interconnecting member 64 can include a stop member 128 that extends from a portion of the upper wall 76 and into the front opening 84. The stop member 128 can be spaced from the front end 72 by a distance D and can selectively interact with the left upper forward member 120. The left upper forward member 120 can be spaced from the stop member 128 when the left upper forward member 120 is attached to the front sleeve 124. If the vehicle 40 is involved in a front end collision, and the lap weld between the left upper forward member 120 and the front sleeve 124 fails, the stop member 128 can interact with the left upper forward member 120 to prevent the left upper forward member 120 from sliding past the stop member 128 and too far into the left upper interconnecting member 64.

Figure 44:
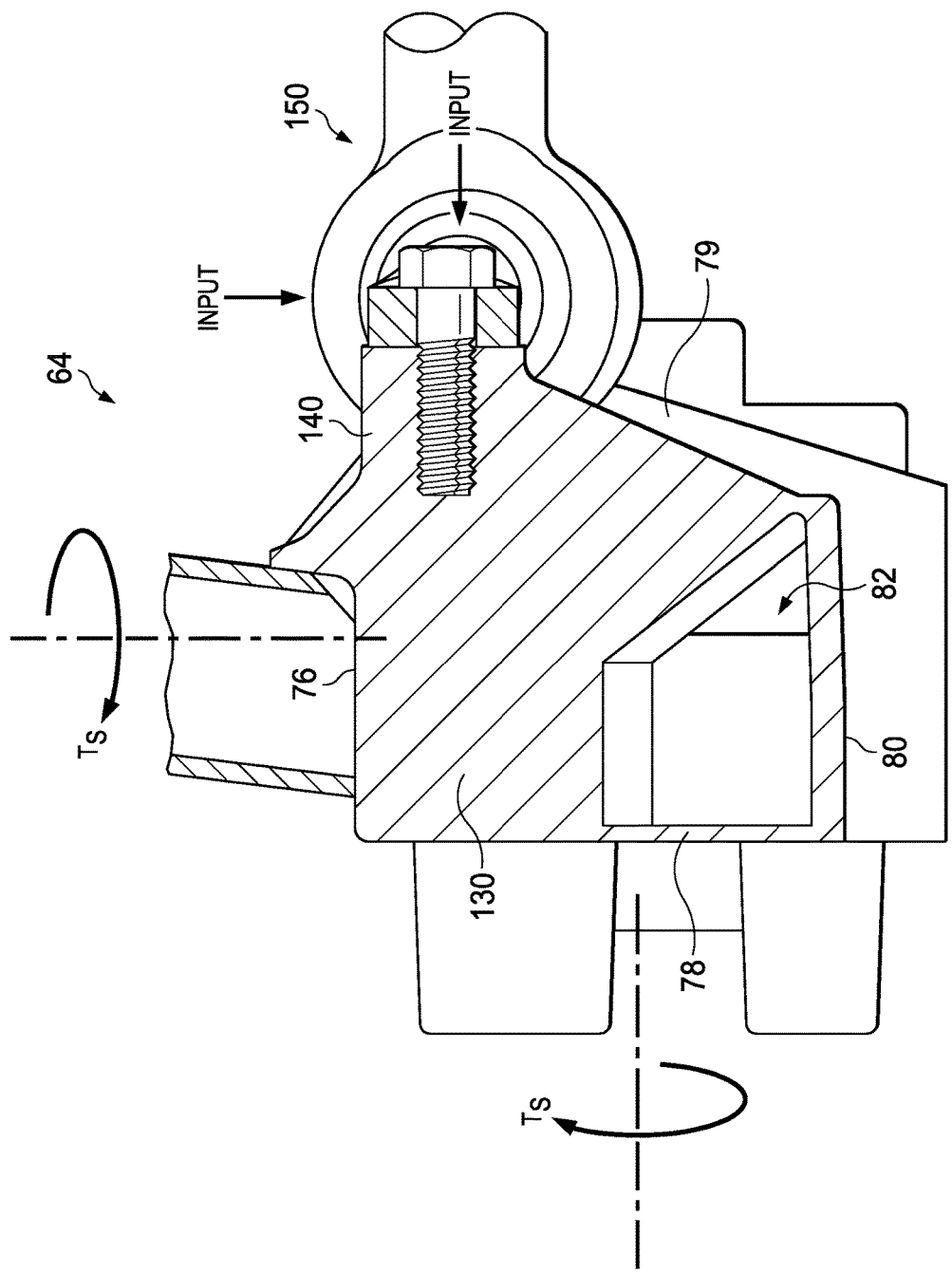
FIG. 44 is a cross-sectional view taken along the line 44-44 in FIG. 5.
Figure 45:
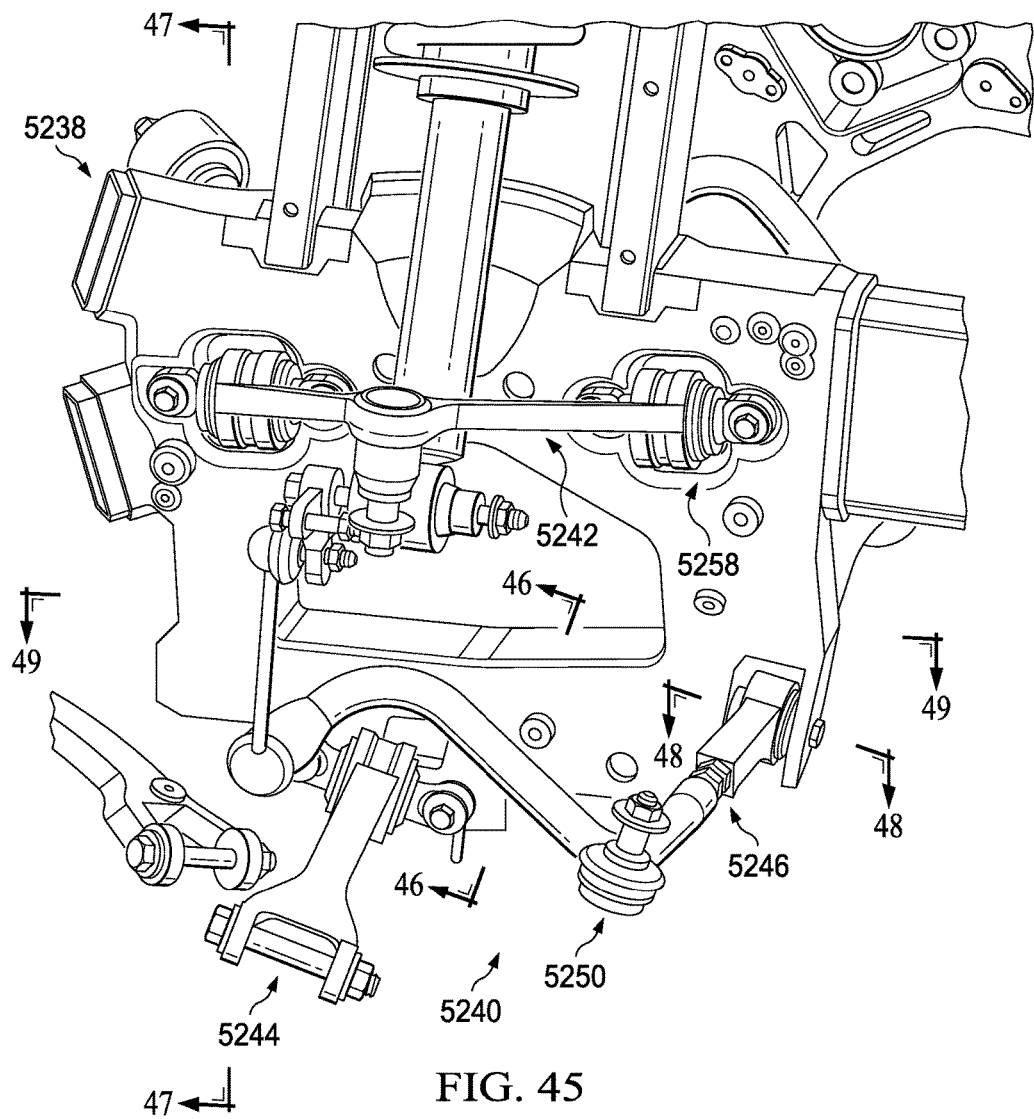
FIG. 45 is a perspective view depicting a left rear node of a frame assembly, according to another embodiment, the left rear node in association with a rear suspension assembly and various other components.

Still referring to FIGS. 8-10, the left upper interconnecting member 64 can include a plurality of reinforcements (or internal rib members) 130 that are located at various intervals along the length L1 of the left upper interconnecting member 64. The internal rib members 130 can enhance the overall structural rigidity of the left upper interconnecting member 64. Each of the internal rib members 130 can extend from the upper wall 76 and between the side walls 78 and 79. As illustrated in FIGS. 9, 10, and 44, a triangular shaped portion of each of the internal rib members 130 (identified as 132) can be spaced from a portion of each of the inboard side wall 78 and the lower wall 80 and can cooperate with the inboard side wall 78 and the lower wall 80 to define respective openings 134 through which the continuous passageway 82 is routed. It is to be understood, however, that the reinforcements 130 are not limited to such rib shapes or configurations. In an illustrative example, one or more reinforcements 130 may extend between the inboard and outboard walls 38, 39 and may be spaced apart from both the upper and lower walls 76, 80, or may contact both upper and lower walls 76 and 80 while maintaining the open passageway 82. In another illustrative example, vertical reinforcements (not shown) may extend between the upper and lower walls 76, 80 and may or may not contact one or both of the side walls 78, 79. Further, it is to be understood that the reinforcements 130 may include one or more ribs or other structures (not shown) that extend therebetween within the hollow chamber. In one embodiment, the internal rib members 130 can be cast together with the rest of the left upper interconnecting member 64 (e.g., as-cast as part of a one-piece construction). In another embodiment, the internal rib members 130 can be individually attached to the rest of the left upper interconnecting member 64 such as though welding, for example.

Figure 11:
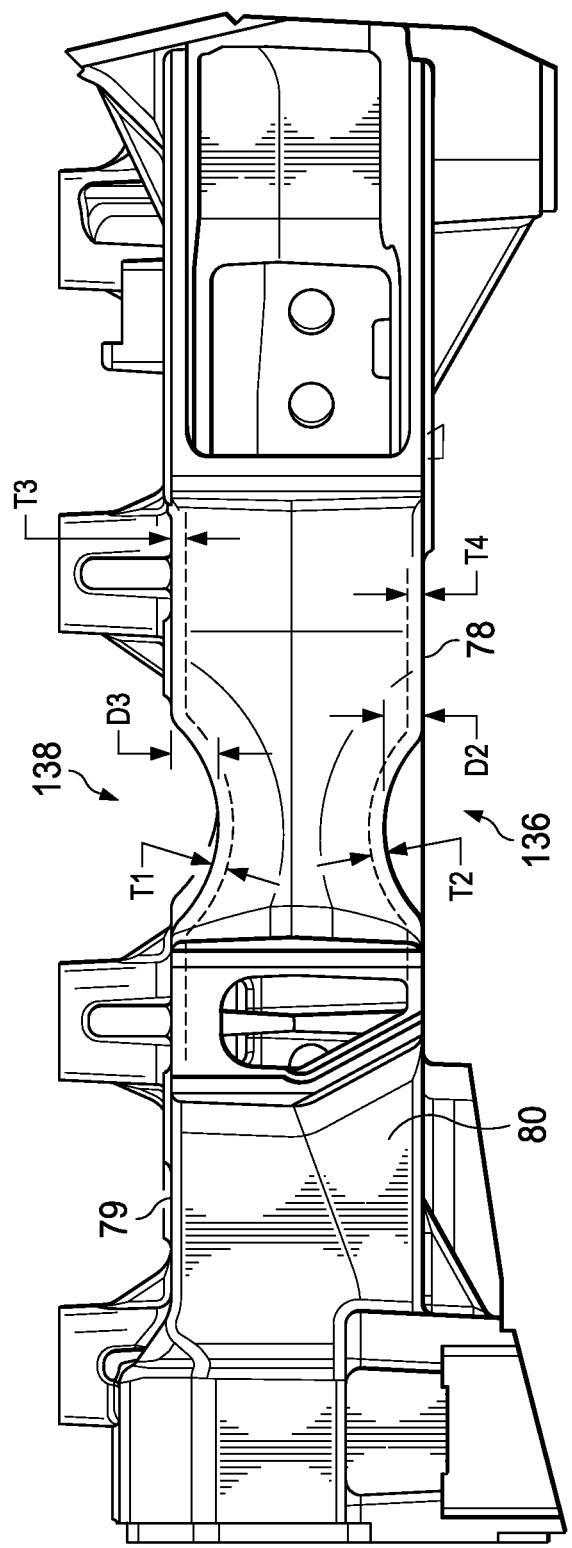
FIG. 11 is a lower plan view of the left upper interconnecting member of FIG. 6.

As illustrated in FIGS. 6-8, the left upper interconnecting member 64 can comprise one or more deformation features for absorbing energy from an impact to the front of the vehicle. In a non-limiting example, the deformation feature is an as-cast feature and may include an inner deformation feature 136 and an outer deformation feature 138 that cooperate to allow the left upper interconnecting member 64 to deform during a front end collision. The inner and outer deformation features 136, 138 can be grooves or recesses that are formed on opposing side walls 78, 79 of the left upper interconnecting member 64 and are substantially vertical. As illustrated in FIGS. 6, 9, and 11, the inner deformation feature 136 can be substantially U- or triangular shaped with the open end of the deformation feature 136 facing the lower wall 80 and can have a length L2 (FIG. 6), a height H2 (FIG. 6) and a depth D2 (FIG. 11). In one embodiment, the ratio of the greatest length L2 of the inner deformation feature 136 to the overall length L1 of the left upper interconnecting member 64 can be between about 1:5 and about 1:15, and preferably 1:9; the ratio of the height H2 of the inner deformation feature 136 to the overall height H1 of the left upper interconnecting member 64 can be between about 1:1 and about 1:2, and preferably about 1:1.25; and the ratio of the depth D2 of the inner deformation feature 136 to the overall depth D1 of the left upper interconnecting member 64 can be between about 1:3 and about 1:9, and preferably about 1:6.

The inner deformation feature 136 can be sloped such that its depth D2 and length L2 increases over its height H2 towards the lower wall 80. As illustrated in FIG. 7, the inner deformation feature 136 can extend along a centerline C2. In one embodiment, the inner deformation feature 136 can be sloped such that the angle of the centerline C2 relative to a horizontal plane is between about 6 degrees and about 10 degrees and more preferably about 8 degrees.

As illustrated in FIGS. 8, 10, and 11, the outer deformation feature 138 can be substantially uniformly arc or semi-circularly shaped and can have a length L3 (FIG. 8), a height H3 (FIG. 8) and a depth D3 (FIG. 11). In one embodiment, the ratio of the length L3 of the outer deformation feature 138 to the overall length L1 of the left upper interconnecting member 64 can be between about 1:4 and about 1:14, and preferably 1:8; the ratio of the height H3 of the outer deformation feature 138 to the overall height H1 of the left upper interconnecting member 64 can be between about 1:1 and about 1:2, and preferably about 1:1; and the ratio of the depth D3 of the outer deformation feature 138 to the overall depth D1 of the left upper interconnecting member 64 can be between about 1:3 and about 1:9, and preferably about 1:6. The outer deformation feature 138 can be oriented substantially vertically such that a centerline C3 (FIG. 8) of the outer deformation feature 138 is substantially vertical.

As illustrated in FIG. 11, each of the inner and outer deformation features 136, 138 can have a respective thickness T1, T2 and the side walls 78, 79 can each have a respective thickness T3, T4 at the areas adjacent to the inner and outer deformation features 136, 138, respectively. In one embodiment, the thicknesses T1, T2 of the inner and outer deformation features 136, 138 is substantially the same as the respective thicknesses T3, T4 of at least one, and in some embodiments both, of the areas adjacent to the inner and outer deformation features 136, 138. It is to be appreciated that the respective thicknesses T1, T2 of the inner and outer deformation features 136, 138 can additionally or alternatively be substantially the same as the thickness(es) of the upper wall 76 and/or the lower wall 80. It is also to be understood that the thicknesses T1, T2 may be the same or different, and that the thicknesses T1, T2 may be less than the thicknesses of T3, T4, and the upper and lower walls 79, 80. It is also to be understood that the deformation feature 136, 138 isn't limited to the shapes and configuration shown.

Referring again to FIG. 8, the left upper interconnecting member 64 can include one or a plurality of suspension mounts 140 located on the outboard wall 79 for attaching a suspension component to the interconnecting member 64. As illustrated in FIG. 10, each of the suspension mounts 140 can comprise an internal portion 142 that extends into corresponding ones of the internal rib members 130. Accordingly, the internal rib members 130 are located opposite the mounts 140. As illustrated in FIG. 5, the vehicle 40 can include a left suspension assembly 144 that includes an upper control arm 146 and a lower control arm 148. The upper control arm 146 can be releasably secured to each of the suspension mounts 140 with bolts 150 such that the left upper interconnecting member 64 supports the upper control arm 146. As shown in FIG. 44, when a load is imparted to the left upper interconnecting member 64 from the upper control arm 146 (e.g., during operation of the vehicle 40), the internal portions 142 of the suspension mounts 140 can cooperate with corresponding ones of the internal rib members 130 to transfer the load to the surrounding walls (e.g., the upper wall 76, the inboard wall 78 and the lower wall 80) thereby enhancing the distribution of load throughout the left upper interconnecting member 64. The upper control arm 146 can have a front leg 143 and a rear leg 147 (FIG. 5) and the deformation features 136, 138 may be positioned along the length of the left upper interconnecting member 64 between the legs 149, 151. However, the present disclosure isn't limited to such a configuration, as the deformation feature 136, 138 may be positioned farther forward or rearward along the interconnecting member 64 with respect to the attachment point or points for any suspension component secured to the interconnecting member or any other portion of the upper frame 65 of the front body structure 58.

The right upper interconnecting member 66 can be similar in many respects as the left upper interconnecting member 64 but can instead be provided on the right side of the vehicle 40 and is a mirror image of left interconnecting member 64. The right upper interconnecting member 66 can accordingly be coupled to the front lateral member 112 that is coupled at the other end to the left upper interconnecting member 64, the rear lateral member 114 that is coupled at the other end to the left upper interconnecting member 64, a front vertical support member 152 (FIG. 4) that is coupled at the other end to the right lower interconnecting member 70, a rear vertical support member 154 (FIGS. 3 and 4) that is coupled at the other end to the right lower interconnecting member 70, a right upper forward member 156 (FIG. 4), a right upper rearward member 158 (FIG. 2), and a member 121 (FIGS. 3 and 5) that is connected at the other end to the rear lateral member 114.

Figure 12:
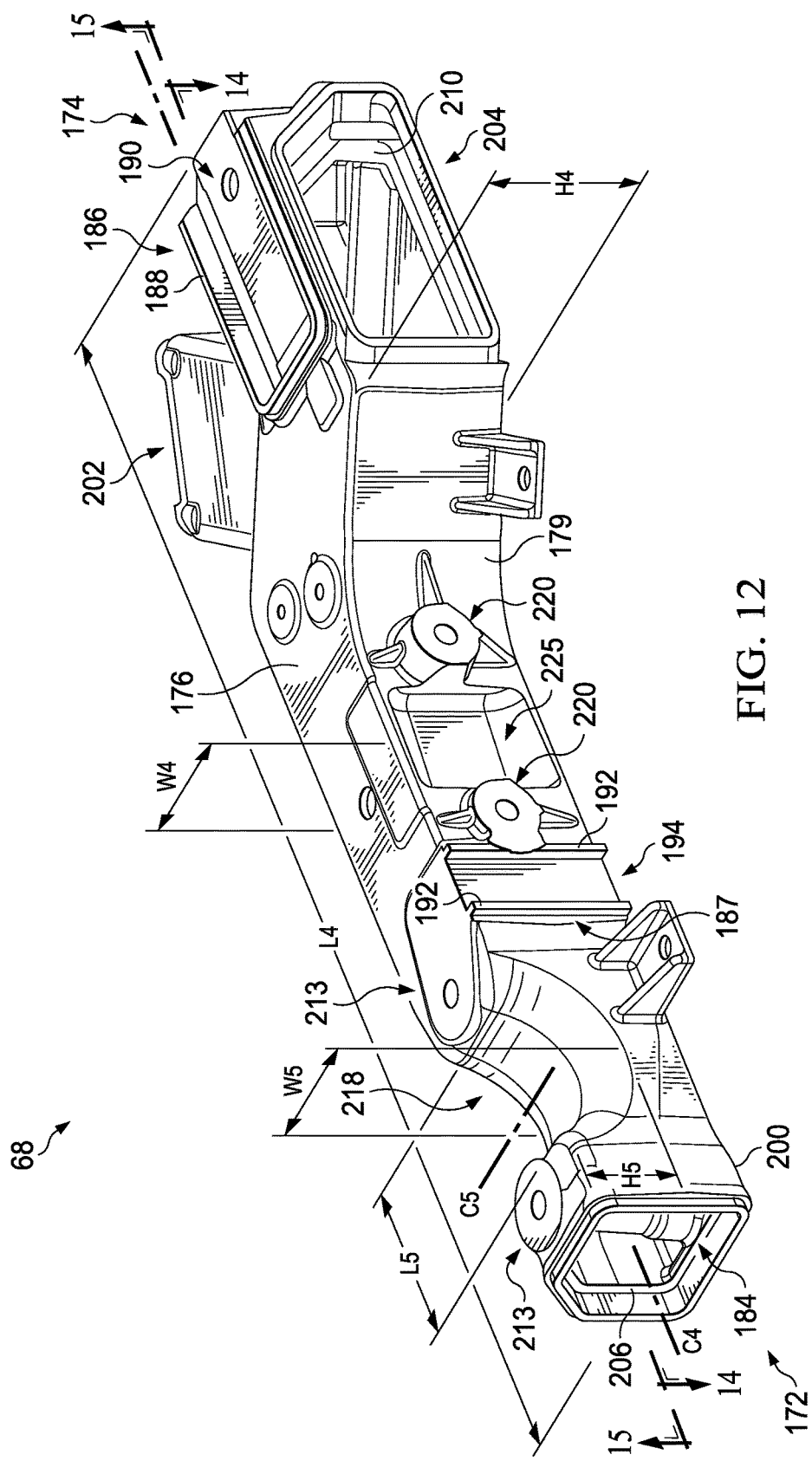
FIG. 12 is an upper front perspective view of a left lower interconnecting member of the frame assembly of FIG. 2, according to one embodiment.

Referring now to FIGS. 12-16, the left lower interconnecting member 68 is shown and will now be described in detail. The left lower interconnecting member 68 can extend between a front end 172 and a rear end 174 and can include an upper wall 176 (FIG. 12), an inboard side wall 178 and an outboard side wall 179 (FIGS. 12 and 13) that extend from the upper wall 176, and a lower wall 180 (FIG. 13) that extends between the side walls 178, 179. The upper wall 176 and the lower wall 180 are spaced from one another and the side walls 178, 179 are spaced from one another. As illustrated in FIG. 12, the left lower interconnecting member 68 can have a length L4, a width W4 (the distance between the side walls 178 and 179), and a height H4 (the distance between the upper wall 176 and the lower wall 180), and can have a centerline C4. The upper wall 176, the side walls 178, 179, and the lower wall 180 cooperate to define a continuous passageway 182 (FIG. 15) that extends between the front and rear ends 172, 174 and defines a front opening 184 (FIG. 12) and a rear opening 185 (FIG. 13) at the front and rear ends 172, 174, respectively. Similar to the continuous passageway 82 of the left upper interconnecting member 64 described above, the continuous passageway 182 can extend continuously through the left lower interconnecting member 68 such that the left lower interconnecting member 68 is hollow.

Referring now to FIG. 12, the left lower interconnecting member 68 can include a pair of coupling portions 186, 187 that are similar in many respects to the coupling portions 88, 90, 92, 94, 95 of the left upper interconnecting member 64. For example, the coupling portion 186 can include a wall member 188 that is substantially U-shaped and defines a recess 190. The coupling portion 187 can include a pair of wall members 192 that cooperate to define a slot 194. It is to be understood that the coupling portions 88, 92, 94, 95, 186, and 187 are not limited to such configurations and can be any of a variety of configurations for interacting with other vehicular components. The left lower interconnecting member 68 can also include a pair of steering assembly mounts 213 that are adjacent to a deformation feature 218. Referring again to FIGS. 3-5, the front vertical support member 116 and the rear vertical support member 118 can be coupled with the left lower interconnecting member 68 at the coupling portions 187, 186, respectively. Accordingly, the front vertical support member 116 is secured to the upper wall 176 and the outboard side wall 179 to rigidly fix the lower left interconnecting member 68 to the upper left interconnecting member 64. Further, the rear vertical support member 118 is secured to the upper wall 176 to rigidly fix the lower left interconnecting member 68 to the upper left interconnecting member 64.

Referring again to FIGS. 3-5 and 12, the frame assembly 46 can include a left lower forward member 196 and first and second left lower rearward members 198, 199 that are coupled with a front sleeve portion 200 and first and second rear sleeve portions 202, 204, respectively, such as with a continuous lap weld, for example.

Figure 14:
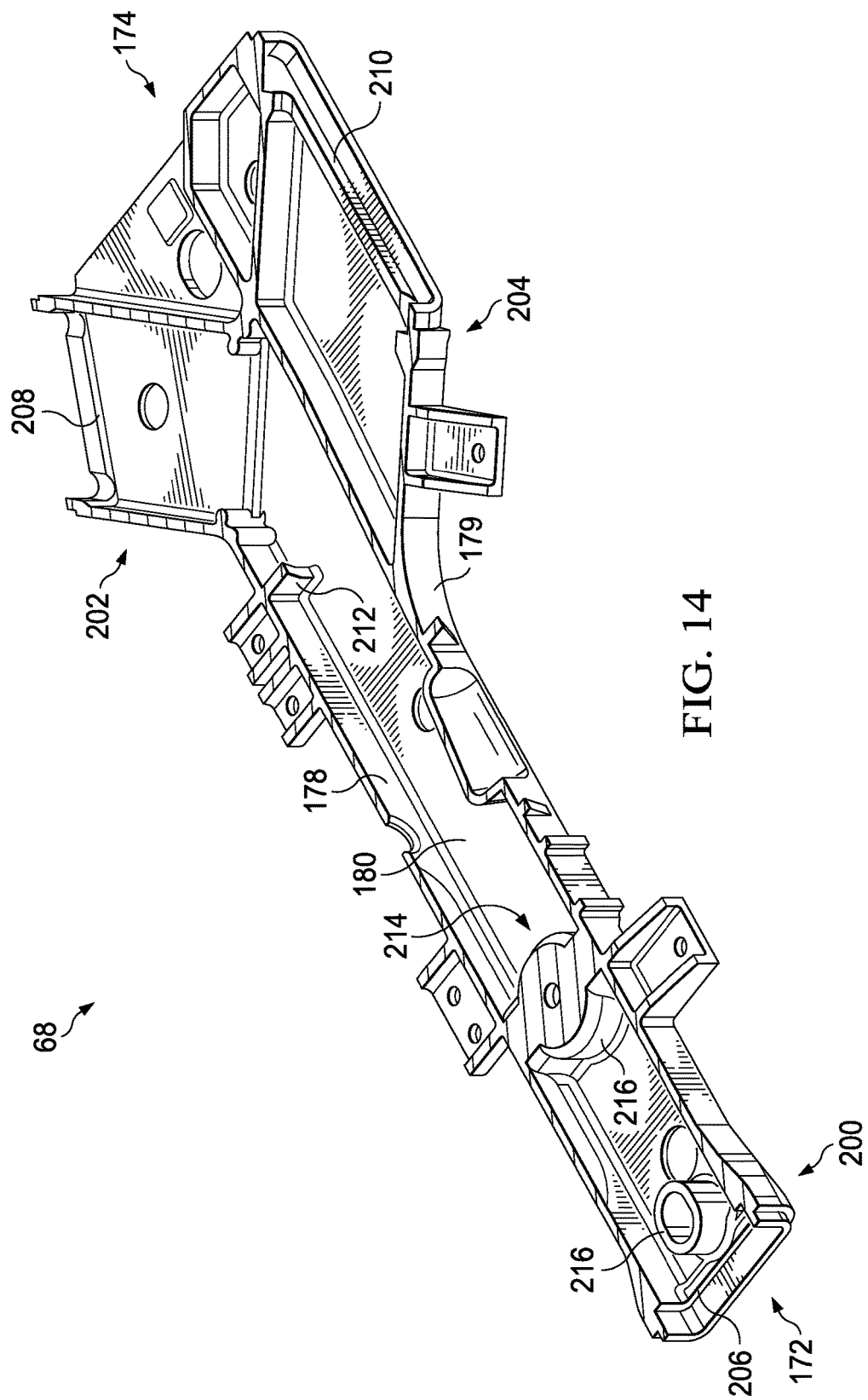
FIG. 14 is a cross-sectional view taken along the line 14-14 in FIG. 12.
Figure 15:
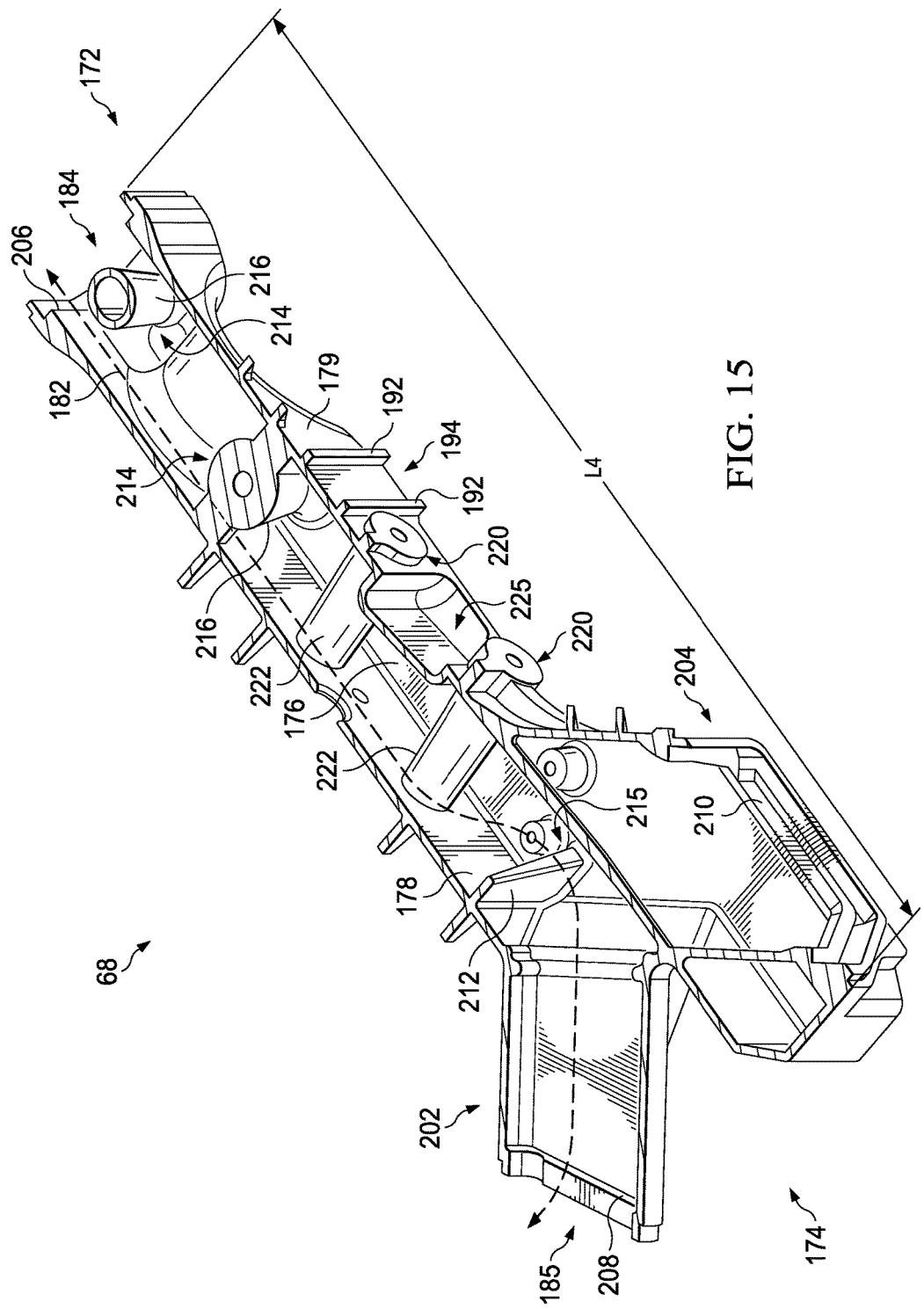
FIG. 15 is a cross-sectional view taken along the line 15-15 in FIG. 12.

Referring now to FIGS. 14 and 15, the front sleeve portion 200 of the left lower interconnecting member 68 can include a front stop member 206 and the first and second rear sleeve portions 202, 204 can include first and second rear stop members 208, 210 respectively, that are each similar to the stop member 128 of the left upper interconnecting member 64 shown in FIGS. 8 and 9.

Figure 13:
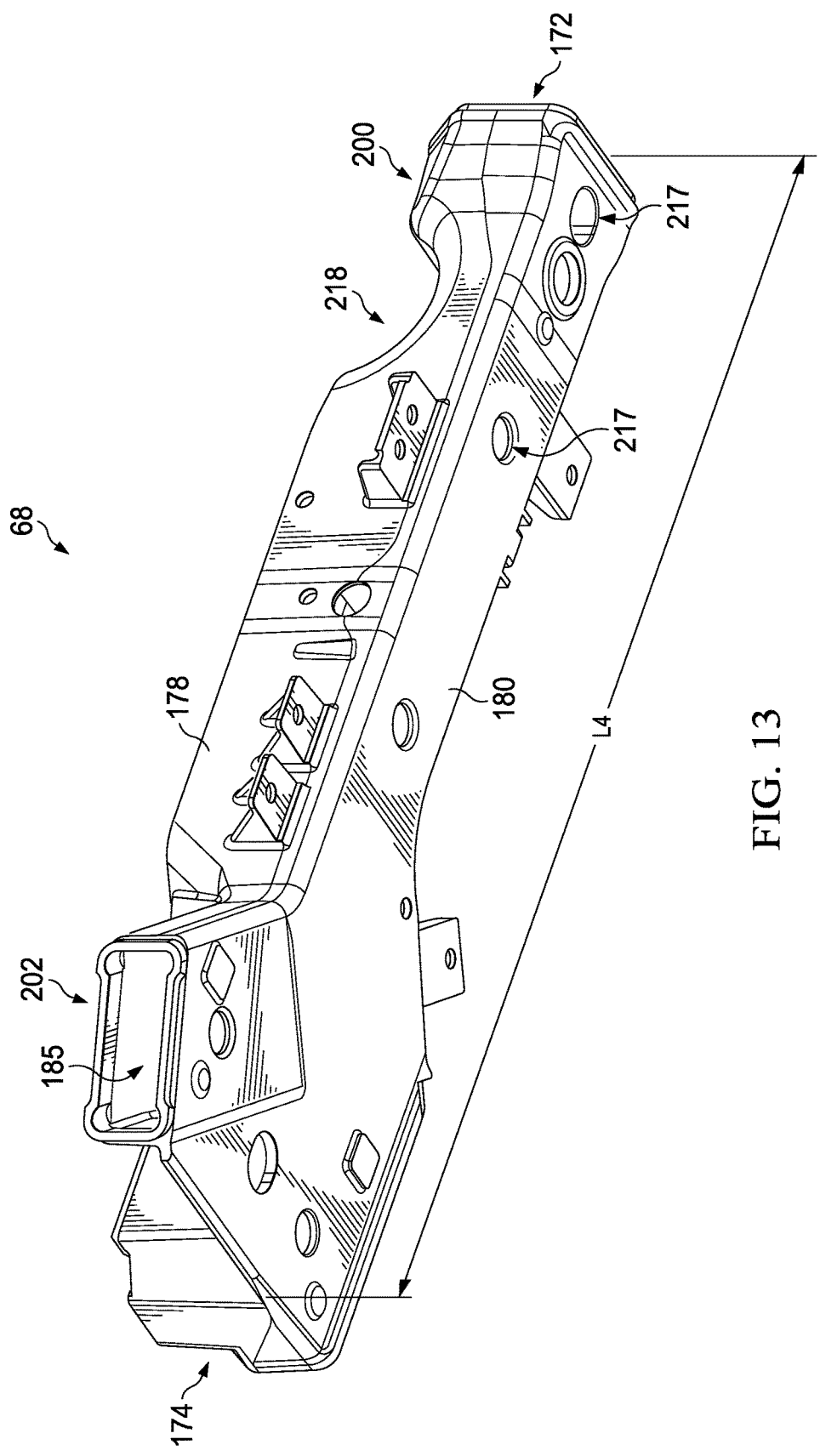
FIG. 13 is a lower rear perspective view of the left lower interconnecting member of FIG. 12.

Still referring to FIGS. 14 and 15, the left lower interconnecting member 68 can include one or more reinforcement members 212 and one or more reinforcement members 214 that are located at various intervals along the length L4 of the left lower interconnecting member 68 and can enhance the overall structural rigidity of the left lower interconnecting member 68. The reinforcement members 214 can form part of the steering assembly support mounts 213. In an illustrative example, the reinforcement member 212 can be a flat internal rib member that extends from one of the inboard side wall 178 and between the upper wall 176 and the lower wall 180. As illustrated in FIGS. 14 and 15, a portion of the flat internal rib member can be spaced from a portion of the outboard side wall 179 and can cooperate with the outboard side wall 179 and the lower wall 180 to define an opening 215. In an illustrative example, each of the reinforcement members 214 can be frustoconical or cylindrical rib members and can include an internal reinforcement portion 216 that extends between the upper and lower walls 176, 180 and is spaced from the side walls 178, 179. The continuous passageway 182 can accordingly be routed through the opening 215 and around the reinforcement members 214. In one embodiment, as illustrated in FIG. 13, the lower wall 180 can define a pair of recesses 217 that extends at least partially into the reinforcement members 214.

Figure 17:
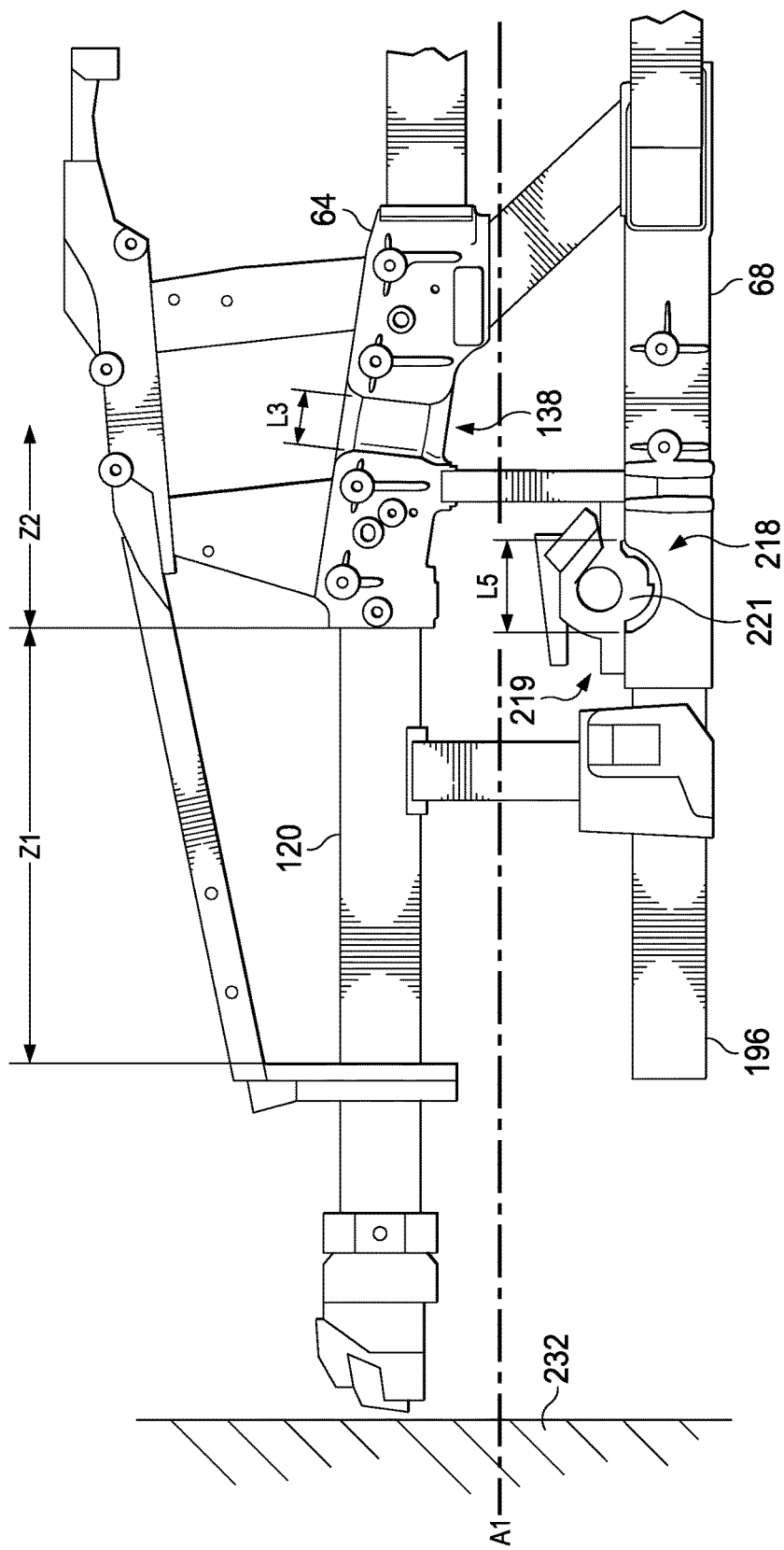
FIG. 17 is a side view depicting a front portion of the frame assembly of FIG. 2 prior to a collision with a wall.
Figure 19:
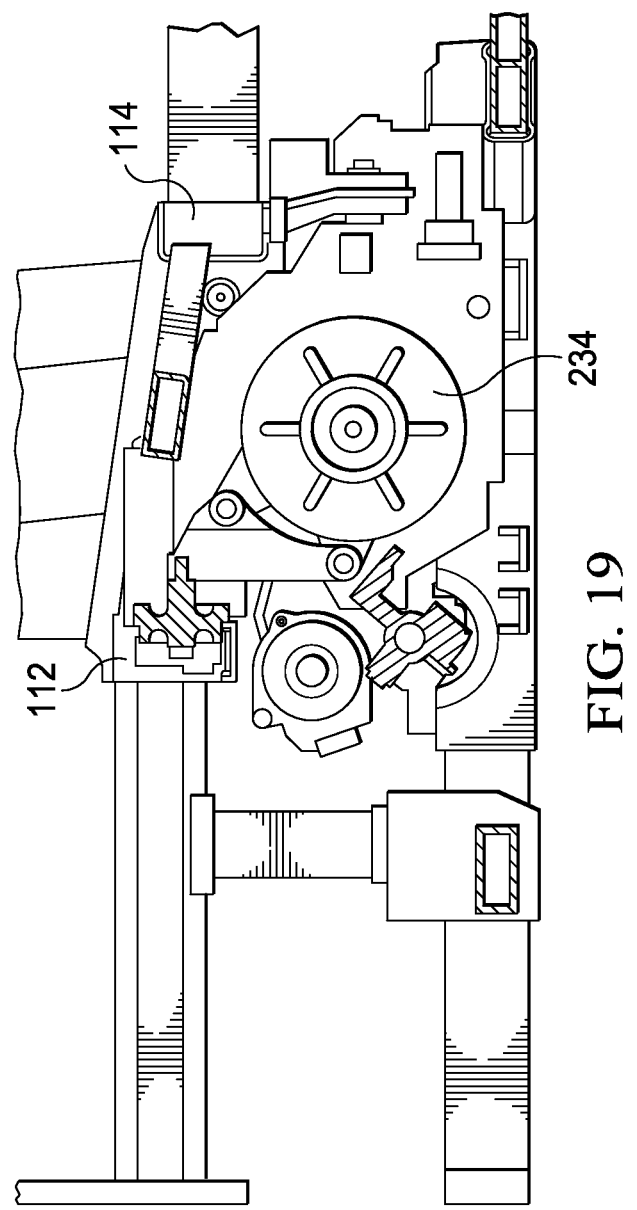
FIG. 19 is a side view depicting a front portion of the frame assembly of FIG. 2 with various other components of the vehicle depicted.

As shown in FIGS. 5, 17, and 19, a component of a steering assembly 219, such as a gear box 221, may be secured to the left lower interconnecting member 68 with one or more bolts that extend into the reinforcement members 214 such that the reinforcement members 214 cooperate to provide a gear box mount. The recesses 217 can be threaded to receive the bolt or can define respective passageways that extend through the left lower interconnecting member 68 that nuts can be threaded onto the bolts. As shown in FIGS. 5, 17, and 19, a portion of the steering assembly 219 can be positioned opposite or even received within the deformation feature 218. It is to be understood, however, that the steering assembly 219 is not required to be positioned at the deformation feature 218. In the event the steering assembly 219 is positioned along the left lower interconnecting member 68 away from the deformation feature 218, that portion of the left lower interconnecting member 68 may still be recessed to receive or otherwise be positioned opposite a portion of the steering assembly 219. Reinforcement members 214 may be positioned on opposite sides of the recess similar to that shown in FIG. 15. A reinforcement feature could be provided extending between the reinforcement members 214 to prevent the additional recess from functioning as a deformation feature.

Figure 41:
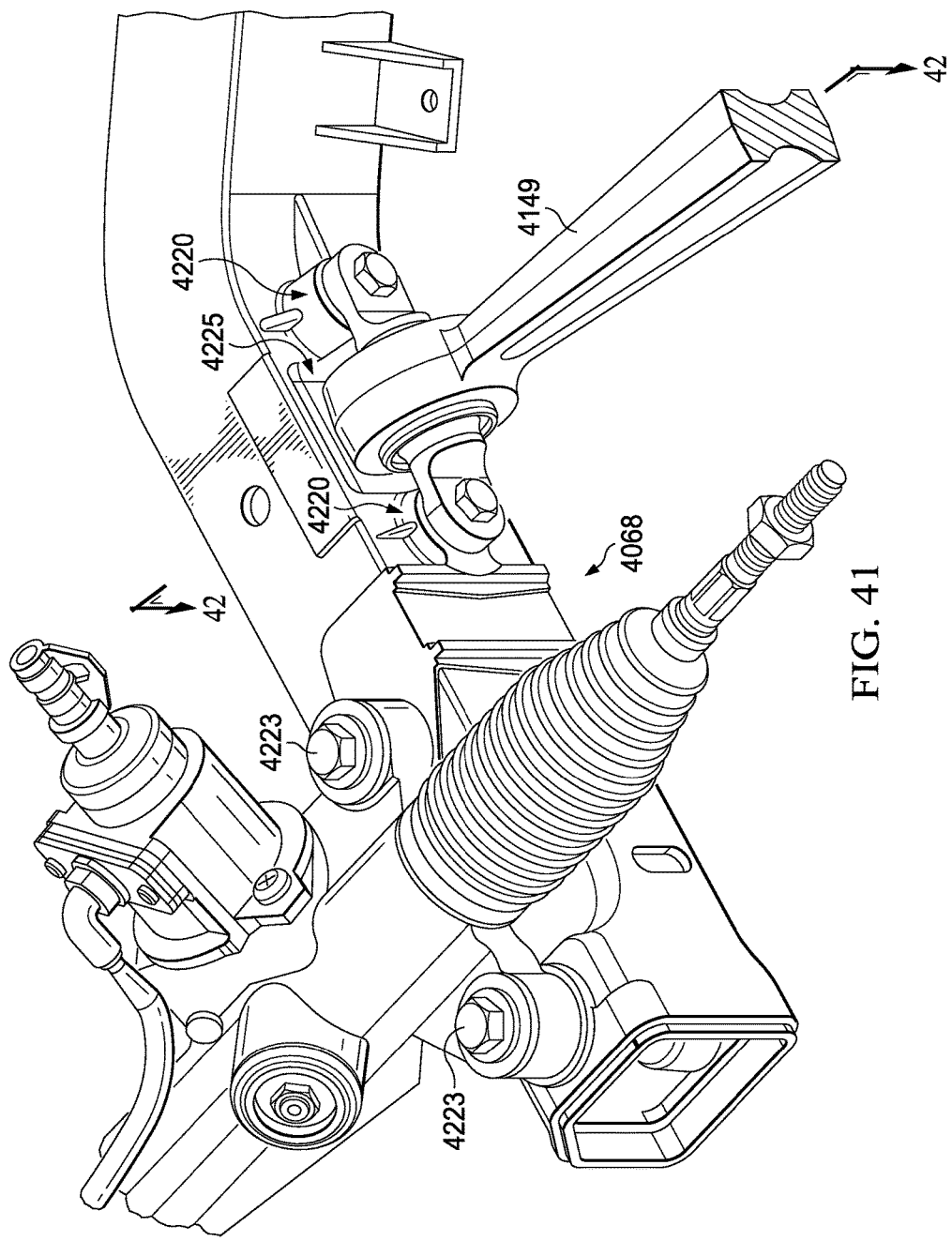
FIG. 41 is an upper perspective view depicting a left lower interconnecting member of a frame assembly, according to another embodiment, the left lower interconnecting member shown in association with various other components.
Figure 42:
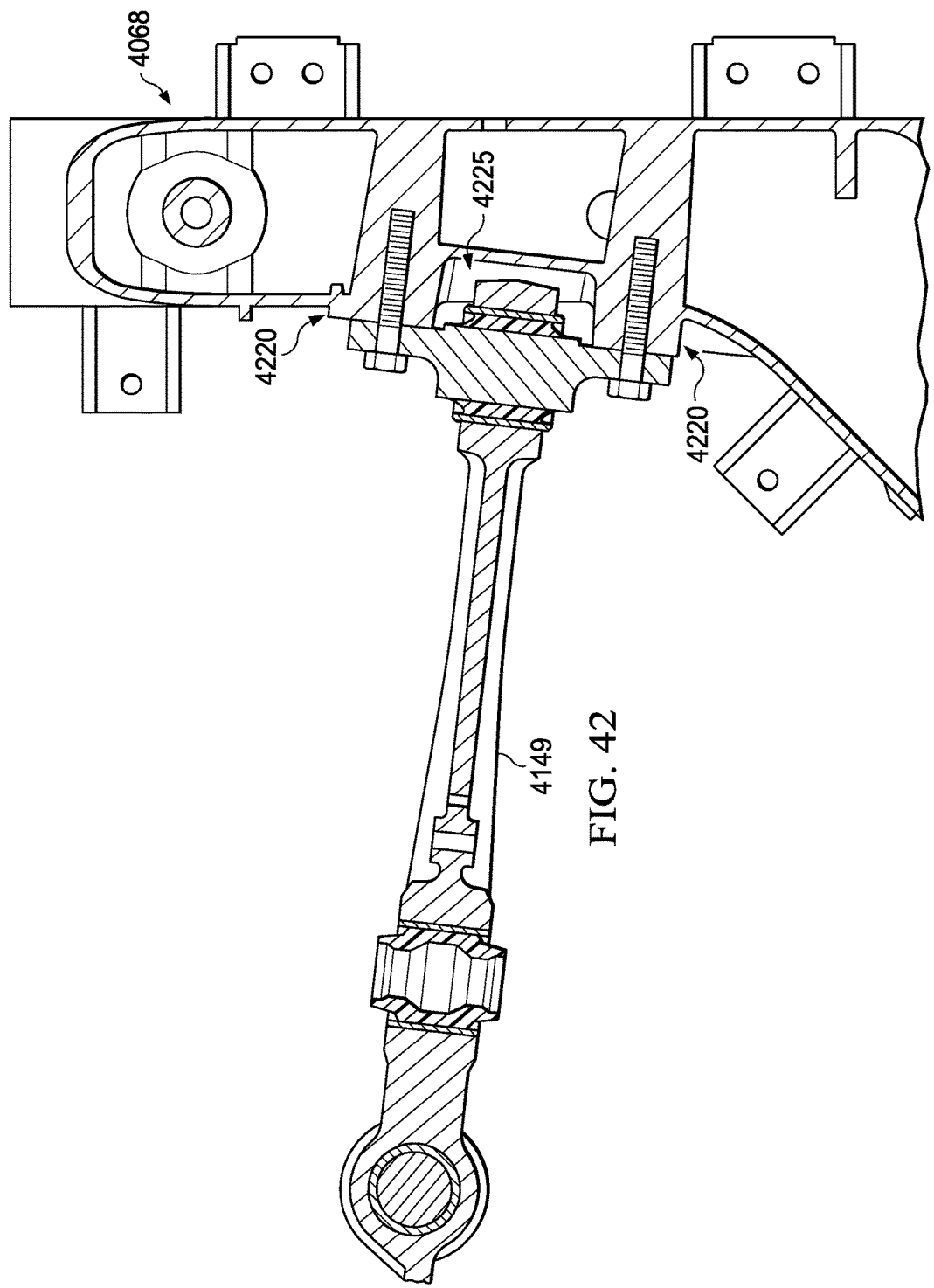
FIG. 42 is a cross-sectional view taken along the line 42-42 in FIG. 41.

An embodiment of a left lower interconnecting member 4068 is illustrated in FIGS. 37-42. The left lower interconnecting member 4068 is similar in many respects to the left lower interconnecting member 68 illustrated in FIGS. 1-19. For example, as illustrated in FIGS. 37-40, a gear box 4221 can be secured to the left lower interconnecting member 4068 with one or more bolts 4223 that are threaded and extend into internal reinforcement portions 4216 of the left lower interconnecting member 68. As illustrated in FIGS. 41-42, a leg 4149, such as a rear leg, of a lower control arm can be coupled with the left lower interconnecting member 4068. A portion of the leg 4149 can reside in a recess 4225 defined between a pair of suspension supports 4220.

Figure 16:
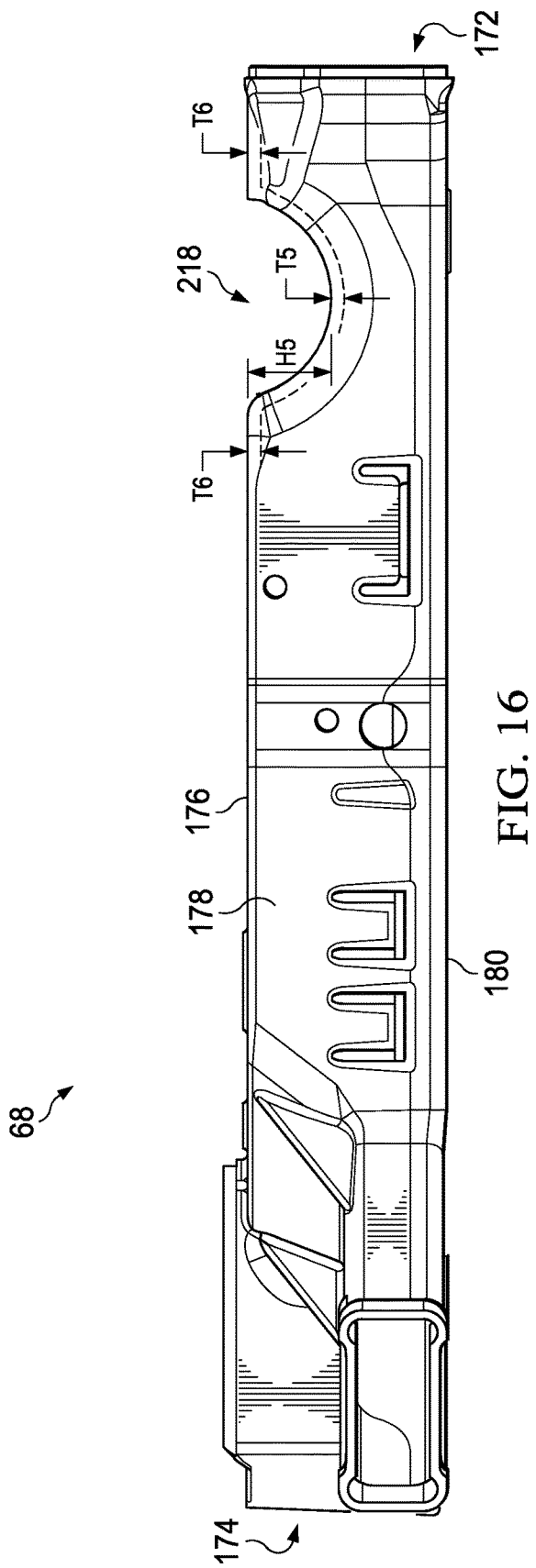
FIG. 16 is a side plan view of the left lower interconnecting member of FIG. 12.

As illustrated in FIGS. 12 and 16, the left lower interconnecting member 68 can comprise one or more lower deformation features 218 that allows the left lower interconnecting member 68 to deform during a front end collision. The lower deformation feature 218 can be a substantially horizontal groove or recess that is formed on the upper wall 176 and side walls 178, 179 of the left lower interconnecting member 68. As illustrated in FIG. 12, the lower deformation feature 218 can be substantially U-shaped and can have a length L5, a width W5 and a height H5 (FIG. 16). In one embodiment, the ratio of the greatest length L5 of the lower deformation feature 218 to the overall length L4 of the left lower interconnecting member 68 can be between about 1:5 and about 1:15, and preferably 1:8, and the ratio of the height H5 of the lower deformation feature 218 to the overall height H4 of the left lower interconnecting member 68 can be between about 1:1.5 and about 1:3, and preferably about 1:2. As illustrated in FIG. 12, the lower deformation feature 218 can extend along a centerline C5. In one embodiment, the lower deformation feature 218 can be oriented substantially vertically such that the centerline C5 is substantially vertical.

As illustrated in FIG. 16, the lower deformation feature 218 can have a thickness T5 and the upper wall 176 can have a thickness T6 at the areas adjacent to the lower deformation feature 218. In one embodiment, the thickness T5 of the lower deformation feature 218 is substantially the same as the thickness T6 of at least one, and in some embodiments both, of the areas adjacent to the lower deformation feature 218. It is to be appreciated that the respective thickness T5 of the lower deformation feature 218 can additionally or alternatively be substantially the same as the thickness(es) of one of the side walls 178. In one embodiment, the thickness T5 of the lower deformation feature 218 is less than the thickness T6 of both the areas adjacent to the lower deformation feature 218.

Figure 43:
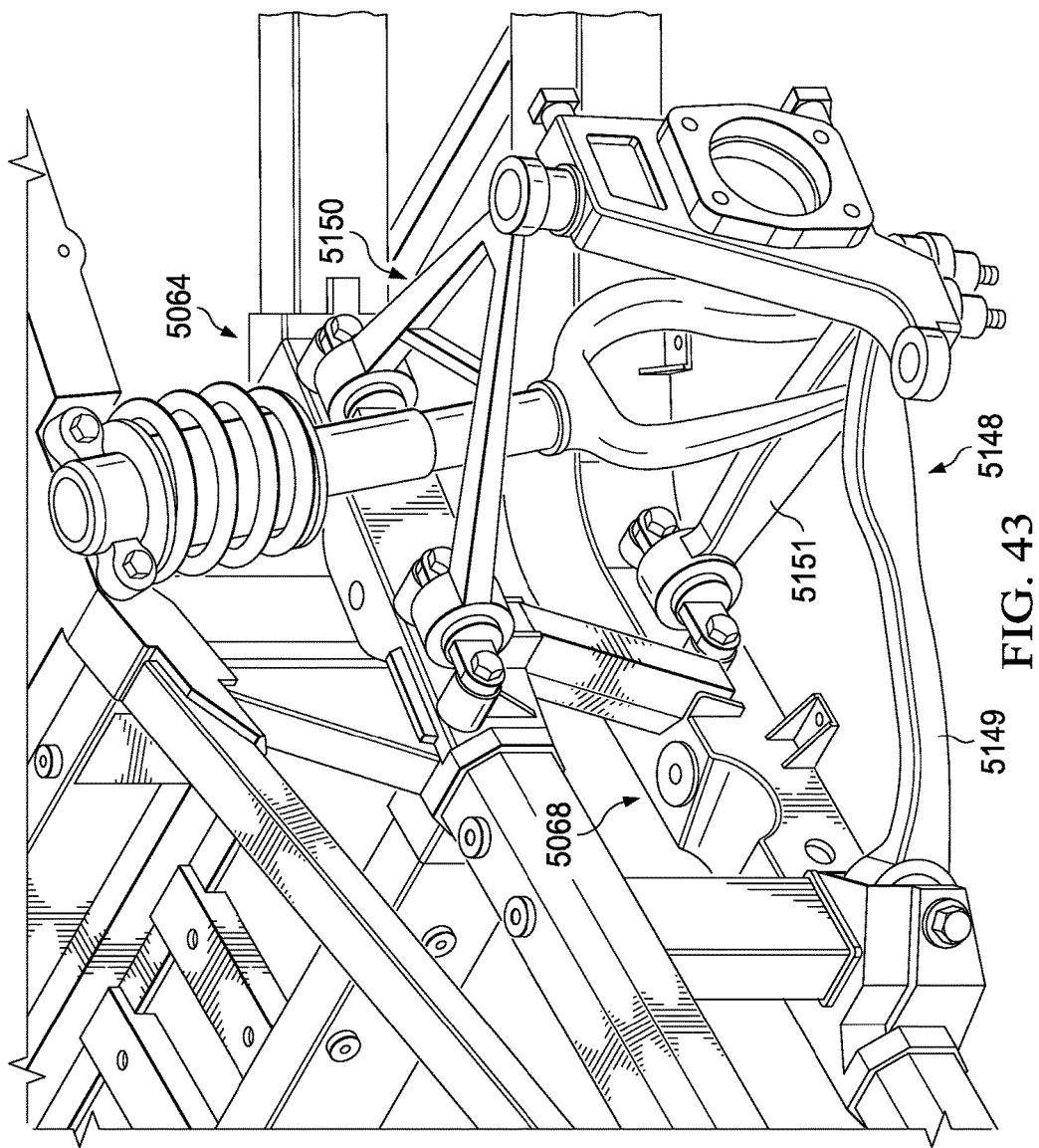
FIG. 43 is an upper left perspective view depicting a portion of a front body structure of a frame assembly, according to another embodiment, the left lower interconnecting member shown in association with various other components.

Referring again to FIGS. 12 and 15, the left lower interconnecting member 68 can include one or a plurality of suspension mounts 220 located thereon. In a non-limiting example, the suspension mounts 220 are located on the outboard side wall 179. As illustrated in FIG. 15, each of the suspension mounts 220 comprise an internal reinforcement portion 222 that is positioned opposite the suspension mounts 220 and extends to the opposing inboard side wall 178. The suspension mounts can 220 can be configured to support one or more of the legs 149, 151 of the lower control arm 148. In one embodiment, as illustrated in FIG. 5, the rear leg 151 of the lower control arm 148 of the left suspension assembly 144 can be releasably secured to each of the suspension mounts 220 with bolts 224. The front leg 149 can be releasably secured to another part of the lower frame 67 (e.g., apart from the left lower interconnecting member 68). The left upper and lower interconnecting members 64, 68 can accordingly cooperate to support at least a portion of the left suspension assembly 144. When a load is imparted to the left lower interconnecting member 68 from the lower control arm 148 (e.g., during operation of the vehicle 40), the internal reinforcement portions 222 of the suspension mounts 220 can cooperate with the opposing inboard side wall 178, thereby enhancing the distribution of load throughout the left lower interconnecting member 68. Although only the rear leg 151 of the lower control arm 148 is shown as being secured to the left lower interconnecting member 68, it is to be understood that both the forward and rearward portion of the lower control arm 148 may be secured to the lower interconnecting member 68. For example, an alternative embodiment of left upper and lower interconnecting members 5064, 5068 are illustrated in FIG. 43. The left upper and lower interconnecting members 5064, 5068 are similar to, or the same in many respects as, the left upper and lower interconnecting members 64, 68 of FIGS. 1-19. However, both front and rear legs 5149, 5151 can be attached to the lower interconnecting member 5064 (e.g., via four suspension mounts). Similar to the embodiment shown in FIG. 44, this arrangement can impart a torsional stiffness (Ts) that resists a bending of the interconnecting member normal to a force imparted from the suspension.

As shown in FIGS. 12 and 15, a recess 225 can be provided in the outboard side wall 179 to receive at least a portion of the control arm 148 therein. As shown in FIG. 15, the recess 225 extends into the left lower interconnecting member 68 between the reinforcement portions 222. Although the suspension mounts 220 are shown as positioned outside of the recess 225, they are not limited to such a configuration and may be provided in a recessed portion of an outboard side wall. Accordingly, one or more reinforcement portions may be provided that extend inside the left lower interconnecting member 68 from the recess to the inboard side wall 178 (e.g., reinforcement 5252 of rear node 5236 in FIG. 46).

The right lower interconnecting member 70 can be similar in many respects as the left lower interconnecting member 68 but can instead be provided on the right side of the vehicle 40 and is thus a mirror image of the left lower interconnecting member 68. As illustrated in FIGS. 2-5, the right lower interconnecting member 70 can accordingly be coupled with the front vertical support member 152, the rear vertical support member 154, a right lower forward member 226, a pair of right lower rearward members 228, 250, and lower rear lateral member 1500 (shown in FIG. 21).

The left and right upper interconnecting members 64, 66 and the left and right lower interconnecting members 68, 70 can be formed as an as-cast one-piece construction. It will be appreciated that any component described herein as "as-cast," (e.g., the left and right upper interconnecting members 64, 66 and the left and right lower interconnecting members 68, 70) should be understood to mean that the member is cast by providing a molten metal material such as an aluminum alloy or iron into a mold, allowing the molten material to cure, and subsequently removing the mold. Once the as-cast product is removed from the mold, the features, such as the reinforcements, the deformation features, the continuous passageway, the coupling members, and the suspension support, for example are present on the member. In some embodiments, further treatment, such as welding or molding, should not be necessary to achieve a hollow component defining a continuous passageway. Furthermore, components described as "as-cast," should be understood to include any enhancements that enables the structure to be suitable for a particular purpose, such as machining holes or threaded recesses, polishing, or etching of the as-cast structure. One example of such an enhancement is the apertures 1097 illustrated in FIGS. 20-24. In one embodiment, the left and right upper interconnecting members 64, 66 and the left and right lower interconnecting members 68, 70 can be formed from an aluminum alloy using a casting process described in U.S. Pat. Nos. 7,216,691, 7,165,600, and U.S. Patent Application Publication No. 2008/0041499.

The casting process described in U.S. Pat. Nos. 7,216,691, 7,165,600, and U.S. Patent Application Publication No. 2008/0041499 (e.g., a form of sand casting) generally involves forming an aggregate mold (e.g., sand mold) having a mold cavity from which a cast article (e.g., aluminum alloy casting) can be formed. A molten metal or metal alloy can be placed in the mold cavity of the aggregate mold and a fluid can substantially remove (e.g., decompose) the aggregate mold leaving behind the solidified cast article. In certain embodiments, a fluid can be an aqueous solvent. Forming a vehicular component in this manner can provide more effective cooling rates than conventional methods and can also facilitate directional solidification that results in a more highly refined overall structure. The solvent can be applied to the aggregate mold in a number of suitable methods, including via a spraying device. In one embodiment, aggregate compositions suitable for use with a mold tool can be formed from an aggregate and a binder. The binder can serve as a catalyst for the aggregate such that the mixture of the aggregate and binder catalyzes into a solid when exposed to a reactant, such as, for example, heat, air, vacuum, light, or water. In certain embodiments, suitable binders can include inorganic binders such as water-soluble phosphate or silicate-based binders, such as phosphate glass. The aggregate can include a single sand type, such as silica sand, or a mixture of several different types of sand based on the desired surface qualities of the final casted item. Suitable aggregate compositions and process conditions associated with such a casting process are further described in U.S. Pat. Nos. 7,216,691, 7,165,600, and U.S. Patent Application Publication No. 2008/0041499, all three of which are hereby incorporated herein by reference in their entirety. It is to be appreciated that a mold can be formed from any of a variety of suitable alternative materials. Forming a vehicular component using this process can provide a hollow, as-cast structure that is larger and more lightweight than conventional nodes. As a result, the vehicular component can be more effective to absorb energy in deformation areas than conventional as-cast arrangements.

While various metal or metal alloy castings can be heat treated to form desired cast articles, the use of aluminum-based castings is of particular interest in a variety of manufacturing environments because aluminum is generally lighter in weight and less expensive than other metal-based castings. As such, aluminum-based materials for the cast hollow interconnecting members described herein are contemplated. Such aluminum-based materials to form castings can include pure aluminum or aluminum alloys. Aluminum alloys generally include such alloys that have the primary constituent being aluminum. A variety of aluminum alloys can be employed as castings as described herein. For example, aluminum alloys can include 100 series aluminum alloy, 200 series aluminum alloy, 300 series aluminum alloy, 400 series aluminum alloy, 500 series aluminum alloy, 700 series aluminum alloy, 800 series aluminum alloy, 900 series aluminum alloy, 1000 series aluminum alloy, 2000 series aluminum alloy, 3000 series aluminum alloy, 4000 series aluminum alloy, 5000 series aluminum alloy, 6000 series aluminum alloy, 7000 series aluminum alloy or 8000 series aluminum alloy. In one embodiment, a casting can be formed from aluminum alloy 6061. The castings may be cast using the casting process described in U.S. Pat. Nos. 7,216, 691, 7,165,600, and U.S. Patent Application Publication No. 2008/0041499 and heat treated. In a non-limiting example, the castings are T6 heat treated. The castings can also include additives, including but not limited to, strontium, titanium, and boron.

It will be appreciated that, once the casting of the hollow interconnecting member is complete, various finishing processes, such as deflashing, degating, and/or finish machining (e.g., computer numerical control (CNC) machining) can be performed on the as-cast hollow interconnecting member to prepare it for installation on the vehicle 40.

As illustrated in FIG. 17, the front forward members (120 and 196 shown) and the interconnecting members (64, 68 shown) can be positioned to absorb impact energy from a front end collision with another object, such as a wall 232, thereby diverting impact energy away from the passenger compartment 62. During a front impact collision, the front forward members 120, 156, 196, 226 can deform or crush axially to absorb the initial impact energy of the collision and the interconnecting members 64, 66, 68, 70 can bend to deform/and or break to absorb any additional impact energy. The amount of impact energy imparted to the vehicle 40 during a front end collision can affect the extent to which the front forward members 120, 156, 196, 226 and/or the interconnecting members 64, 66, 68, 70 are crushed/deformed (e.g., the stroke or crush distance). In a non-limiting example, the forward members 120, 156, 196, 226 deform before (and/or at a lower impact force) the interconnecting member 64, 66, 68, 70 deform in response to a front end collision. For example, for a low impact energy collision, such as a collision with the wall 232 below a first forward speed, the front forward members 120, 156, 196, 226 can be crushed to absorb enough of the impact energy to prevent impact energy from deforming the interconnecting members 64, 66, 68, 70. For a relatively higher impact energy collision, such as a collision with the wall 232 above the first forward speed, the front forward members 120, 156, 196, 226 might be insufficient to absorb all of the impact energy such that the interconnecting members 64, 66, 68, 70 deform/crush to absorb some of the impact energy once the front forward members 120, 156, 196, 226 deform/crush.

The interconnecting members 64, 66, 68, 70 can be configured to absorb more front impact energy than the front forward members 120, 156, 196, 226 such that more front impact energy can be diverted away from the passenger compartment 62 as the point of impact (e.g., the wall) draws nearer to the passenger compartment. In one embodiment, the interconnecting members 64, 66, 68, 70 can be configured to absorb about 50% more impact energy than the front forward members 120, 156, 196, 226. In such an embodiment, the front forward members 120, 156, 196, 226 can be a stamped member or an extruded member (e.g., formed through an extrusion molding process) formed of any of a variety of suitable materials such as, for example, an aluminum alloy that is similar to or the same as the aluminum alloy of the interconnecting members 64, 66, 68, 70 or a ferrous material (e.g., steel). The front forward members 120, 156, 196, 226 and the interconnecting members 64, 66, 68, 70 can accordingly define a first collision zone Z1 and a second collision zone Z2 having different impact energy absorption characteristics. In one embodiment, the first collision zone Z1 can be characterized as an axial crush zone and the second collision zone Z2 can be characterized as a bend mode zone. In one embodiment, the first collision zone Z1 is designed to deform before the second collision zone Z2. In a non-limiting example, deformation of the first collision zone Z1 occurs at a lower impact energy than that required to deform the second collision zone Z2. In some embodiments, certain areas of the interconnecting members 64, 66, 68, 70 can be about the same thickness as the front forward members 120, 156, 196, 226, such as, for example, between about 3 mm and about 4 mm.

The interconnecting members have high ductility which allows for a shorter overall length since deformation in the interconnecting members is encouraged and controlled rather than extending the front forward members 120, 156, 196, 226. The interconnecting members can also be the reference points for the front body structure 58 that manages weld heat distortion (e.g., due to MIG welding) and thus encourages accuracy of the chassis installation points.

The interconnecting members can facilitate a single or a dual crash load path concept and can be developed using modeling that incorporates shell and volume methods to evaluate the deformation mode (e.g., CAE modeling). It is to be appreciated that the shapes and features of the interconnecting members can be selected/tuned to meet a desired deformation mode and/or target loads to manage a frontal crash event. The controlled deformation of the upper load path via the upper interconnecting members and the controlled break of lower load path via the lower interconnecting members can maximize the available crash stroke while reducing the overall length of the front body structure 58 (pre-collision) relative to conventional arrangements.

Figure 18:
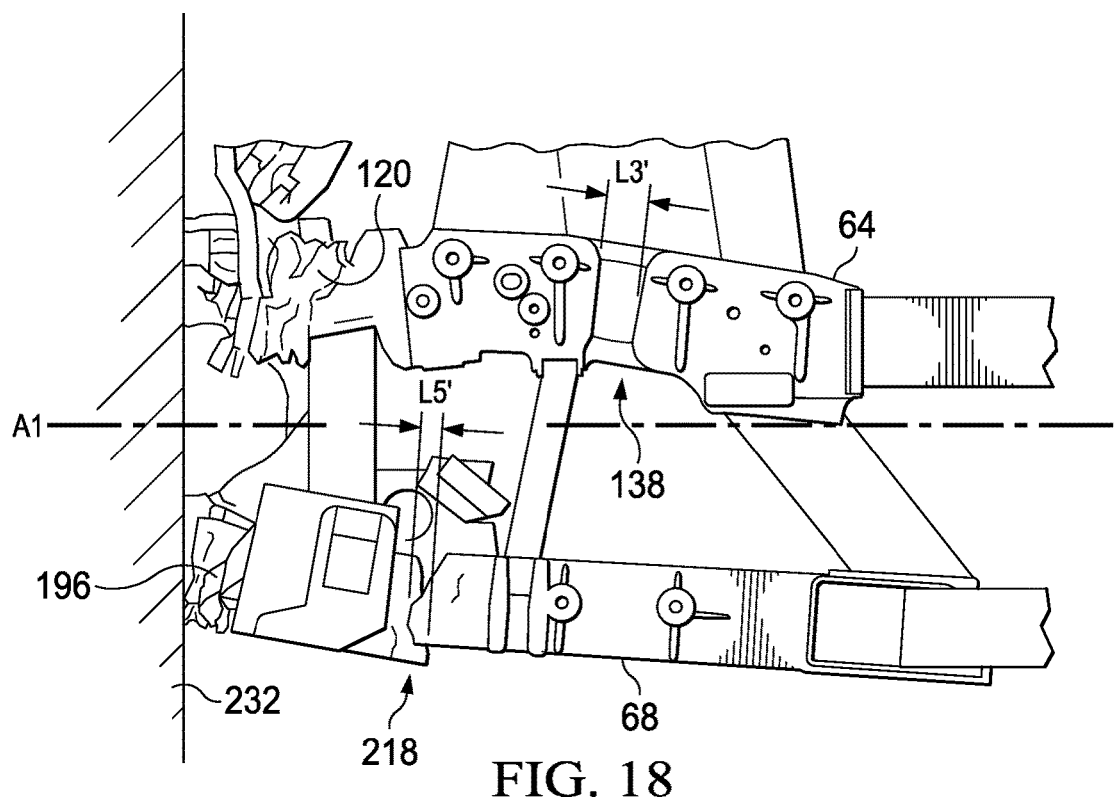
FIG. 18 is a side view depicting a front portion of the frame assembly of FIG. 2 after a collision with the wall of FIG. 17.

The deformation features (e.g., 136, 138, 218) of the interconnecting members 64, 66, 68, 70 can be configured to control the manner in which the interconnecting members 64, 66, 68, 70 deform in response to impact energy. More particularly, when the vehicle 40 is involved in a front collision, the interconnecting members 64, 66, 68, 70 can deform at the deformation features (e.g., 136, 138, 218) in order to divert impact energy from the impact zone (e.g., the wall 232) and away from the passenger compartment 62. FIGS. 17 and 18 illustrate one example of the vehicle 40 before and after a front collision. Prior to the front collision, as illustrated in FIG. 17, the interconnecting members 64 and 68 have not incurred any front impact energy and are thus intact. After the front collision has occurred, as illustrated in FIG. 18, the interconnecting members 64 and 68 have deformed/crushed/broken at the deformation features (e.g., 136, 138, 218) (as can be understood by comparing the original lengths L3 and L5 of the deformation features 138, 218 shown in FIG. 17 to the lengths L3' and L5' shown in FIG. 18). This can allow the interconnecting members to 64, 66, 68, 70 to deform enough to absorb the additional impact energy from the collision and divert it away from the passenger compartment 62.

In an embodiment, the portion of the upper interconnecting members 64, 66 positioned forward of the deformation features 136, 138 rotates or bends downwardly as shown in FIG. 18 in response to impact energy while the portion of the upper interconnecting members 64, 66 remains in substantially the same position. Accordingly, forward lateral member 112 and any component or portion of a component secured thereto may be lowered with that end of the interconnecting members 64, 66, while the position and support of the rear lateral member 114 and any component or portion of a component secured thereto is maintained.

In an embodiment, the portion of the lower interconnecting members 68, 70 positioned forward of the deformation feature 218 rotates or bends upwardly in response to impact energy while the portion of the lower interconnecting members 68, 70 remains in substantially the same position. In one embodiment, the lower deformation features (e.g., 218) of the lower interconnecting members 68, 70 can be more susceptible to cracking than the deformation features (e.g., 136, 138) of the upper interconnecting members 64, 66 in response to a substantially identical force applied to each of the interconnecting members 64, 66, 68, 70 in a direction that is substantially parallel to the longitudinal axis A1. For example, when the vehicle 40 undergoes a front collision, as illustrated in FIG. 18, the lower interconnecting members 68, 70 can form visible cracks (e.g., visible to the naked eye) without any visible cracks forming in the upper interconnecting members 64, 66. In one embodiment, the visible cracks can occur over between about 10% and about 75% of the circumference of the lower interconnecting members 68, 70 at the lower deformation features (e.g., 218). In some embodiments, the visible crack(s) can occur over about 100% of the circumference of the lower interconnecting members 68, 70 at the lower deformation features (e.g., 218) such that the lower interconnecting members 68, 70 are substantially entirely or entirely broken into two or more pieces.

In one embodiment, as illustrated in FIG. 19, an engine 234 can be coupled with the front and rear lateral members 112, 114 such that the engine 234 is suspended from each of the front and rear lateral members 112, 114. When the vehicle 40 is involved in a front collision that causes the lower interconnecting members 68, 70 to become unstable (e.g. crack), the upper interconnecting members 64, 66 can remain intact to prevent the engine 234 from inadvertently separating from the rest of the vehicle 40. In one embodiment, the engine 234 can comprise an electric motor such as would be employed on an electric or hybrid vehicle. It is to be appreciated that the upper interconnect members 64, 66 and the lower interconnect members 68, 70 can be rigidly attached together through left vertical support members 116, 118 and right vertical support members 152, 154, respectively (e.g., through welding). Such rigid attachment can permit the engine 234 to be rigidly attached to the frame assembly 46 (e.g., through front and rear lateral members 112, 114). As such, the engine supports (e.g., the upper and lower interconnect members 64, 66, 68, 70 can aid in dissipating crash energy more effectively than conventional resiliently mounted engine subframes (e.g., mounted with elastomeric bushings).

It will be appreciated that the ratio of the respective lengths of the upper front forward members 120, 156 to the lower front forward members 196, 226 can be selected relative to the lengths of the upper interconnecting members 64, 66 (e.g., L1) and the lower interconnecting members 68, 70 (e.g., L4), respectively, to achieve certain impact energy absorption/diversion characteristics. In one embodiment, the ratio of the upper front forward members 120, 122 to the lower front forward members 196, 198 can be between about 1:1 and about 10:1, and preferably about 3:1. The interconnection members can accordingly encourage protection of the passenger compartment by deforming/breaking in such a manner that allows the engine 234 to drop away from the passenger compartment.

Figure 20:
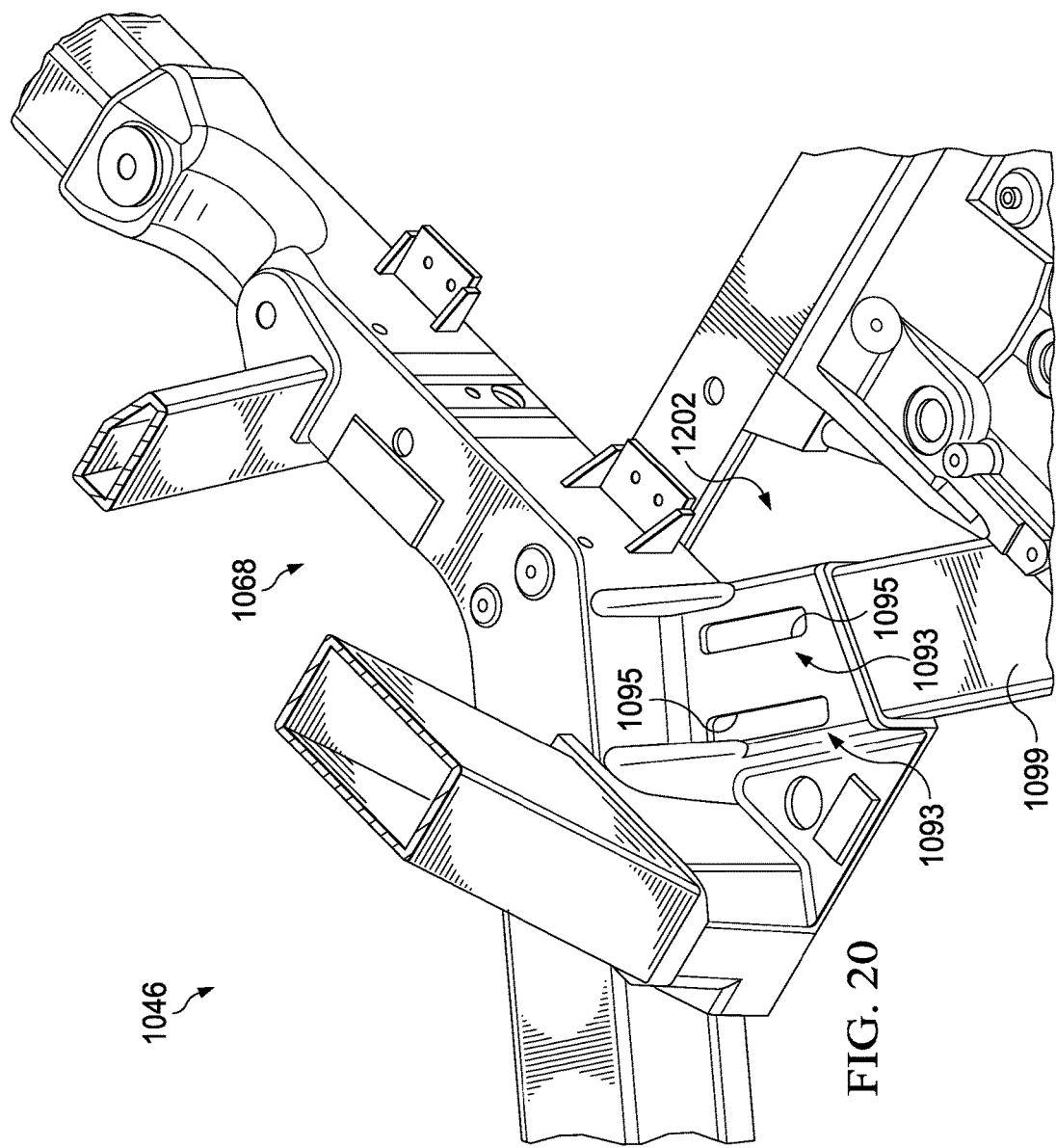
FIG. 20 is an enlarged upper perspective view depicting a vehicular frame assembly according to another embodiment.
Figure 21:
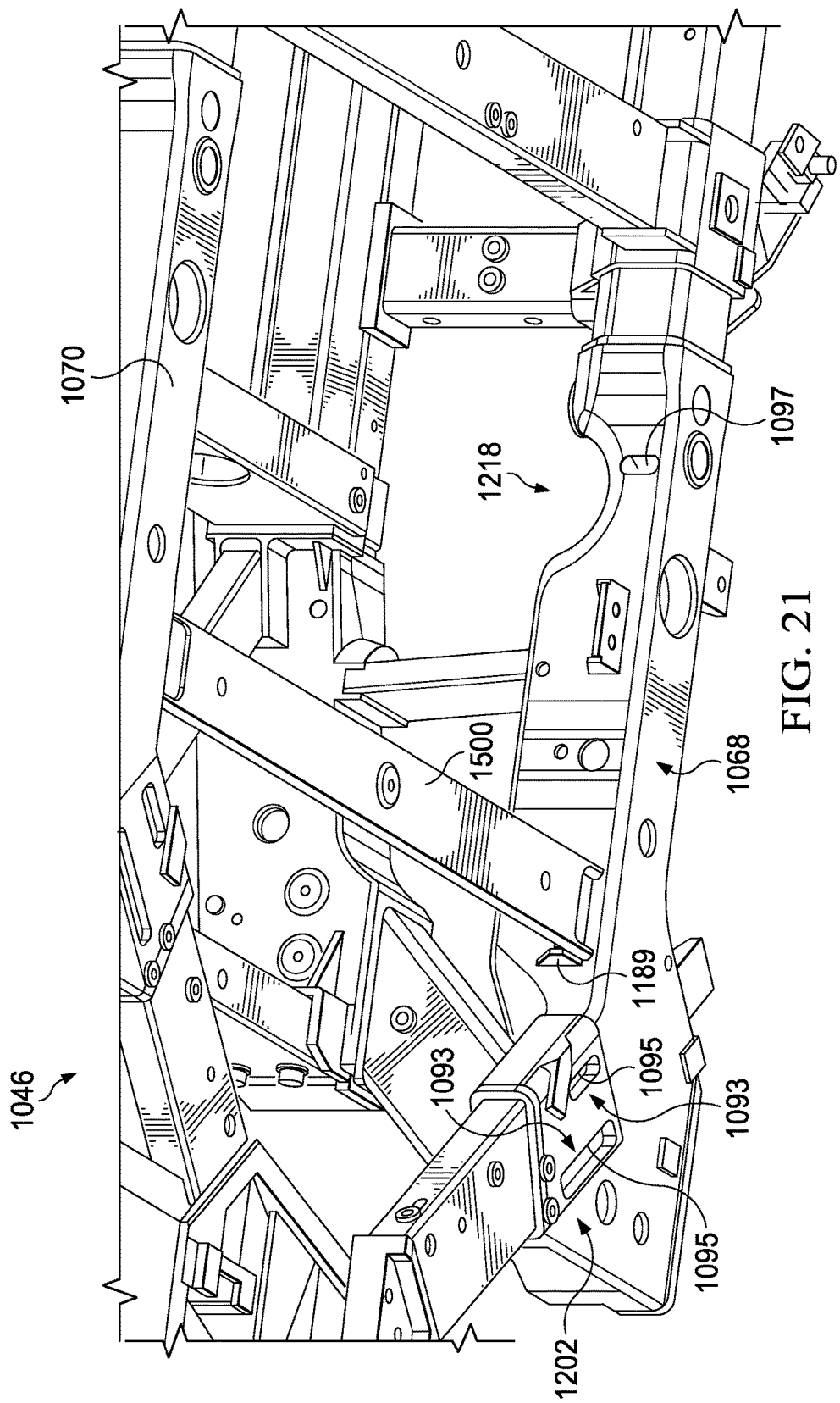
FIG. 21 is an enlarged lower right perspective view depicting the vehicular frame assembly of FIG. 20.
Figure 22:
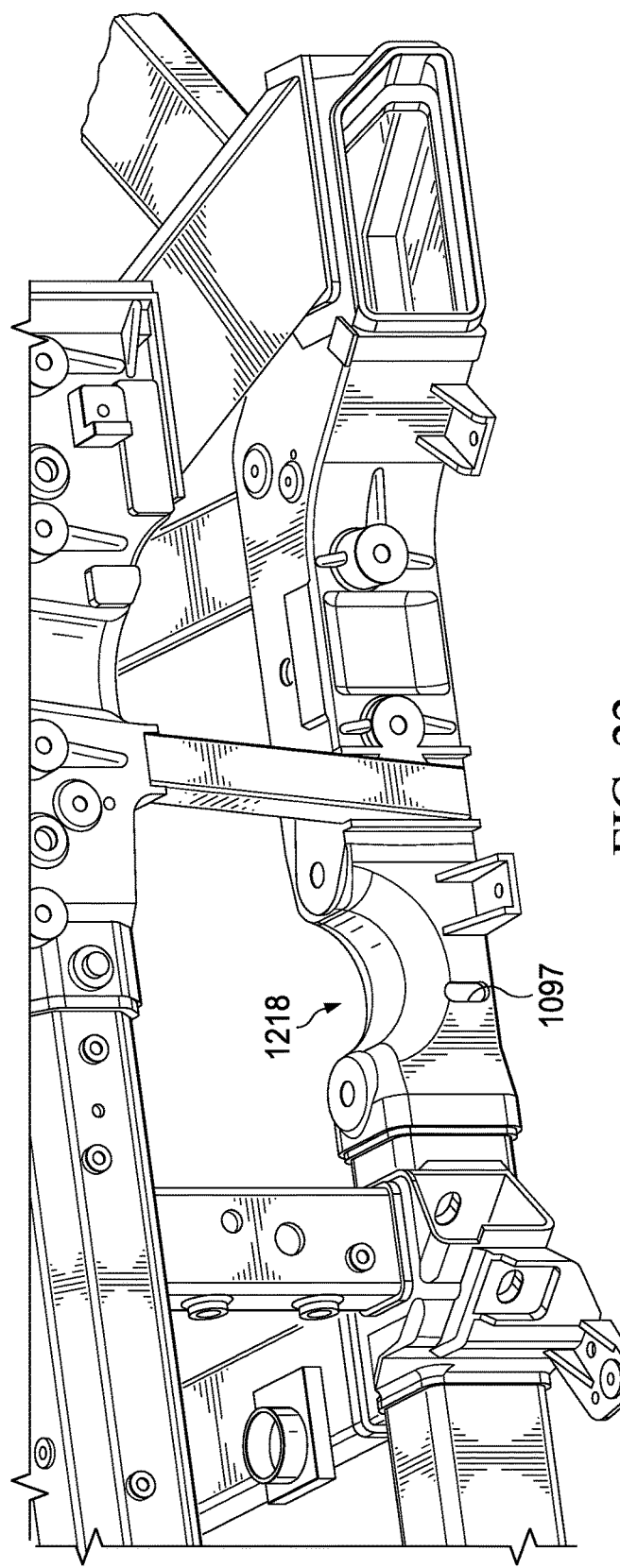
FIG. 22 is an enlarged upper left perspective view depicting the vehicular frame assembly of FIG. 20.

FIGS. 20-25 are an enlarged view of an alternative embodiment of a frame assembly 1046. The frame assembly 1046 can be similar to, or the same as in many respects as, the frame assembly 46 illustrated in FIGS. 1-19. For example, the frame assembly 1046 can include a lower interconnecting member 1068 that includes a rear sleeve portion 1202 and a deformation feature 1218. However, as illustrated in FIGS. 20 and 21, the rear sleeve portion 1202 can define a plurality of elongated welding apertures 1093 that have respective perimeters 1095. Each elongated welding aperture 1093 can allow for access to the underlying lower rearward member 1099 such that the rear sleeve portion 1202 can be welded to the lower rearward member 1099 along the perimeter 1095 of each elongated welding aperture 1093. The elongated welding apertures 1093 can accordingly increase the surface area available for welding between the rear sleeve portion 1202 and the lower rearward member 1099. The elongated welding apertures 1093 can be machined, cast, or formed in the lower rearward member 1068 in any of a variety of suitable manners. It is to be appreciated that welding apertures can be provided at any of a variety of locations along a cast member to encourage welding to an associated metal component.

The lower interconnecting member 1068 can additionally include a pair of apertures 1097 which may be as cast or machined at the deformation feature 1218, as illustrated in FIGS. 20-24. The apertures 1097 can be used to adjust the strength of the deformation feature 1218. In particular, the apertures 1097 can be provided to reduce the overall strength of the lower interconnecting member 1068 in the deformation zone (e.g., D2) to modify/decrease the impact energy necessary to deform the deformation feature 1218. It is to be appreciated that even though features may be added to the lower interconnecting member 1068 through machining or otherwise, such as the apertures 1097, the lower interconnecting member 1068 is still considered to be "as-cast" as defined by this disclosure. Although shown as located offset from the center of the deformation feature toward the front of the vehicle, it is to be appreciated that deformation apertures can be provided at any of a variety of locations along a cast member to encourage deformation of the cast member when undergoing impact. It is further to be appreciated that the deformation characteristics of the lower interconnecting member 1068 can be controlled by changing the thickness of the walls of the deformation feature 1218, or through any variety of suitable additional or alternative methods.

Figure 23:
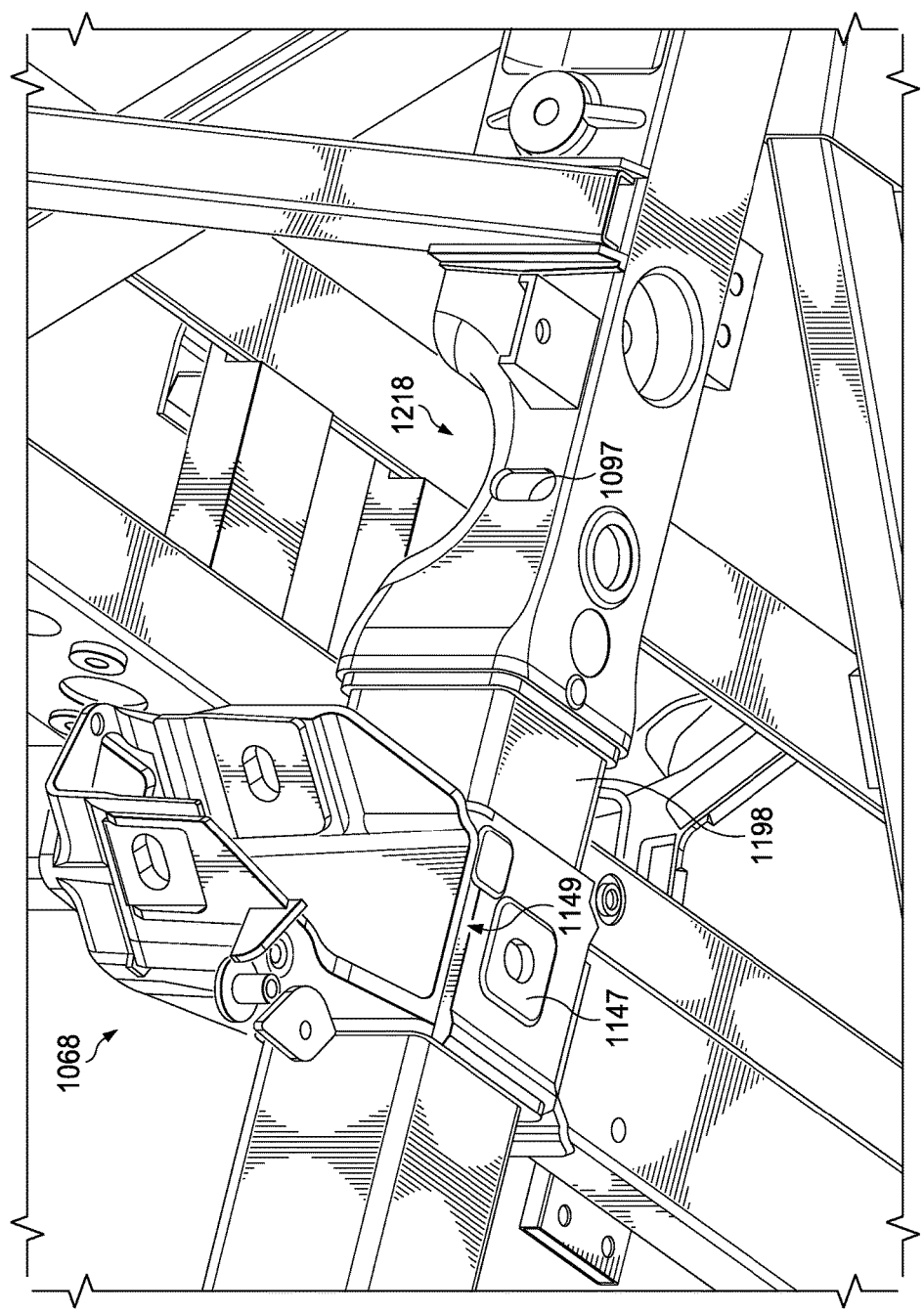
FIG. 23 is an enlarged lower left perspective view depicting the vehicular frame assembly of FIG. 20.
Figure 24:
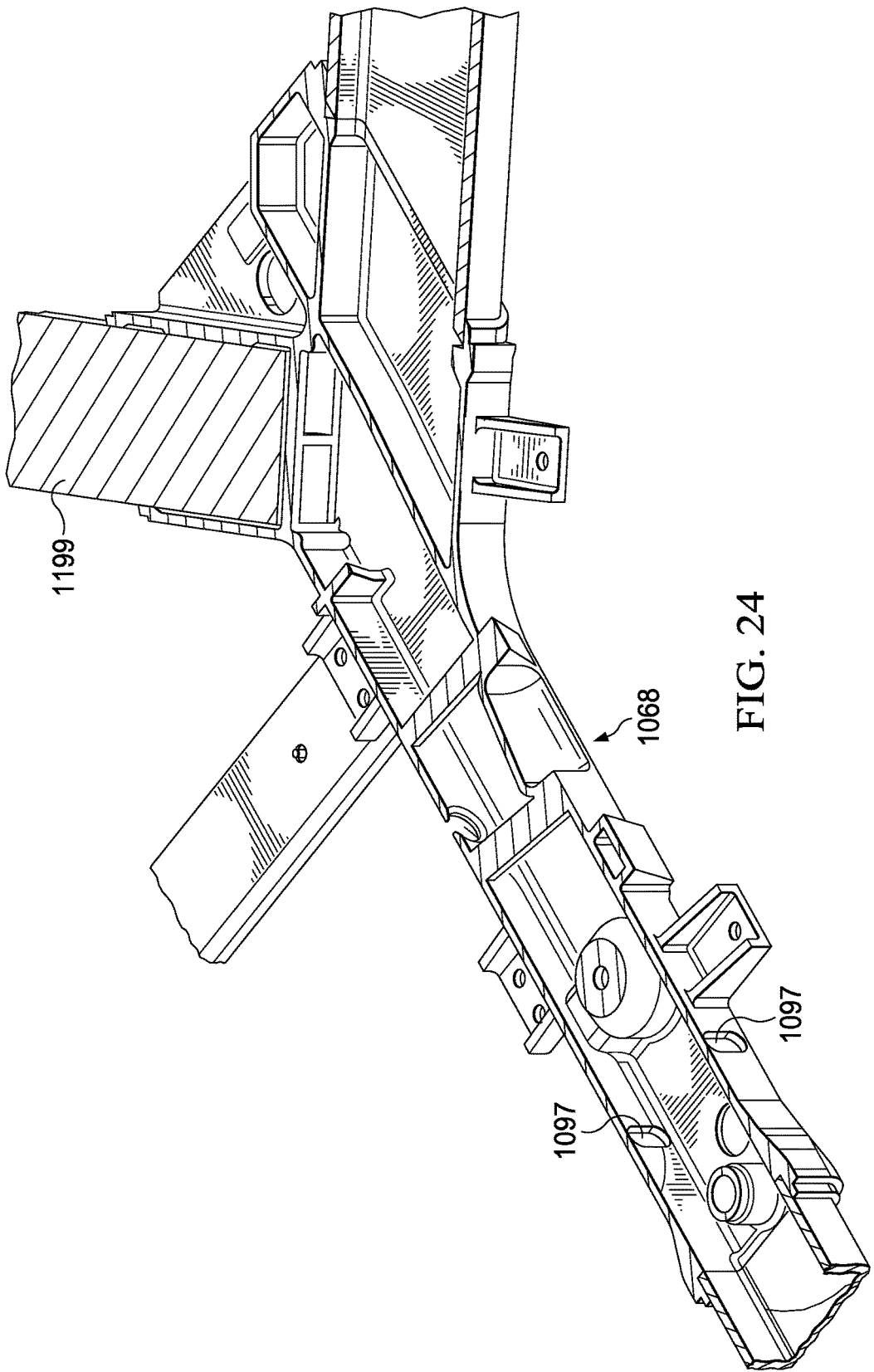
FIG. 24 is an enlarged left perspective view depicting the vehicular frame assembly of FIG. 20 with certain components shown in cross section.
Figure 25:
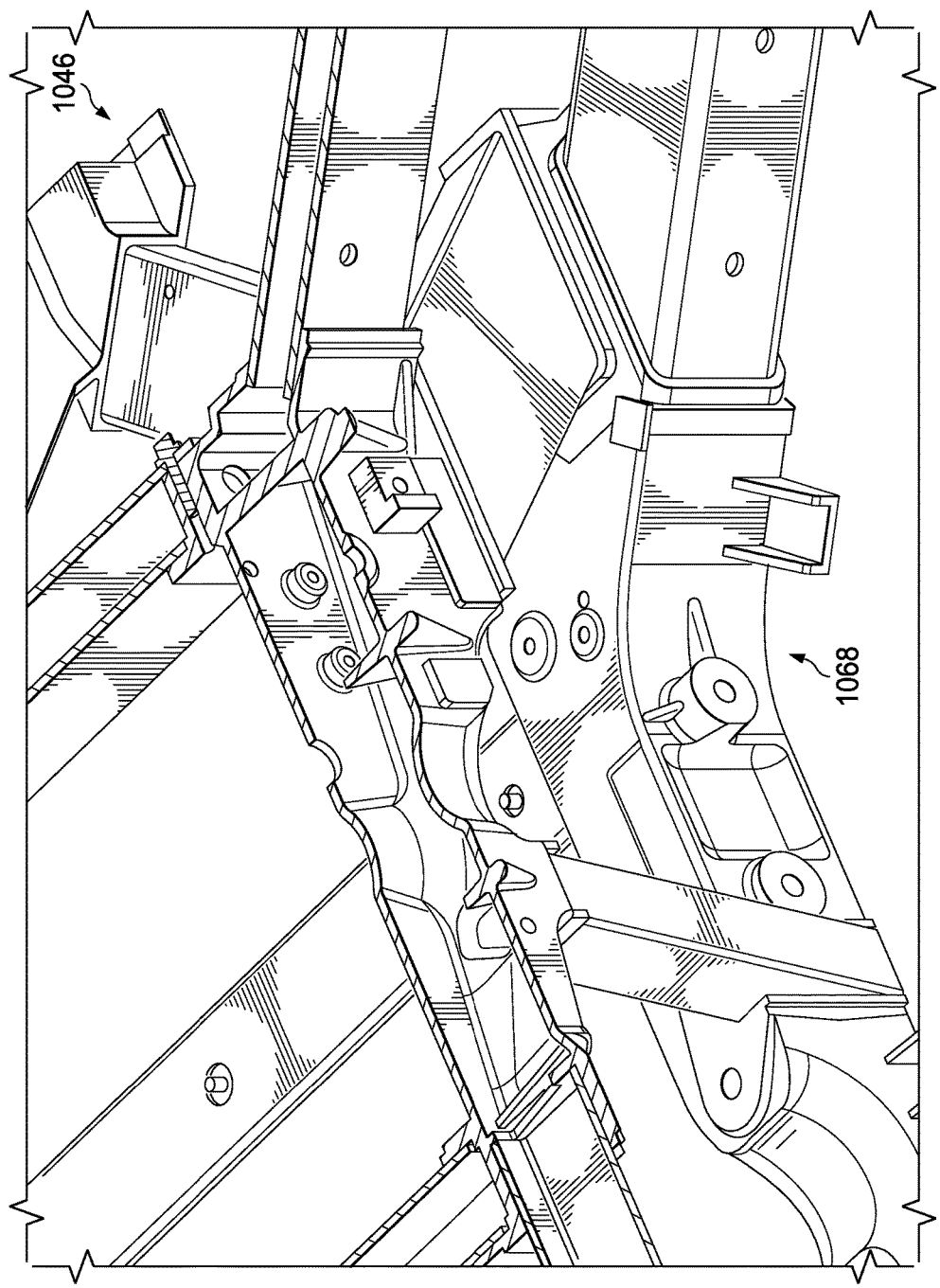
FIG. 25 is an enlarged left perspective view depicting the vehicular frame assembly of FIG. 20 with certain other components shown in cross section.

As best shown in FIG. 21, a rear lower lateral member 1500 is secured to a coupling portion 1189 of the lower left interconnecting member 1068 and the lower right interconnecting member 1070 to rigidly fix the lower left interconnecting member 1068 to the lower right interconnecting member 1070. Referring now to FIG. 23, a control arm bracket 1147 is shown to be supported by a lower forward member 1198. The control arm bracket 1147 can include a notch 1149 that encourages separation of the control arm bracket 1147 from the lower forward member 1198 during a collision.

Figure 26:
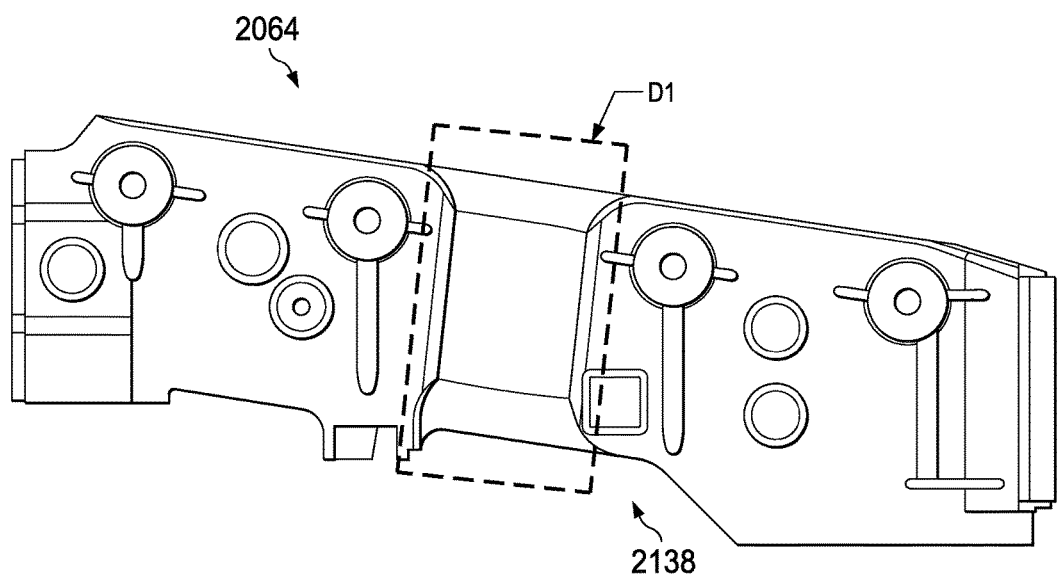
FIG. 26 is an outboard side view depicting a left upper interconnecting member, according to another embodiment.
Figure 27:
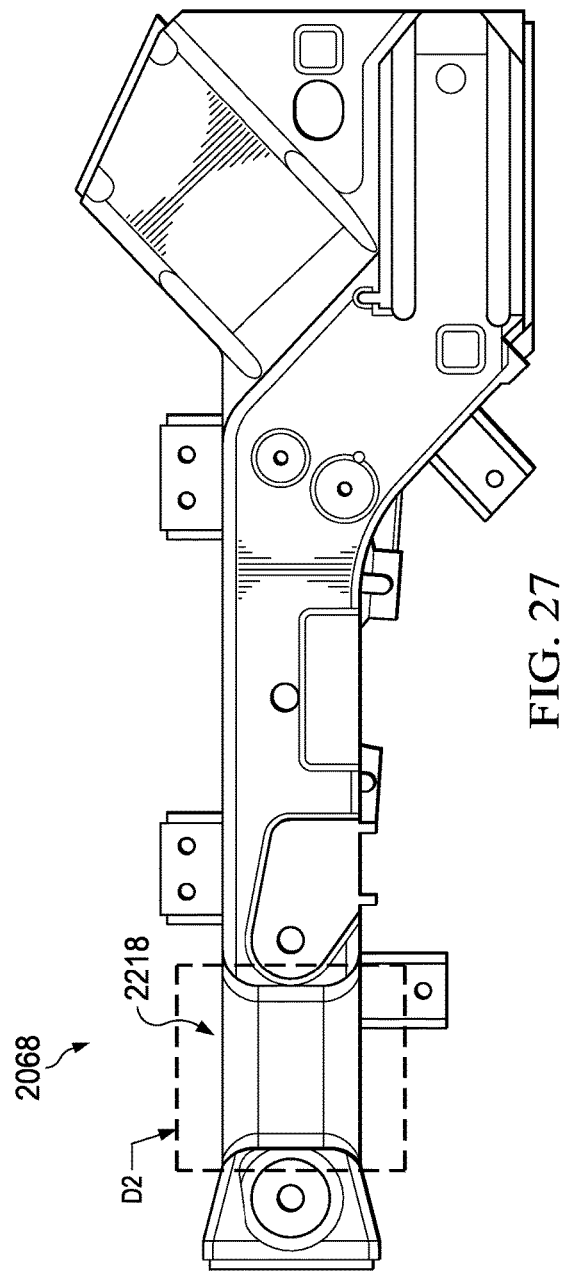
FIG. 27 is a top plan view depicting a left lower interconnecting member according to another embodiment.
Figure 28:
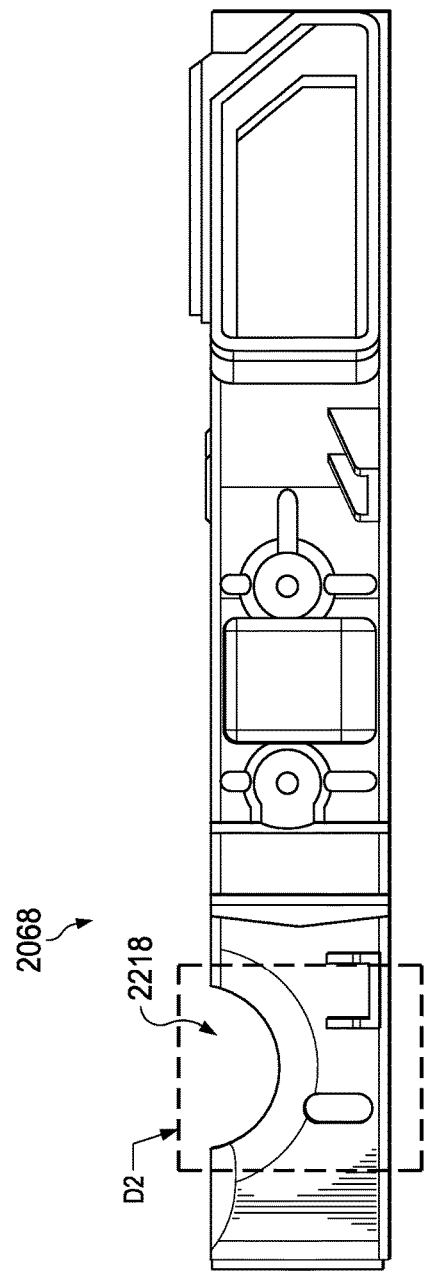
FIG. 28 is an outboard side view depicting the left lower interconnecting member of FIG. 27.

Referring now to FIGS. 26-37, an example frame assembly is provided that is similar in many respects as the frame assemblies 46, 1046 of FIGS. 1-25. For example, the frame assembly can include interconnecting members (e.g., a left upper interconnecting member 2064 as shown in FIG. 26 and a left lower interconnecting member 2068 as shown in FIGS. 27-28). The frame assembly can also include rear nodes (e.g., right rear node 2236) that are formed similarly as, or the same as, the interconnecting members 64, 66, 68, 70 described above. In one embodiment, the rear nodes can be formed to withstand up 210 kN of force without experiencing significant breakage.

Referring now to FIG. 26, during manufacture of the left upper interconnecting member 2064 using the casting process described in U.S. Pat. Nos. 7,216,691, 7,165,600, and U.S. Patent Application Publication No. 2008/0041499, a deformation feature 2138 was provided. The deformation feature 2138 can define a deformation zone indicated by the encircled area D1. The deformation zone D1 can be understood to be the area where the left upper interconnecting member 2064 is more susceptible to deformation when a longitudinal force is imparted to a front of the left upper interconnecting member 2064 (e.g., during a front end collision). The left upper interconnecting member 2064 comprised an A356 aluminum alloy with about 100 ppm of strontium.

Referring now to FIGS. 27-28, during manufacture of the left lower interconnecting member 2068 using the casting process described in U.S. Pat. Nos. 7,216,691, 7,165,600, and U.S. Patent Application Publication No. 2008/0041499, a deformation feature 2218 was provided. The deformation feature 2218 can define a deformation zone indicated by the encircled area D2. The left lower interconnecting member 2068 comprised an A356 aluminum alloy with about 100 ppm strontium.

Figure 29:
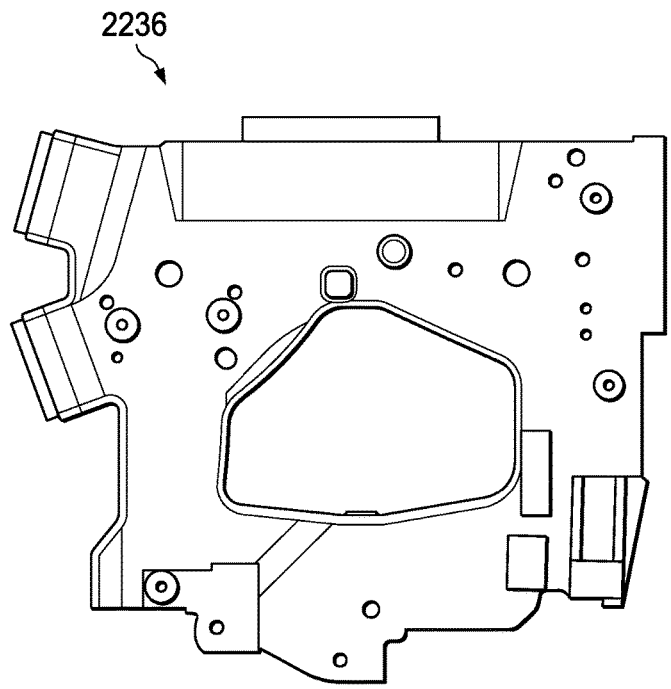
FIG. 29 is an inboard side view depicting a right rear node, according to one embodiment.
Figure 30:
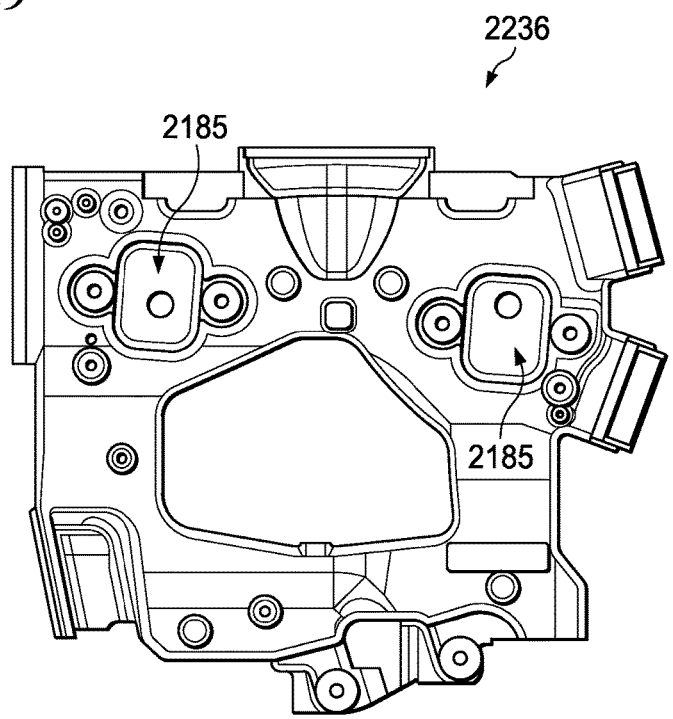
FIG. 30 is an outboard side view depicting the right rear node of FIG. 29.
Figure 31:
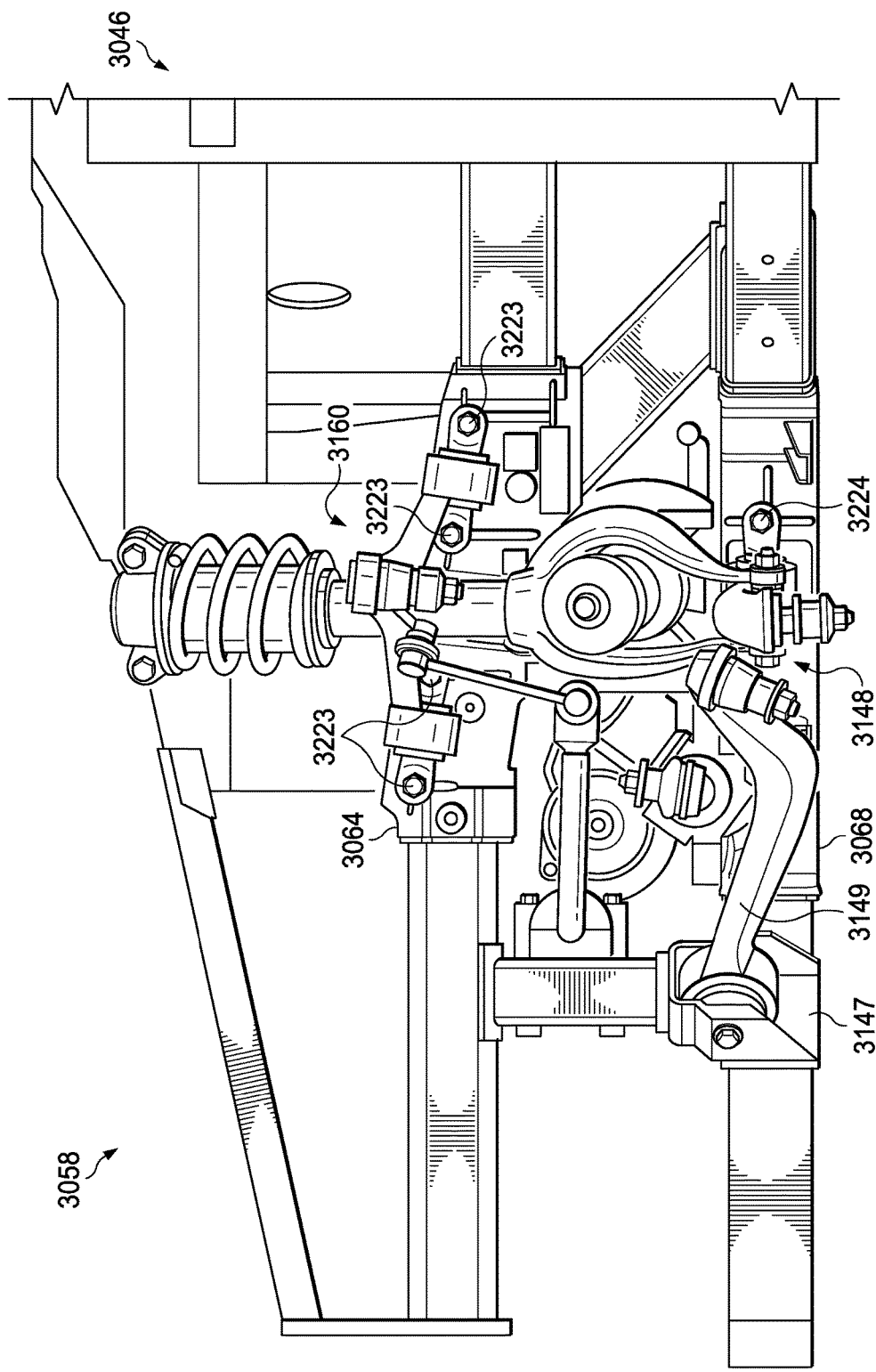
FIG. 31 is a side view depicting a frame assembly of a vehicle, according to another embodiment.
Figure 32:
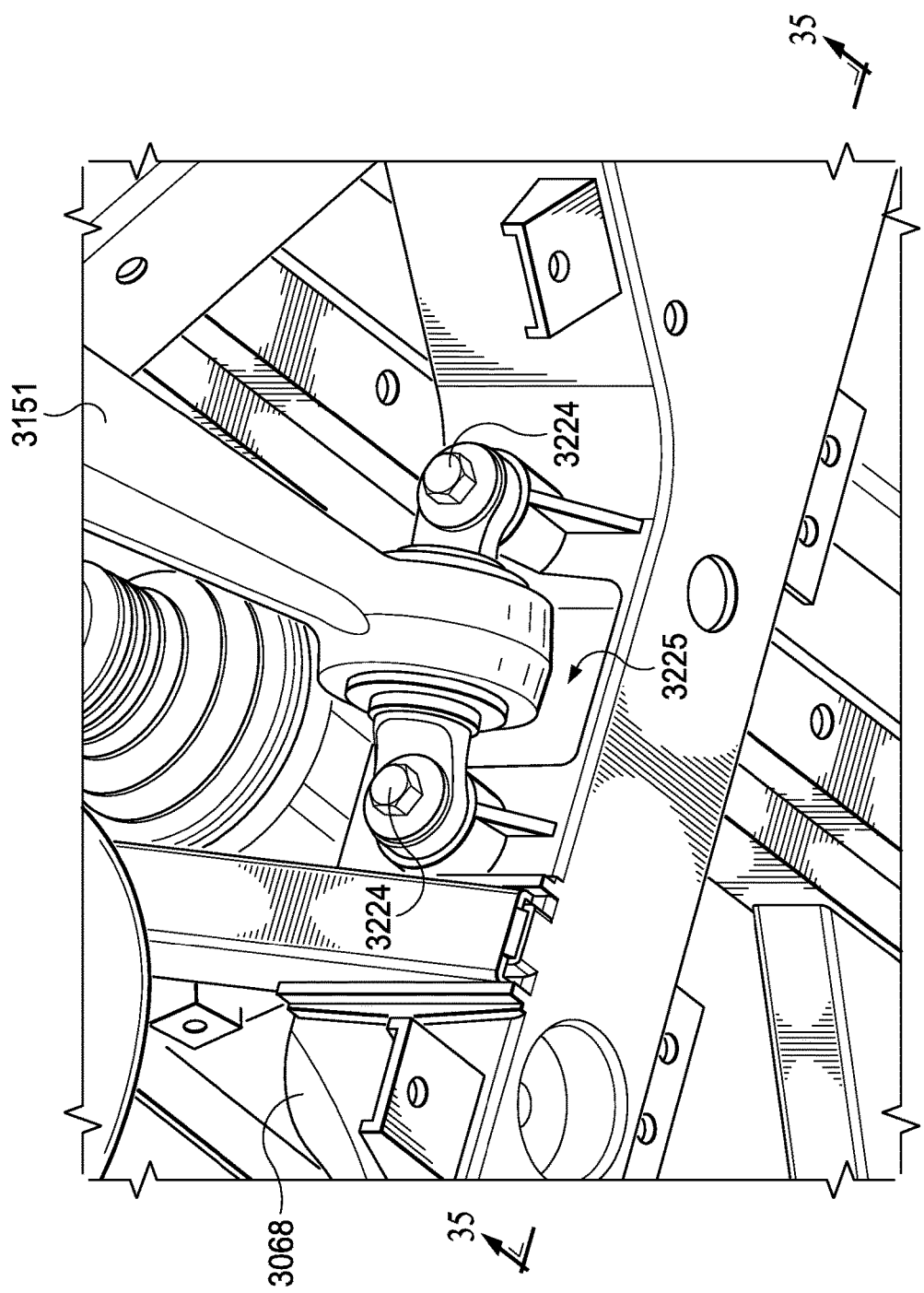
FIG. 32 is an enlarged lower front perspective view depicting the frame assembly of FIG. 31.

Referring now to FIGS. 29-30, during manufacture, the right rear node 2236 was provided using the casting process described in U.S. Pat. Nos. 7,216,691, 7,165,600, and U.S. Patent Application Publication No. 2008/0041499. The right rear node 2236 comprised an A356 aluminum alloy with about 100 ppm strontium.

Figure 33:
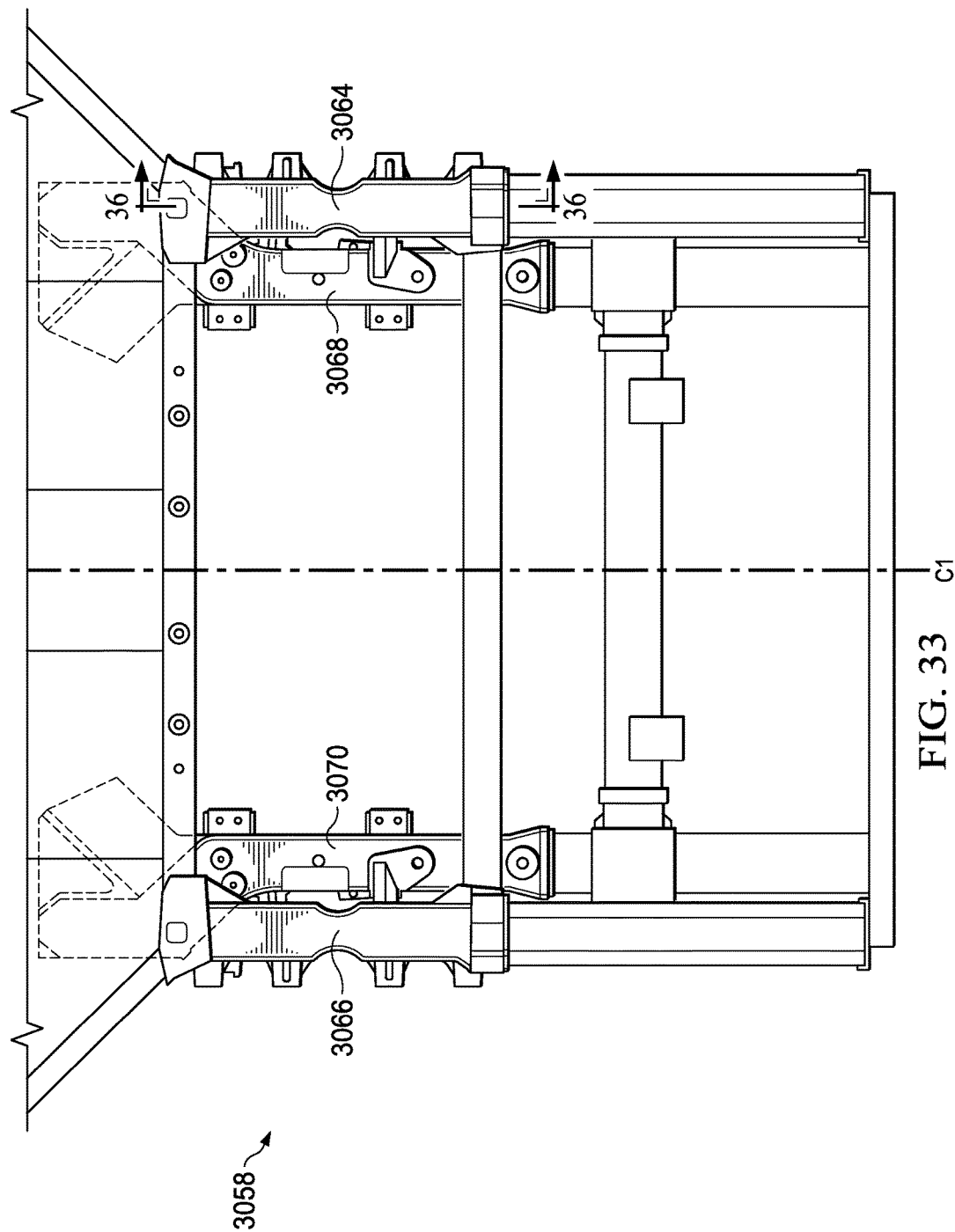
FIG. 33 is a top view depicting the frame assembly of FIG. 31.

Referring now to FIGS. 31-38, an alternative embodiment of a front body structure 3058 of a frame assembly 3046 is illustrated. The front body structure 3058 is similar to, or the same as, in many respects as the front body structure 58 illustrated in FIGS. 1-19. For example, the front body structure 3058 can include left upper and lower interconnecting members 3064, 3068. A left suspension assembly 3144 can be coupled with the left upper and lower interconnecting members 3064, 3068. In particular, an upper control arm 3160 can be attached to the left upper interconnecting member 3064 with bolts 3223 and a rear leg 3151 of a lower control arm 3148 can be attached to the left upper interconnecting member 3064 with bolts 3224. A front leg 3149 of the lower control arm 3148 can be attached to another portion of the front body structure 3058 such as a control arm bracket 3147. As illustrated in FIG. 33, the front body structure 3058 can also include right upper and lower interconnecting members 66, 70. The lower interconnecting members 3068, 3070 can be closer to a centerline C1 of the vehicle than the upper interconnecting members 3064, 3066. FIG. 34 illustrates how the upper and lower interconnecting members 3064, 3066, 3068, 3070 respond to a front collision (i.e., deformed/crushed/broken at the deformation features enough to absorb the impact energy from the collision and divert it away from the passenger compartment).

Figure 35:
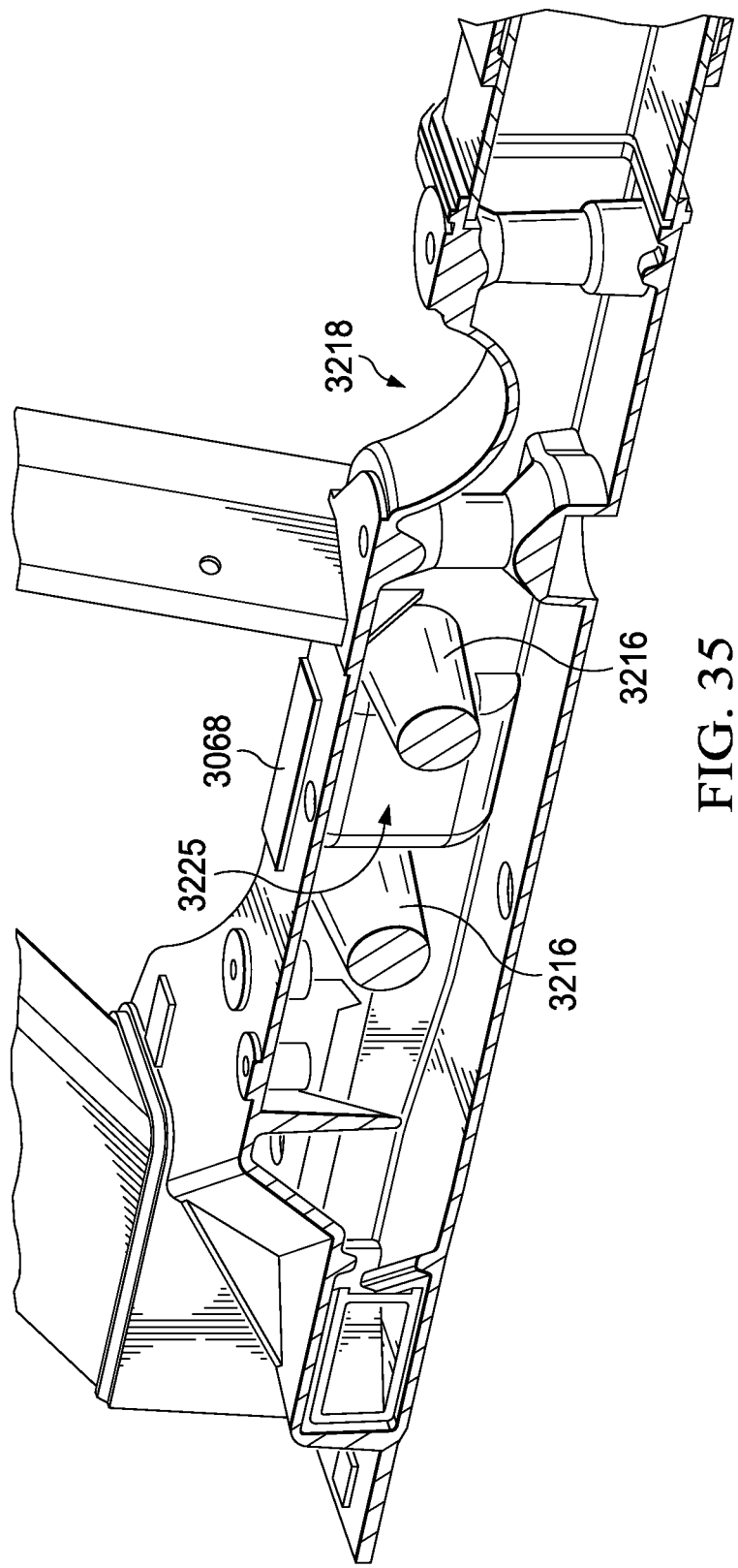
FIG. 35 is a cross-sectional view taken along the line 35-35 in FIG. 32.
Figure 36:
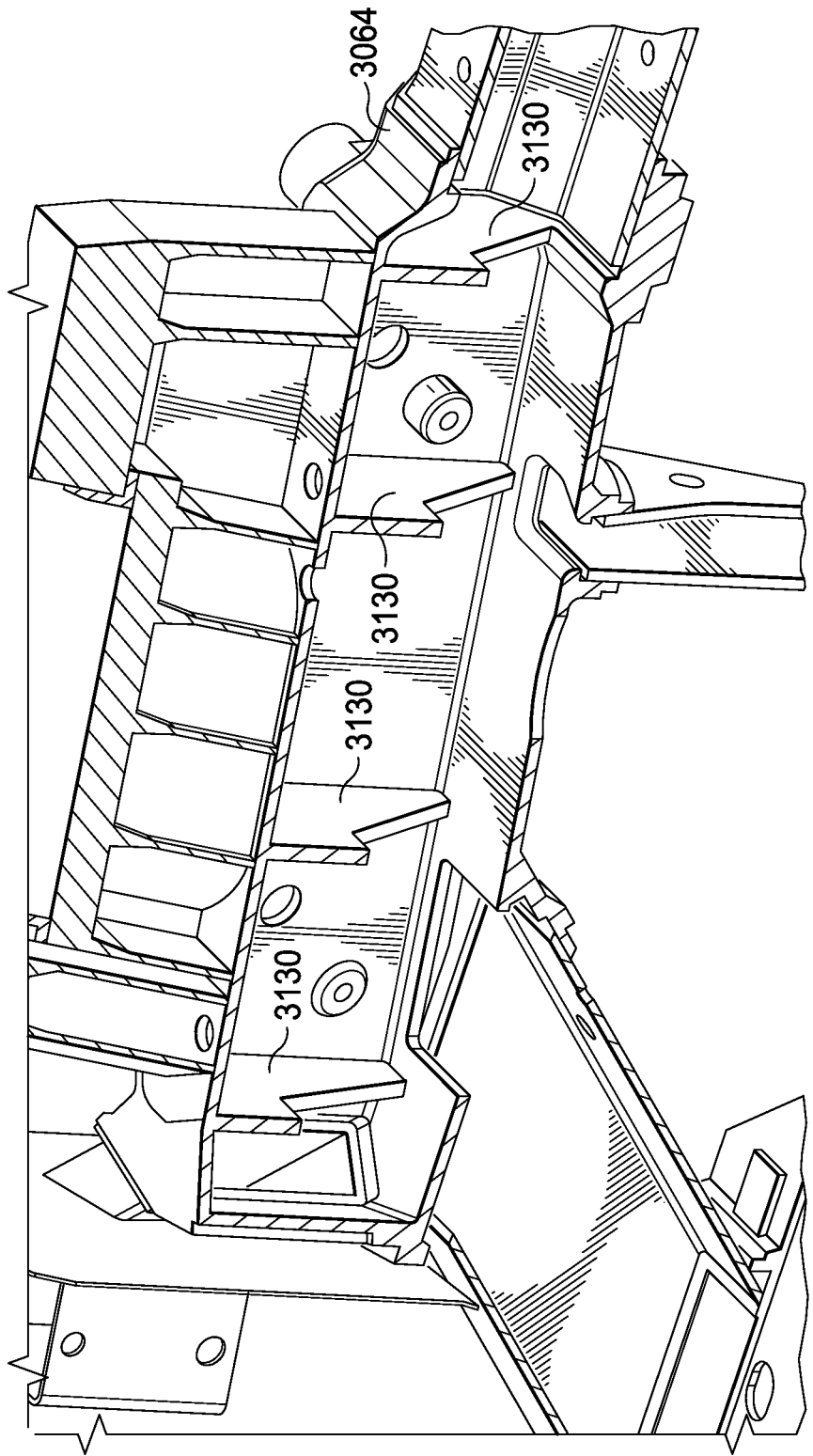
FIG. 36 is a cross-sectional view taken along the line 36-36 in FIG. 33.
Figure 37:
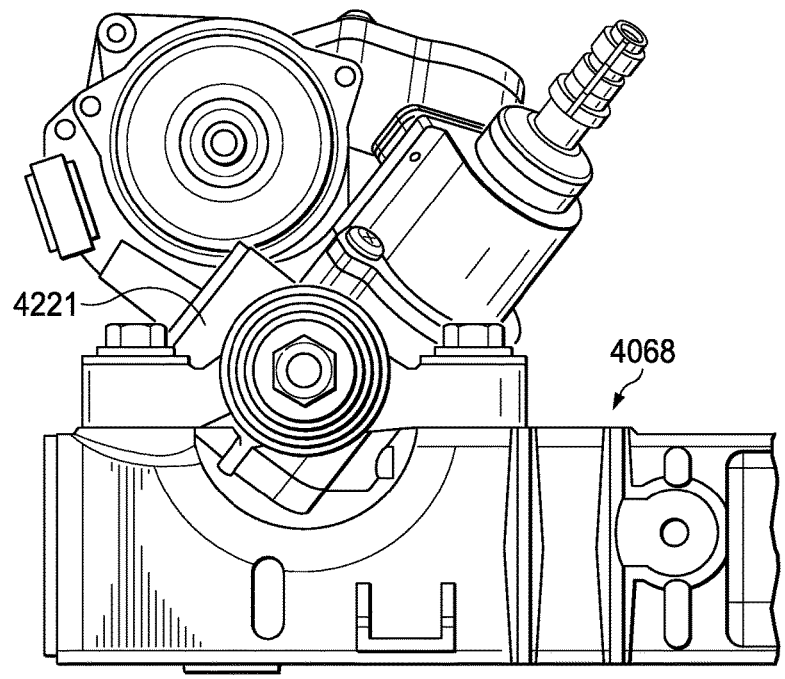
FIG. 37 is a side view depicting a left lower interconnecting member of a frame assembly, according to another embodiment, the left lower interconnecting member shown in association with a steering gear box.
Figure 38:
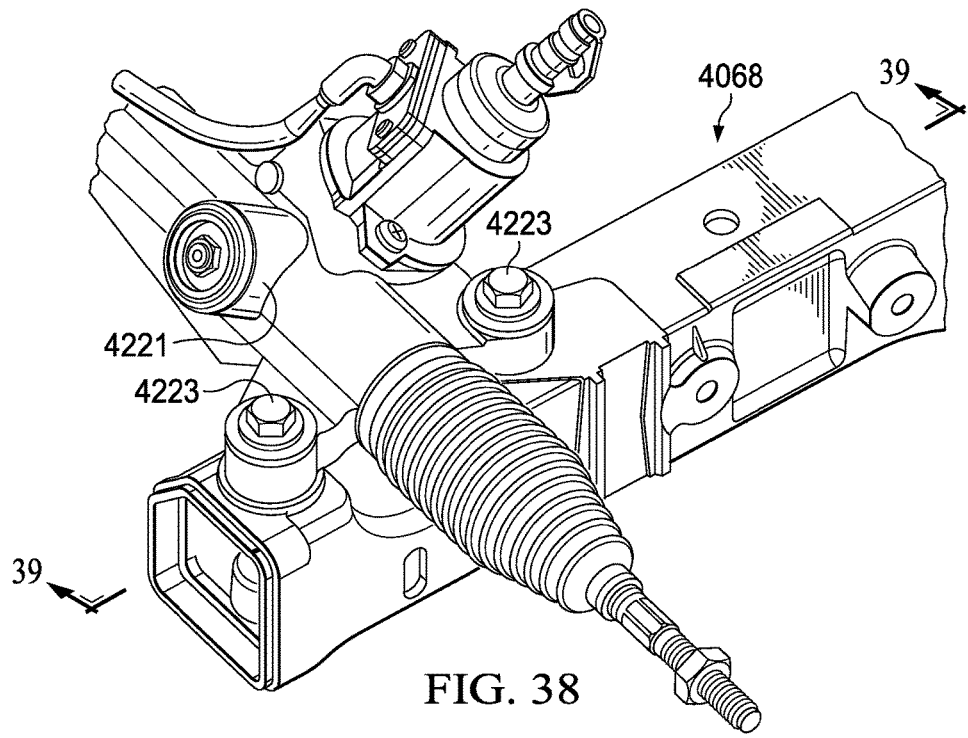
FIG. 38 is an upper perspective view of the left lower interconnecting member and steering gear box of FIG. 37.
Figure 39:
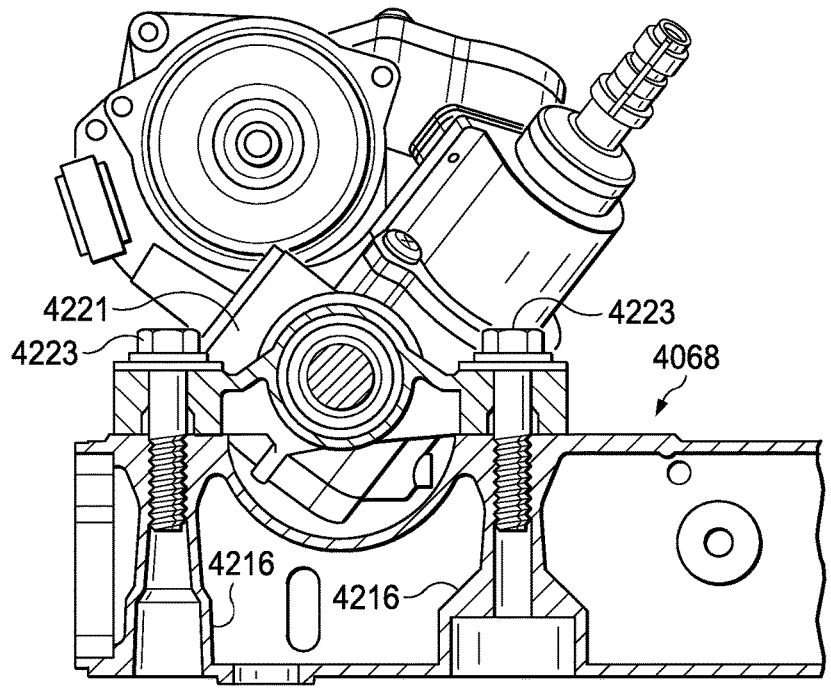
FIG. 39 is a side cross-sectional view taken along the line 39-39 in FIG. 38.
Figure 40:
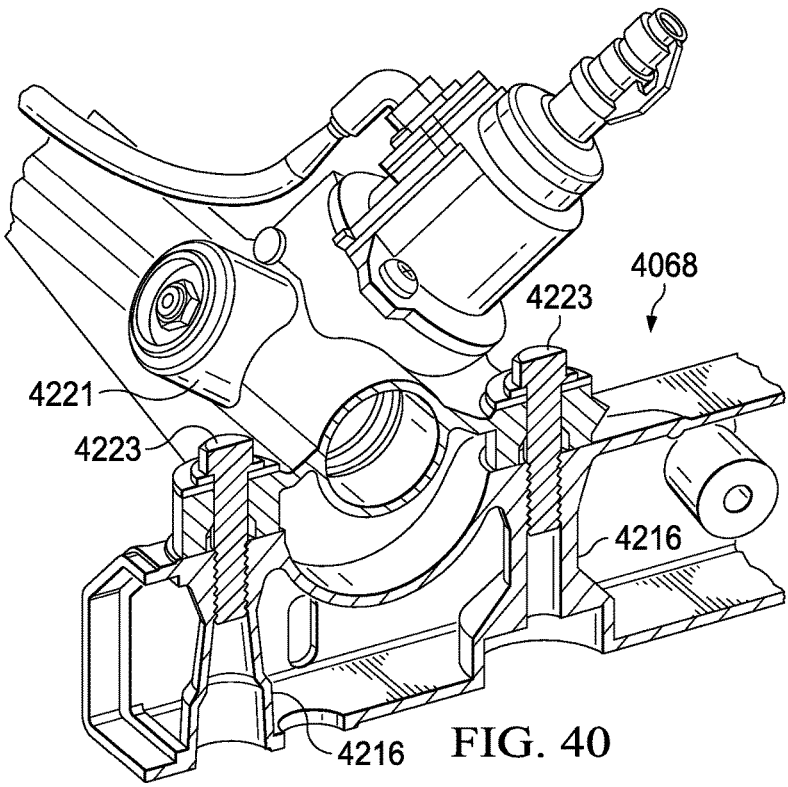
FIG. 40 is a perspective cross-sectional view taken along the line 39-39 in FIG. 38.

Referring now to FIG. 35, the left lower interconnecting member 3068 is shown to include internal reinforcement portions 3216 and a recess 3225 for the rear arm 3151 of the lower control arm 3148. The left lower interconnecting member 3068 can also include a deformation feature 3218. Referring now to FIG. 36, the left upper interconnecting member 3064 is shown to include a plurality of reinforcement ribs 3130.

Figure 46:
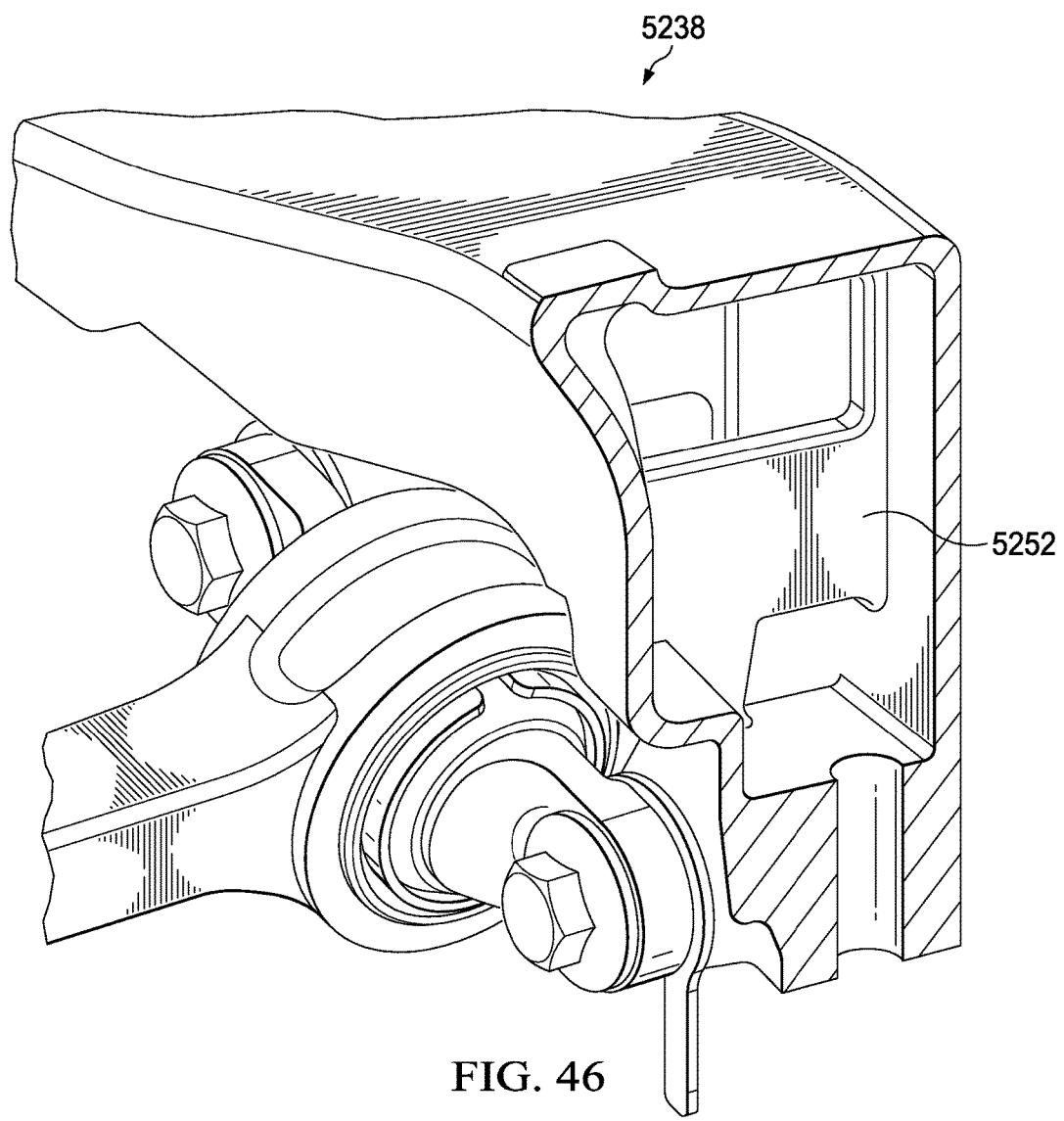
FIG. 46 is a cross-sectional view taken along the line 46-46 in FIG. 45.
Figure 47:
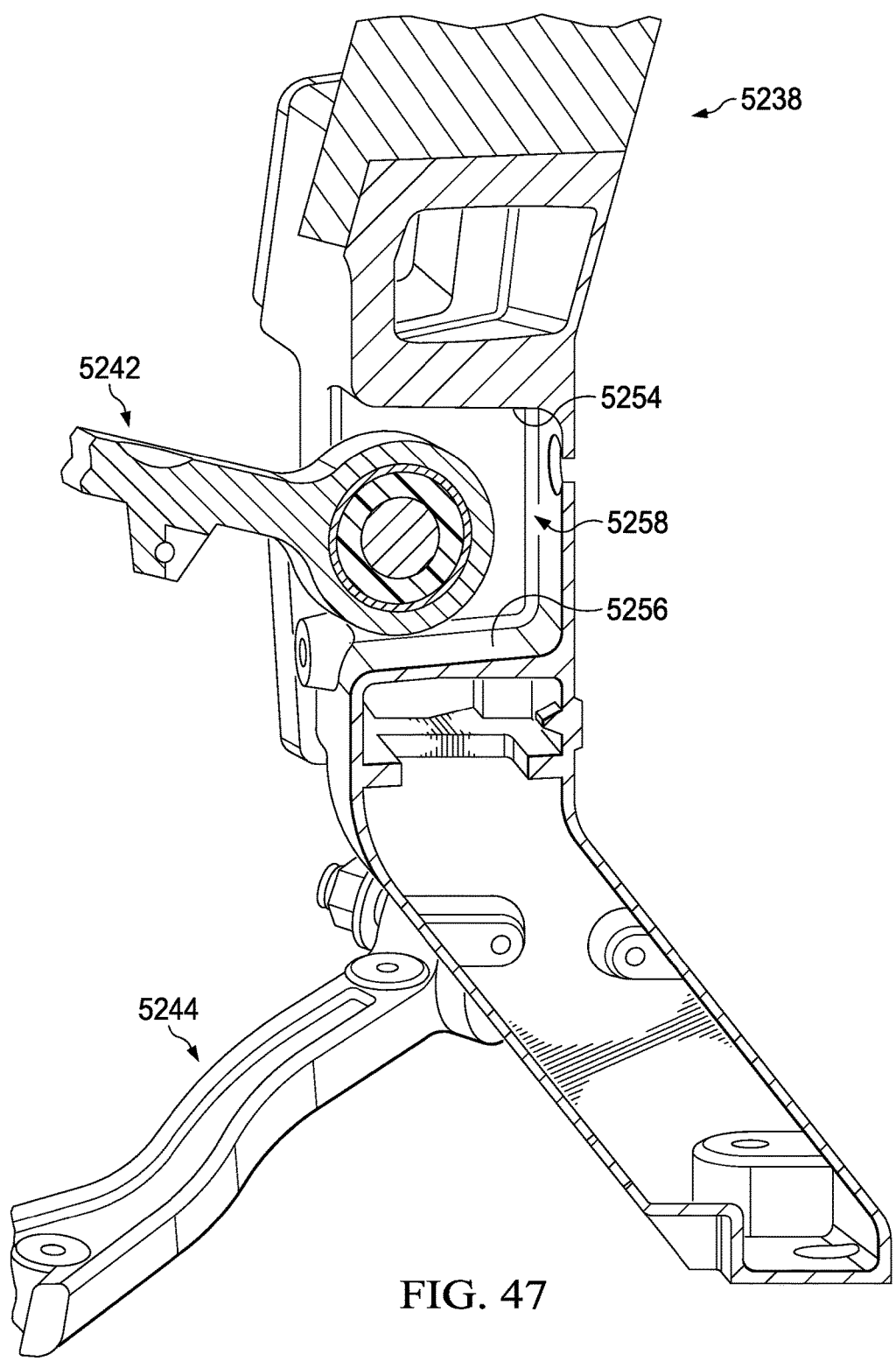
FIG. 47 is a cross-sectional view taken along the line 47-47 in FIG. 45.
Figure 48:
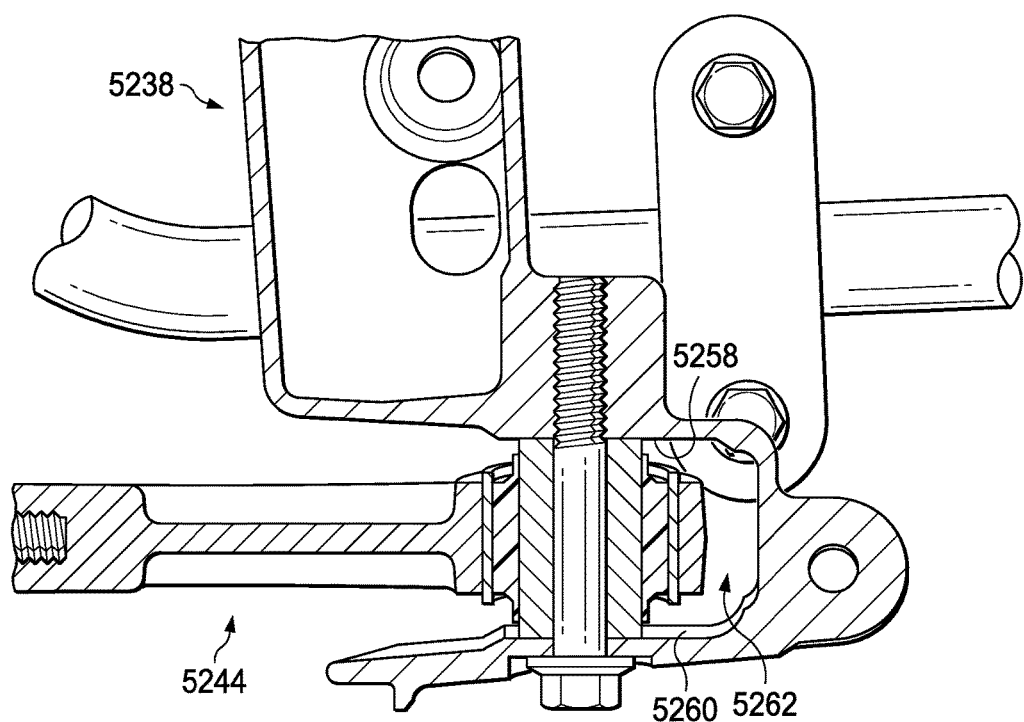
FIG. 48 is a cross-sectional view taken along the line 48-48 in FIG. 45.
Figure 49:
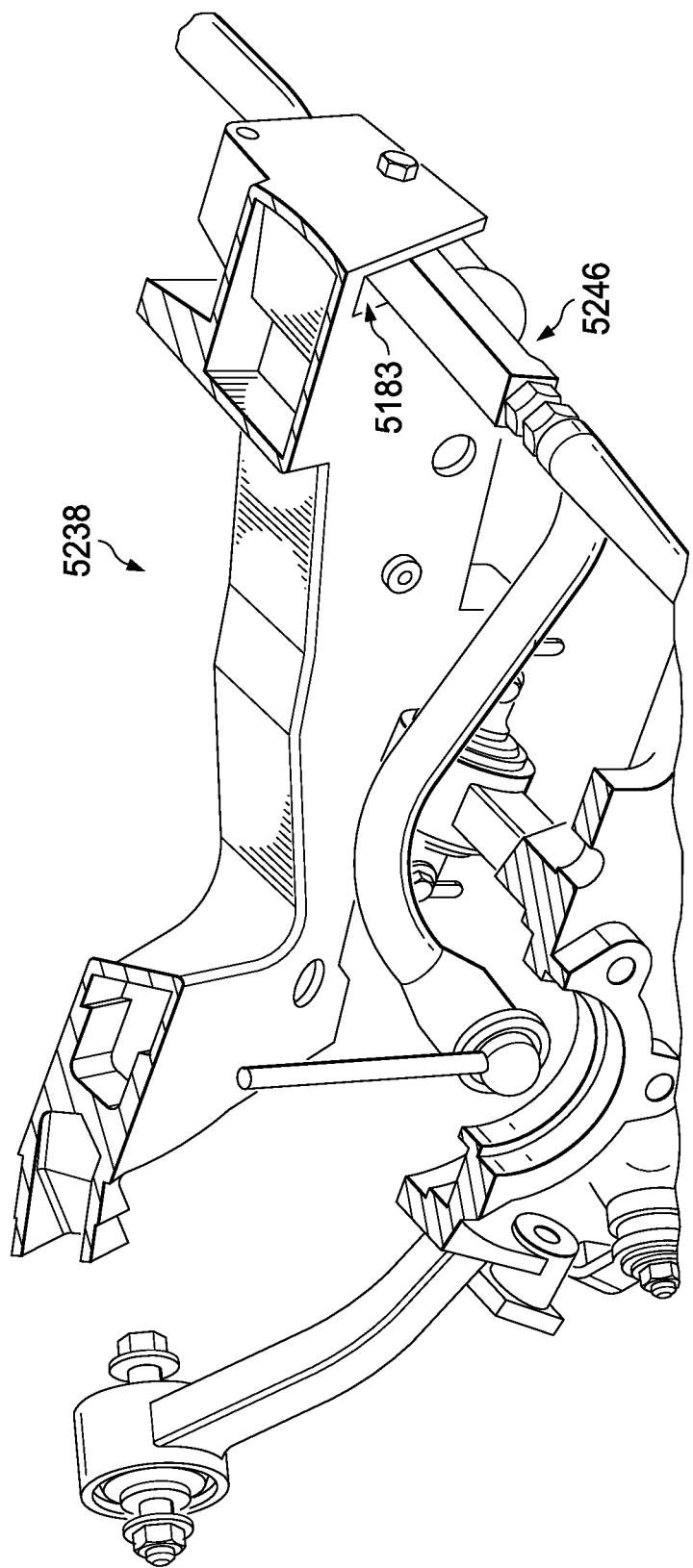
FIG. 49 is a cross-sectional view taken along the line 49-49 in FIG. 45.

Referring now to FIGS. 45-49, one embodiment of a left rear node 5238 is illustrated. The left rear node 5238 can be similar to, or the same as, in many respects as the right rear node 2236 illustrated in FIGS. 29 and 30 but instead provided on the left side of a vehicle (e.g., 40). A left rear suspension assembly 5240 can be coupled with the left rear node 5238. In particular, an upper control arm 5242 and front and rear legs 5244, 5246 of a lower control arm 5250 can be attached to the left rear node 5238. As illustrated in FIG. 46, the left rear node 5238 can include a reinforced portion to which the front leg 5244 can be bolted. The outboard wall of the left rear node 5238 is recessed to at least partially receive the front leg 5244 therein. The recessed portion of the outboard wall is reinforced on the interior surface of the outboard wall at the recessed portion with the integrally cast reinforcement 5252. The reinforcement 5252 extends within the continuous passageway to the interior surface of the inboard wall. As illustrated in FIG. 47, the left rear node 5238 can include upper and lower walls 5254, 5256 that cooperate to at least partially define a recess 5258. A portion of the upper control arm 5242 is disposed within the recess 5258 and sandwiched between the upper and lower walls 5254, 5256. As illustrated in FIGS. 48-49, the left rear node 5238 can include front and rear walls 5258, 5260 that cooperate to at least partially define a recess 5262. A portion of the front leg 5244 can be disposed within the recess 5262 and sandwiched between the front and rear walls 5258, 5260.

The foregoing description of embodiments and examples of the invention has been presented for purposes of illustration and description. It is not intended to be exhaustive nor to limit the invention to the forms described. The embodiment(s) illustrated in the figures can, in some instances, be understood to be shown to scale for illustrative purposes. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicular frame assembly defining a substantially horizontal longitudinal axis and comprising:
at least one hollow interconnecting member for connecting vehicular frame members, the at least one hollow interconnecting member being formed of a metal material, the at least one hollow interconnecting member comprising:
a front end;
a rear end;
a plurality of walls that cooperate to form a body and define a continuous passageway that extends between the front end and the rear end, the body defining a first opening and a second opening at the front end and the rear end, respectively;
a deformation feature; and
a first suspension mount configured to support at least a portion of a vehicular suspension assembly, wherein the plurality of walls includes an inboard wall and an outboard wall, and wherein the first suspension mount is positioned on an exterior surface of the outboard wall rearward of the deformation feature along a length of the vehicle;
and
at least one forward frame member coupled to the front end of the at least one hollow interconnecting member and cooperating with the at least one hollow interconnecting member to define a centerline; wherein:
the at least one hollow interconnecting member is formed as an as-cast one-piece construction; and
the at least one forward frame member defines a first collision zone and the at least one interconnecting member defines a second collision zone, wherein the least one forward frame member is more susceptible to deformation than the at least one hollow interconnecting member in response to a force applied to the at least one forward frame member along the centerline such that the at least one forward frame member experiences deformation along the centerline prior to the at least one hollow interconnecting member.

2. The vehicular frame assembly of claim 1 wherein the at least one forward frame member will substantially entirely deform before the at least one hollow interconnecting member experiences deformation along the centerline.

3. The vehicular frame assembly of claim 1 wherein the suspension mount comprises an internal reinforcement portion that extends from an interior surface of the outboard wall opposite the suspension mount and through the continuous passageway to an interior surface of the inboard wall.

4. The vehicular frame assembly of claim 3 further comprising:
a second suspension mount positioned on the exterior surface of the outboard wall rearward of the deformation feature along the length of the vehicle;
a second internal reinforcement portion that extends from the interior surface of the outboard wall opposite the second suspension mount and through the continuous passageway to the interior surface of the inboard wall; and
a control arm of the vehicular suspension assembly, wherein the control arm is secured to the first and second suspension mounts, wherein the exterior surface of the outboard wall defines a recess that receives at least a portion of the control arm therein.

5. The vehicular frame assembly of claim 1 wherein the plurality of walls includes an upper wall and a lower wall, and the upper wall includes a first steering assembly mount and an internal steering assembly reinforcement portion that extends within the continuous passageway from an interior surface of the upper wall opposite the first steering assembly mount to an interior surface of the lower wall.

6. The vehicular frame assembly of claim 5 wherein the upper wall includes a second steering assembly mount, wherein the deformation feature is at least partially positioned between the first and second steering assembly mounts along the length of the vehicle, and wherein a second steering assembly reinforcement portion extends within the continuous passageway from an interior surface of the upper wall opposite the second steering assembly mount to an interior surface of the lower wall, and wherein a gear box of a steering assembly is secured to the hollow interconnecting member at the first and second steering assembly mounts.

7. The vehicular frame assembly of claim 1 wherein the plurality of walls includes an upper wall and a lower wall, and the deformation feature comprises a groove formed in at least the upper wall to allow the front end of the hollow interconnecting member to bend upwardly as the deformation feature deforms in response to a force applied to the at least one forward frame member, wherein the groove extends along a groove centerline and has a length and a depth.

8. A hollow interconnecting member for connecting vehicular frame members, the hollow interconnecting member being formed of a metal material, the hollow interconnecting member comprising:
a body including a first end, a second end, an inboard wall, and an outboard wall that each extend between the first and second ends, each of the inboard and outboard walls includes an interior surface and an exterior surface, wherein the interior surfaces of the inboard and outboard walls at least partially define a continuous passageway that extends between the first end and the second end, the body defining a first opening and a second opening at the first end and the second end, respectively;
a deformation feature positioned on the body;
at least one suspension mount positioned on the exterior surface of the outboard wall; and
an internal reinforcement portion that extends within the continuous passageway from the interior surface of the outboard wall opposite the at least one suspension mount to the interior surface of the inboard wall, wherein the body, the deformation feature, the at least one suspension mount, and the internal reinforcement portion are an as-cast one-piece construction.

9. The hollow interconnecting member of claim 8 wherein the body includes an upper wall and an inner wall, and the deformation feature comprises a groove formed in at least one of the walls, wherein the groove extends along a groove centerline and has a length and a depth.

10. The hollow interconnecting member of claim 9 wherein the deformation feature comprises a groove formed in at least the upper wall between the first and second ends to allow the first end of the hollow interconnecting member to bend upwardly as the deformation feature deforms in response to a force applied to the first end.

11. The hollow interconnecting member of claim 8 in combination with a suspension assembly that is coupled to the at least one suspension mount.

12. The combination of claim 11 wherein the suspension assembly includes a control arm, the outboard wall defines a recess, and the control arm is at least partially disposed in the recess.

13. A front body structure for a vehicle, the front body structure comprising:
an upper frame portion;
a lower frame portion positioned forward of a vehicle cabin and defining a load path, the lower frame member being rigidly secured to the upper frame portion and comprising:
at least one forward frame member defining a first collision zone; and
a cast interconnecting member that is positioned between the at least one forward frame member and the vehicle cabin and defining a second collision zone, the cast interconnecting member comprising:
a body including a first end, a second end, an outboard wall, an inboard wall positioned opposite the outboard wall, a lower wall, and an upper wall opposite the lower wall, wherein each wall includes an interior surface and an exterior surface, wherein the interior surfaces of the walls at least partially define a continuous passageway that extends between the first end and the second end, the body defining a first opening and a second opening at the first end and the second end, respectively;
a deformation feature positioned on the body, the deformation feature being deformable in response to a force applied to the at least one forward frame member;
a first suspension mount positioned on the exterior surface of the outboard wall; and
a first steering component mount positioned on the exterior surface of the upper wall;
a suspension assembly component secured to the first suspension mount; and
a steering assembly component secured to the first steering component mount.

14. The front body structure of claim 13 wherein an internal reinforcement portion extends within the continuous passageway from the interior surface of the outboard wall opposite the first suspension mount to the interior surface of the inboard wall.

15. The front body structure of claim 14 wherein:
the cast interconnecting member further comprises a second suspension mount that is positioned on an exterior surface of the outboard wall;
a second internal reinforcement portion extends from the interior surface of the outboard wall opposite the second suspension mount and through the continuous passageway to the interior surface of the inboard wall;
a control arm of the suspension assembly is secured to the first and second suspension mounts; and
the exterior surface of the outboard wall defines a recess that receives at least a portion of the control arm therein.

16. The front body structure of claim 15 wherein a vertical internal steering assembly reinforcement portion extends within the continuous passageway from an interior surface of the upper wall opposite the first steering assembly mount to an interior surface of the lower wall.

17. The front body structure of claim 16 wherein:
the cast interconnecting member further comprises a second steering assembly mount;
a second vertical reinforcement portion extends within the continuous passageway from an interior surface of the upper wall opposite the second steering assembly mount to an interior surface of the lower wall; and
a gear box of a steering assembly is secured to the cast interconnecting member at the first and second steering assembly mounts.

18. The front body structure of claim 17 wherein the deformation feature is at least partially positioned between the first and second steering assembly mounts along the length of the vehicle, and the gear box is positioned opposite the deformation feature.

19. The front body structure of claim 18 wherein the at least one forward frame member is secured to the first end of the cast interconnecting member, and wherein deformation feature comprises a groove formed in at least the upper wall to allow the first end of the cast interconnecting member to bend upwardly as the deformation feature deforms in response to a force applied to the at least one forward frame member.

* * * * *